US012596966B2

(12) United States Patent
Bhatnagar et al.

(10) Patent No.: US 12,596,966 B2
(45) Date of Patent: Apr. 7, 2026

(54) AUTOMATED PROPERTY ACCESS CONTROL INVOLVING SEQUENTIAL CALL PROMPT INTERACTIONS USING MULTIPLE COMPUTING DEVICES

(71) Applicant: MFTB Holdco, Inc., Seattle, WA (US)

(72) Inventors: Anurag Bhatnagar, Dublin, CA (US); Hiba EL Hassan, Belvedere, CA (US); Matthew Tobin, Oakland, CA (US)

(73) Assignee: MFTB Holdco, Inc., Seattle, WA (US)

( * ) Notice: Subject to any disclaimer, the term of this patent is extended or adjusted under 35 U.S.C. 154(b) by 232 days.

(21) Appl. No.: 18/373,181

(22) Filed: Sep. 26, 2023

(65) Prior Publication Data

US 2024/0104441 A1 Mar. 28, 2024

Related U.S. Application Data

(60) Provisional application No. 63/410,219, filed on Sep. 26, 2022.

(51) Int. Cl.
*G06Q 10/02* (2012.01)
*G06Q 50/16* (2024.01)

(52) U.S. Cl.
CPC ............. *G06Q 10/02* (2013.01); *G06Q 50/16* (2013.01)

(58) Field of Classification Search
None
See application file for complete search history.

(56) References Cited

U.S. PATENT DOCUMENTS

| | | | | |
|---|---|---|---|---|
| 11,393,056 B1 * | 7/2022 | Spickes | ................ | G06F 16/909 |
| 2013/0282524 A1 * | 10/2013 | Appolito | ............ | G06Q 30/0613 |
| | | | | 705/26.41 |
| 2017/0270732 A1 * | 9/2017 | Troesch | ............ | G07C 9/00904 |
| 2020/0402183 A1 * | 12/2020 | Middleton | ....... | G06Q 10/06311 |
| 2022/0198589 A1 * | 6/2022 | Wyatt | .................. | G06Q 50/163 |
| 2023/0206707 A1 * | 6/2023 | Kuenzi | .................... | G07C 9/22 |
| | | | | 340/5.2 |

OTHER PUBLICATIONS

Elyse LeBlanc, "Announcing Showings Coordinator, powered by Tenant Turner", Mar. 6, 2018, Buildum, pp. 1-4. (Year: 2018).*

(Continued)

*Primary Examiner* — Sarah M Monfeldt
*Assistant Examiner* — Michael J. Monaghan
(74) *Attorney, Agent, or Firm* — VLP Law Group LLP; James A. D. White

(57) ABSTRACT

Techniques are described for using computing devices to perform automated operations involving interactions between multiple computing devices and systems as part of automatically scheduling an in-person access to a physical property involving multiple unaffiliated users traveling from disparate locations to the physical property, such as for an access to a house or other building. In some situations, the automated operations include exchanging electronic communications between computing devices to provide multiple sequential telephone call interactions and concurrent in-application interactions with multiple candidate users regarding participation in the group.

26 Claims, 28 Drawing Sheets

(56) References Cited

OTHER PUBLICATIONS

Showing Time.com, "Plan a Buyer's Tour in Minutes With ShowingCart", retrieved on Oct. 20, 2022 from https://www.showingtime.com/blog/easily-create-buyers-tours-showingcart/, 7 pages.

Zillow Premier Agent, "Routing Leads to Team Members", retrieved on Oct. 20, 2022 from https://www.zillow.com/agent-resources/training/tools-for-agent-teams/lead-routing-teams/, 5 pages.

Zillow Premier Agent, "2022 Zillow Premier Agent Updates", retrieved on Oct. 20, 2022 from https://www.zillow.com/agent-resources/blog/2022-zillow-premier-agent-updates/, 7 pages.

Showing Pro—Pro Agent Solutions, "Real Estate Showing Scheduler & Calendar", retrieved on Oct. 20, 2022 from https://www.proagentsolutions.com/real-estate-showing-scheduler/, 14 pages.

Salesforce.com, "Lead Routing in Salesforce", retrieved on Oct. 17, 2022 from https://www.salesforce.com/products/guide/lead-gen/routing-assignment-rules/, 3 pages.

Redfin, "Scheduling a Tour", retrieved on Oct. 31, 2022 from https://www.support.redfin.com/hc/en-us/articles/360001432232-Scheduling-a-Tour, 10 pages.

Redfin, "Live Video Chat Tour", retrieved on Oct. 31, 2022 from https://www.support.redfin.com/hc/en-us/articles/360042359472-Live-Video-Chat-Tour, 6 pages.

Redfin, ID Verification, retrieved on Oct. 31, 2022 from https://www.support.redfin.com/hc/en-us/articles/360001432192-ID-Verification, 4 pages.

Realtor.com, "Scheduling a tour is as easy as 1, 2, 3", retrieved on Oct. 22, 2022 from https://www.realtor.com/schedule-tour/, 2 pages.

Guido Bartolacci, "5 Lead Routing Criteria for Your Sales Team", retrieved on Oct. 17, 2022 from https://www.newbreedrevenue.com/blog/5-lead-routing-criteria-for-your-sales-team, 10 pages.

Sarah Sharkey, "How to schedule a home tour without a real estage agent", retrieved on Oct. 20, 2022 from https://www.opendoor.com/w/guides/how-to-schedule-a-home-tour-without-a-real-estate-agent, 5 pages.

Edmund Keith, "Homesnap Unveils Showings Tool as CoStar's Battle with Zillow Heats up", retrieved on Sep. 24, 2022 from https://www.onlinemarketplaces.com/articles/homesnap-unveils-showings-tool-as-costars-battle-with-zillow-heats-up/, 7 pages.

* cited by examiner

*Fig. 3C*

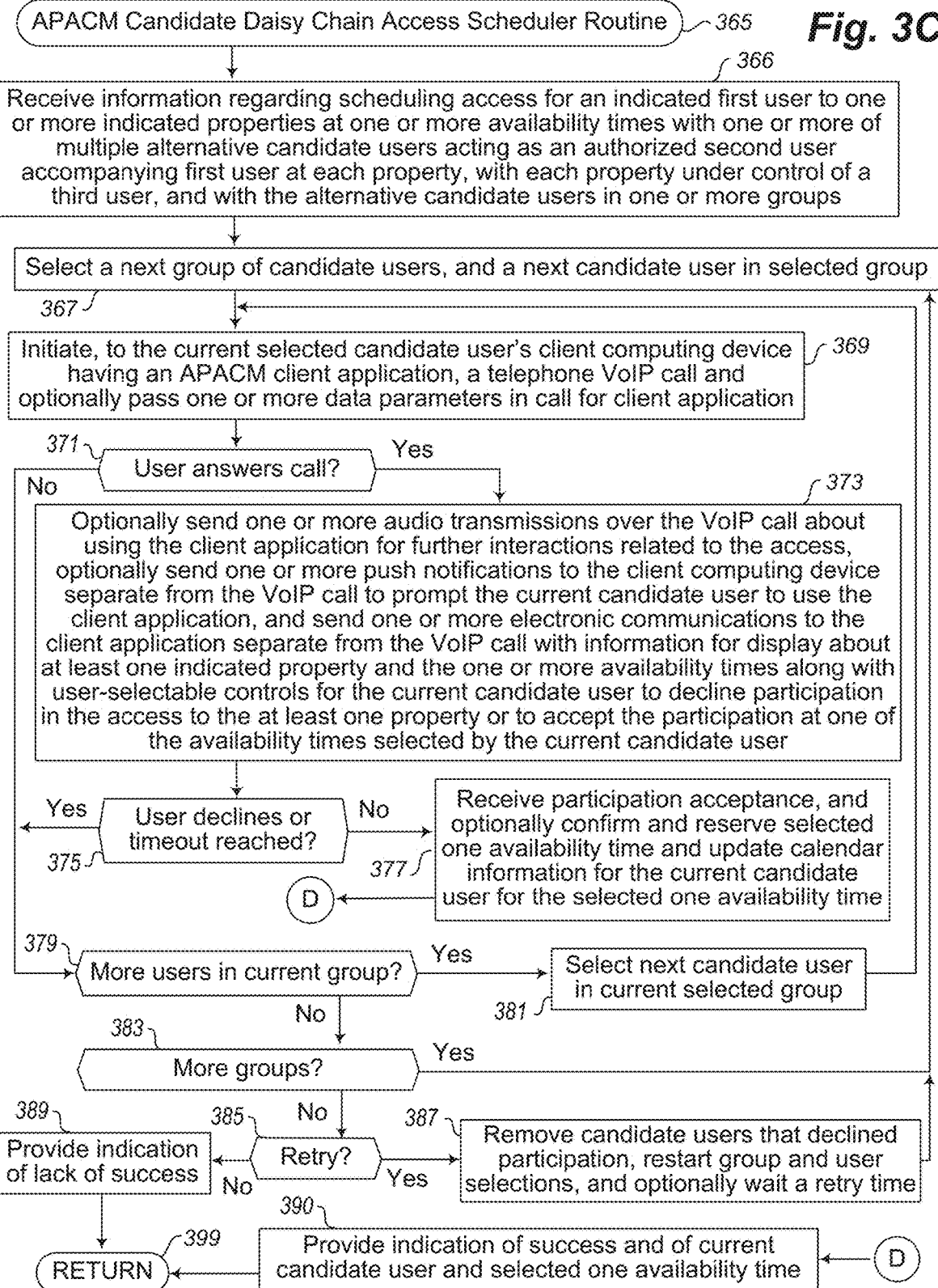

APACM Candidate Daisy Chain Access Scheduler Routine — 365

366
Receive information regarding scheduling access for an indicated first user to one or more indicated properties at one or more availability times with one or more of multiple alternative candidate users acting as an authorized second user accompanying first user at each property, with each property under control of a third user, and with the alternative candidate users in one or more groups Select a next group of candidate users, and a next candidate user in selected group
367

369
Initiate, to the current selected candidate user's client computing device having an APACM client application, a telephone VoIP call and optionally pass one or more data parameters in call for client application 371    User answers call?    Yes
No 373
Optionally send one or more audio transmissions over the VoIP call about using the client application for further interactions related to the access, optionally send one or more push notifications to the client computing device separate from the VoIP call to prompt the current candidate user to use the client application, and send one or more electronic communications to the client application separate from the VoIP call with information for display about at least one indicated property and the one or more availability times along with user-selectable controls for the current candidate user to decline participation in the access to the at least one property or to accept the participation at one of the availability times selected by the current candidate user Yes    User declines or timeout reached?    No
375

377
Receive participation acceptance, and optionally confirm and reserve selected one availability time and update calendar information for the current candidate user for the selected one availability time
(D)

379    More users in current group?    Yes    Select next candidate user in current selected group
No                                              381

383    More groups?    Yes
No 389    385    387
Provide indication of lack of success    No    Retry?    Yes    Remove candidate users that declined participation, restart group and user selections, and optionally wait a retry time
No
390

399
RETURN    Provide indication of success and of current candidate user and selected one availability time    (D)

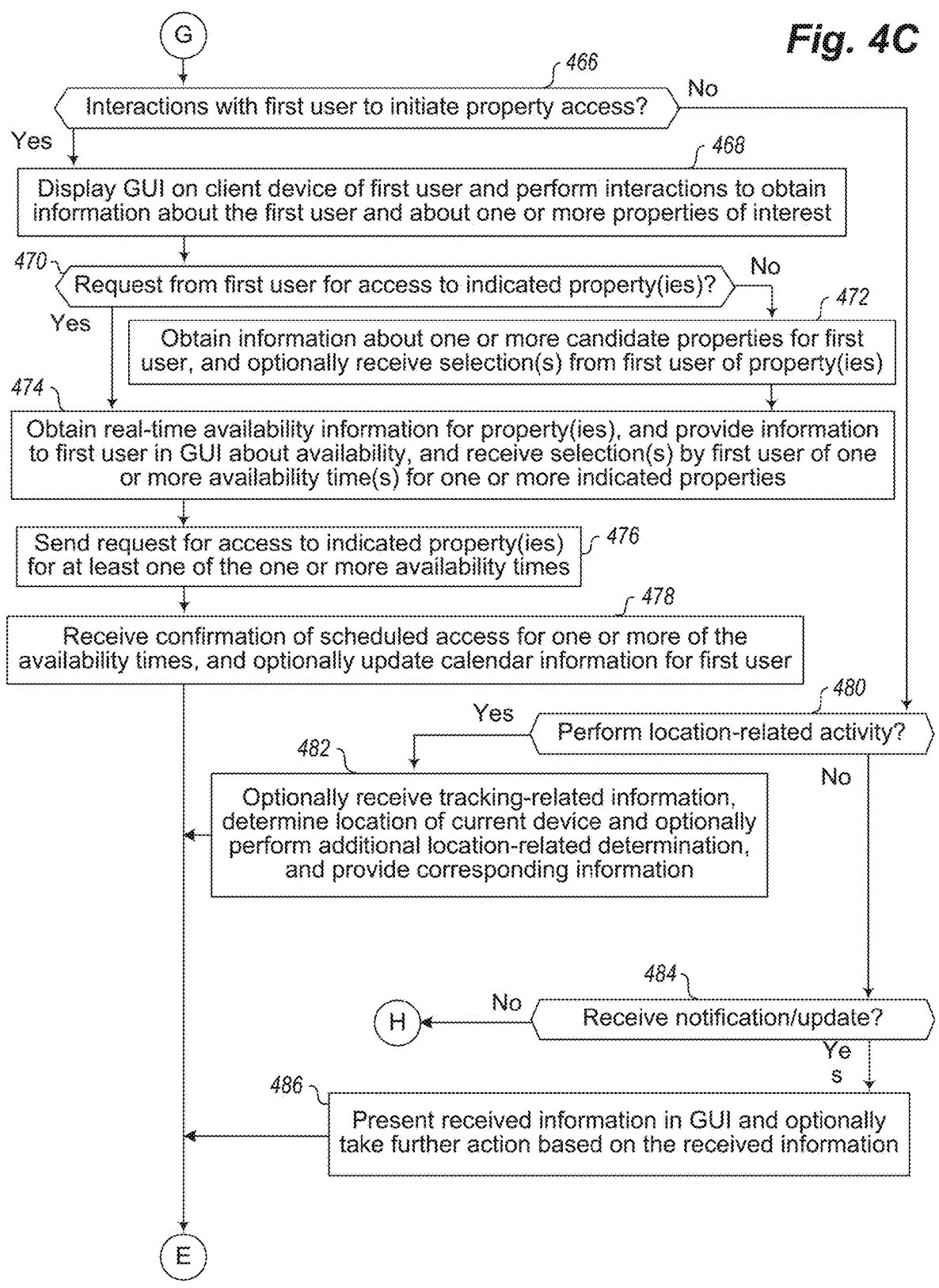

Interactions with first user to initiate property access?    No

Yes

468

Display GUI on client device of first user and perform interactions to obtain information about the first user and about one or more properties of interest

470

Request from first user for access to indicated property(ies)?    No

472

Yes

Obtain information about one or more candidate properties for first user, and optionally receive selection(s) from first user of property(ies)

474

Obtain real-time availability information for property(ies), and provide information to first user in GUI about availability, and receive selection(s) by first user of one or more availability time(s) for one or more indicated properties Send request for access to indicated property(ies) for at least one of the one or more availability times    476

478

Receive confirmation of scheduled access for one or more of the availability times, and optionally update calendar information for first user

480

Yes    Perform location-related activity?

482

No

Optionally receive tracking-related information, determine location of current device and optionally perform additional location-related determination, and provide corresponding information

484

No    Receive notification/update?

H

Yes

486

Present received information in GUI and optionally take further action based on the received information

*Tapping on address in Fig. 5A opens the property details page*

See contact details below.
Connected

Calendar view

Date

Schedule tours up to 2 weeks in advance

Wednesday
December 22

1
Dec

Time 7-7:15pm

7:15-7:30pm

7:30-7:45pm

7:45-8pm 8-8:15pm

8:15-8:30pm

8:30-8:45pm

Request Confirmation

Scroll through available dates and times to tour the property

605e

605f

To reschedule a confirmed
scheduled property access tour,
click "Edit tour"

Your status
Confirmed

Requested date & address
December 23, 10:45 mm

[Edit tour] Add to calendar

First user's message:

I really like this property and would like to
schedule time to look at it and if possible act
quickly and extend an offer Can I take a tour of this property on Dec 23,
2021 at 11:00 AM?

<property details>

MLS status: FOR SALE

Select a new time from what's
available

Date            Calendar view

Schedule tours up to 2 weeks in advance

Tuesday          Wednesday
December 21       December 22        D

Time 9-9:15pm

9:15-9:30pm

9:30-9:45pm

9:45-9pm

Cancel tour

Request Confirmation

To cancel confirmed scheduled
property access tour,
click "Cancel tour"

*<first user name and contact information>*

Notes

Request from first user states ...

*<property details>*

If requested scheduled property access tour requires approval from a third user associated with the property, this status may appear until confirmation is completed

AUTOMATED PROPERTY ACCESS CONTROL INVOLVING SEQUENTIAL CALL PROMPT INTERACTIONS USING MULTIPLE COMPUTING DEVICES

CROSS REFERENCE TO RELATED APPLICATIONS

This application claims the benefit of U.S. Provisional Patent Application No. 63/410,219, filed Sep. 26, 2022 and entitled "Automated Property Tour Scheduling Involving Multiple Sequential Call Prompt Interactions"; which is hereby incorporated by reference in its entirety.

TECHNICAL FIELD

The following disclosure relates generally to techniques for automated operations of computing devices as part of automatically controlling in-person access to a physical property involving a group of multiple users traveling from disparate locations to the physical property, such as including exchanging electronic communications between computing devices to provide multiple sequential telephone call interactions and concurrent in-application interactions with multiple candidate users regarding participation in the group.

BACKGROUND

In various circumstances, multiple users may need to travel to a physical property (e.g., a house or other building) in order to participate in simultaneous access to that property, such as from different locations and with at least some of the users being unaffiliated with each other except for participating in the simultaneous access, and in some cases with different activities of the users to be coordinated. However, it can be difficult to effectively control such simultaneous access to such a physical property.

BRIEF DESCRIPTION OF THE DRAWINGS

FIG. 3C illustrates an example embodiment of a flow diagram for an APACM Candidate Daisy Chain Access Scheduler component routine in accordance with embodiments of the present disclosure.

FIGS. 4A-4C illustrate an example embodiment of a flow diagram for an APACM Client Application routine in accordance with embodiments of the present disclosure.

FIGS. 6A-6K illustrate examples of interactions of the APACM In-Application Access Scheduler component with an APACM client application program executing on a client computing device of a second user as part of automated operations involving scheduling in-person access to a physical property that includes at least the second user and a first user traveling from disparate locations to the physical property.

DETAILED DESCRIPTION

Figure 1:
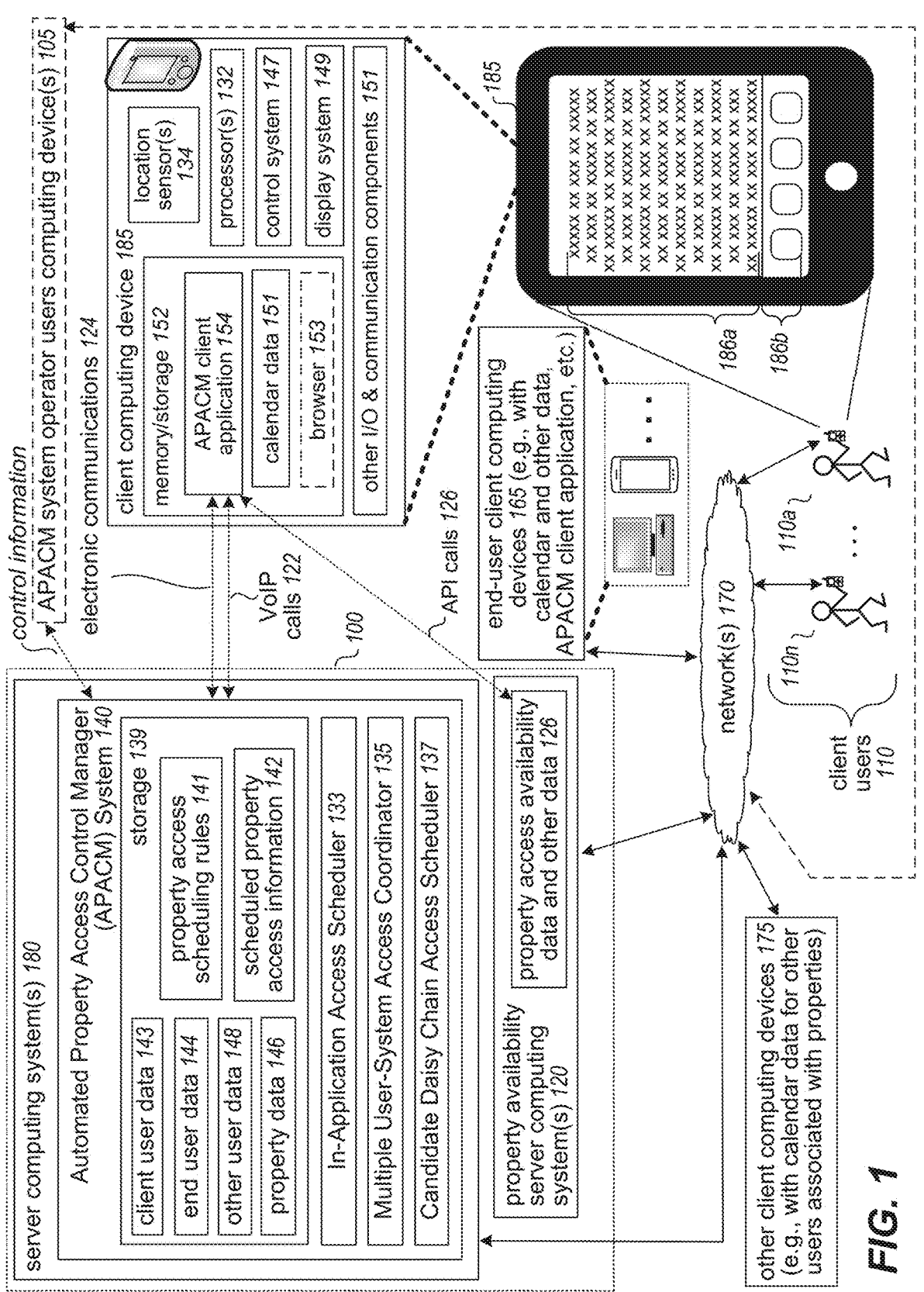
FIG. 1 includes a diagram depicting an exemplary environment and computing systems and devices for use in embodiments of the present disclosure, including to perform automated operations involving controlling in-person access to a physical property that includes multiple users traveling from disparate locations to the physical property.

The present disclosure describes techniques for using computing devices to perform automated operations involving interactions between multiple computing devices and systems as part of automatically scheduling in-person access to a physical property involving a group of multiple users traveling from disparate locations to the physical property, such as for an access to a house or other building that is controlled by one or more other users who are not part of the group, and involving electronic communications of multiple types being exchanged over one or more computer networks between multiple software systems executing on separate computing devices. As one example, such electronic communications may involve an application program executing on a mobile client computing device of one of the users, and include API (application programming interface) calls by the application program to one or more remote server computing devices during an ongoing telephone call (e.g., VoIP, or Voice over Internet Protocol, telephone call) or other ongoing interactive electronic communication session between the client computing device and another device of another user of the group, such as to use the API calls to retrieve real-time property availability information and to schedule confirmed access to a particular property at a particular availability time, and such as while further exchanging other electronic communications with one or more computing devices. As another example, such electronic communications may involve one or more server computing devices and include multiple sequential telephone call interactions (e.g., VoIP calls) by the server computing device(s) with multiple client computing devices of alternative candidate users for participation in the group, such as to confirm participation of at least one of the candidate users in a group with another first user for access to a particular property, and such as accompanied by concurrent other electronic communications exchanged between the server computing device(s) and at least some of the client computing devices separate from the telephone call interactions. As yet another example, such electronic communications may involve activities of one or more server computing devices in determining multiple alternative candidate users to accompany a first user as part of a scheduled access for one or more properties and initiating corresponding electronic communications to client computing devices of one or more of the candidate users to confirm participation of at least one such candidate user as part of a group with the first user for the scheduled access, and optionally further determining additional information (e.g., multiple candidate properties for the first user, real-time availability information for one or more properties, etc.) and sending corresponding electronic communications to the client computing device of the first user, and optionally exchanging further electronic communications with client computing devices of some or all users of a group as part of tracking device locations and otherwise coordinating a scheduled property access for the group. In some cases, the automated operations may further control interactions with a client computing device of a user via display or other presentation of information and functionality in a corresponding GUI (graphical user interface) of a client application program, including receiving and responding to user interactions via corresponding electronic communications. Additional details are included below regarding electronic communications and other interactions between multiple computing devices and systems as part of automatically scheduling in-person access to a physical property involving multiple users traveling from disparate locations to the physical property, and some or all techniques described herein may, in at least some embodiments, be performed via automated operations of an Automated Property Access Control Manager ("APACM") system, as discussed further below.

As noted above, in some embodiments and situations, a physical property for which access is controlled includes a house or other building, and the users involved in the access may be of various types in various embodiments and situations. As one non-exclusive example, the house or other building may be part of a real estate property listing (also referred to herein as a "property listing", such as for a property that has been put up for sale, renting, leasing, etc.) and may have one or more property owners and/or tenants who live at or otherwise occupy the property for at least some times, such as for a real estate property that provides access for limited tours of other users under specified conditions (e.g., at certain times, for groups of users that include at least one licensed real estate agent who is authorized to access the property in accordance with specified instructions, etc.)—such a property listing may include various information about the property (e.g., an address and information about property features and other attributes, such as school information, tax information, marketing details, etc.), about tours (e.g., showing instructions), and optionally including identification and contact information (such as a mobile telephone number, email address, etc.) of the owner(s) and/or tenant(s) and of one or more listing agents that serve in a role to represent the owner during at least some tours of the property at which the listing agent participates as one of a group of users for the tour, including if the owner(s) and/or tenant(s) are not present at the property during some or all such tours. Such controlled access to a property may include a group of multiple users, with non-exclusive examples including one or more listing agents (e.g., part of a first organization, such as a first real estate brokerage), one or more potential acquirers (e.g., buyers, renters, etc.), one or more acquirer showing agents (e.g., part of a second organization, such as a different second real estate brokerage unaffiliated with the first organization of the one or more listing agents) to represent the potential acquirer(s), and optionally additional users (e.g., an appraiser, inspector, repair person, vendor contact for possible improvements/changes, etc.), but in at least some embodiments and situations does not include the owner(s) and/or tenant(s), who may need to take action to leave the property or otherwise not be present at the property during the access by the group. In some embodiments and situations, property availability calendar information involving access to a property is maintained by one or more server computing devices/systems executing a property access management system software program that controls access to the property at specified availability times (e.g., each including at least a start time for a specified day and optionally a specified duration until an end time, such as 30 minutes, and such as for limited exclusive access for a group of users for a particular availability time)—the time of a scheduled property access for a group of users is referred to herein at times herein as a reserved and/or confirmed availability time for a scheduled access to the property, such as with a beginning time on an indicated day and duration (e.g., 1:00 PM to 1:30 PM local time on Jun. 4, 20XX), although an availability time may be represented in other manners in other embodiments. Such server computing devices/systems executing a property access management system may include, for example, one or more of the following: one or more computing systems maintained by the first organization including the one or more listing agents; one or more computing systems maintained by a third organization that is separate from the first and second organizations, such as by a multiple listing service organization that maintains information about property listings and is unaffiliated with the first and second organizations and their respective listing and acquirer showing agents other than providing access to the property listing information; etc. Such computing system(s) maintaining the property availability calendar information may not, however, have access to calendar data for some or all users in at least some embodiments and situations (e.g., calendar data for property owners and/or tenants, listing agent client users, acquirer showing agent client users, potential acquirer end users, other users; etc.), although in some embodiments and situations may have information about one or more time slots during which one or more listing agents for a property are available or not available to participate in a group of users that access the property.

As one example of previous difficulties in scheduling property access with prior existing systems, even if a prior property management system was available that had calendar information about scheduled access for a property and that might have had limited information about availability of one or more listing agents for property access, the scheduling of such access using the property access management system had significant difficulties including numerous manual interactions of users. For example, after one or more potential acquirer users and one or more acquirer showing agent users manually interacted to determine a time at which those users were tentatively available and at which a property of interest might be available, a request (e.g., through email, telephone, text messaging, push notification, etc.) for confirmation of property access for that time may have been sent to one or more others for manual approval and response, such as to one or more listing agent users. If a confirmation was later received from a listing agent user (e.g., after a delay of hours, days, etc.), the property access management system would then need to notify the requester (e.g., a potential acquirer and/or an acquirer showing agent) that an appointment had been accepted for an indicated time, at which time all of the potential acquirer(s) and acquirer showing agent(s) and potentially additional users would further have needed to be notified and to manually and individually update their own separate calendar systems to reflect the scheduled access if they were still available, or otherwise cancel or attempt to modify the access if one or more were not still available and to restart the process, and in some cases one or more property owners and/or tenants may similarly have needed to be notified to not be present at the property for the access and to manually and individually update their own separate calendar systems to reflect the scheduled access if they were available to take such action or otherwise cancel or attempt to modify the access if one or more were not available. In addition, after such an access did occur, the access management system in some cases might further need to send one or more requests (e.g., a text message, an email, a voice call, etc.) to an acquirer showing agent user requesting manual feedback on the property listing and/or to obtain manual confirmation of an end of the showing.

As noted above, automated operations of an APACM system may in at least some embodiments include electronic communications that involve an application program executing on a mobile client computing device of one of the users, and include API (application programming interface) calls by the application program to one or more remote property availability server computing devices/systems that implement a property access management system (e.g., server devices/systems implementing the APACM system if it includes such an access management system; server devices/systems implementing such an access management system separately from the APACM system, such as by an organization separate from the organization implementing the APACM system; etc.)—such communications may include, for example, API calls by the application program to retrieve current availability times for a property (e.g., in a real-time manner, such as within seconds or fractions of a second of the call), to request confirmed reservation of a particular availability time and receive confirmation of the reservation (in a real-time manner, such as within seconds or fractions of a second of the call), etc. In addition, such electronic communications by the client computing device (e.g., a smartphone, tablet computer, laptop computer, etc.) of a user of a group may occur during an ongoing telephone call (e.g., a VoIP telephone call) or other ongoing interactive electronic communication session (e.g., via text messages, instant messaging, etc.) between the client computing device and another device of another user of the group, such as to enable discussion of particular current availability times and to select an availability time at which to reserve access. Furthermore, such electronic communications by the client computing device of the user may occur while further exchanging other electronic communications between the client computing device and one or more other computing devices, such as one or more server devices/systems implementing at least some of the APACM system and providing information to the client computing device about one or more particular properties and/or one or more particular other users of the group (e.g., the other user participating in the telephone call or other interactive electronic communication session) and/or one or more particular availability times requested by one or more such other users. In at least some embodiments, some or all such automated operations of the APACM system may be implemented in part or in whole by an In-Application Access Scheduler component of the APACM system, with additional details included below regarding such electronic communications and automated operations, including with respect to the examples of FIGS. 3A and 6A-6K and their associated descriptions.

As noted above, automated operations of an APACM system may also in at least some embodiments include electronic communications involving one or more server computing devices/systems and include multiple sequential telephone call interactions (e.g., VoIP calls) by the server device/systems with multiple client computing devices of alternative candidate second users for participation in a group of multiple users to access one or more properties, such as to accompany another first user (e.g., who is not identified to the candidate second user at a time of the telephone call interactions) in accessing one or more particular indicated properties at one or more indicated availability times, and such as to confirm participation of at least one such candidate user as part of a group with the first user for the scheduled access, etc. Some or all such telephone call interactions by the server computing device with a client candidate device of a candidate user may be accompanied by other concurrent electronic communications exchanged between the server computing devices/systems and that client computing device, such as to provide information to the client computing device about one or more particular properties and/or one or more particular availability times, and in some cases about a particular other user of the group. In at least some embodiments, some or all such automated operations of the APACM system may be implemented in part or in whole by a Candidate Daisy Chain Access Scheduler component of the APACM system, with additional details included below regarding such interactions and automated operations, including with respect to the examples of FIGS. 3C and 5A-5G and their associated descriptions.

As noted above, automated operations of an APACM system may also in at least some embodiments include electronic communications involving one or more server computing devices/systems and include activities of the server devices/systems in determining multiple alternative candidate second users to accompany a first user as part of a scheduled access for one or more properties, and initiating corresponding electronic communications to client computing devices of one or more of the candidate users to confirm participation of at least one such candidate user as a second user accompanying the first user for the scheduled access—such alternative candidate second users may be determined and evaluated in various manners in various embodiments, such as by considering some or all users in a related geographic area that are authorized to participate in the access (e.g., acquirer showing agent users who have requested or otherwise opted in to such interactions) and evaluating the alternative candidate second users based on a combination of factors (e.g., by using a trained machine learning model (e.g., a trained neural network) to identify a best match candidate user with respect to one or more criteria, optionally by considering multiple factors such as current location, travel time to a separate location of an indicated physical property, attributes of the second user based on prior activities in accessing properties and/or that correspond to attributes of the first user, etc.). Such electronic communications may in some embodiments and situations include further determining additional information of one or more types and sending corresponding electronic communications to the client computing device of the first user to provide the additional information—such additional information may include, for example, one or more suggested candidate properties for the first user, real-time availability information for one or more properties, other information of one or more types (e.g., location information for other users of a group), etc. In addition, such electronic communications may further in some embodiments and situations include exchanging electronic communications with client computing devices of some or all users of a group as part of tracking device locations and otherwise coordinating a scheduled property access for the group, such as to determine whether and when users are approaching a particular property (e.g., by breaching one or more geofences around the property) relative to a reserved availability time for the scheduled access, using predicted travel times to determine expected late arrivals, etc., and further automated operations may be performed based on such a tracked device location of a client device of a group having a scheduled access to a property, such as providing corresponding notifications and/or updates to that client device and/or to other client devices of other users of the group, performing automated rescheduling or cancellation of a scheduled access (e.g., if one or more of the users of the group are predicted to arrive after an end time for the reserved availability time or otherwise satisfy one or more defined criteria), etc. In at least some embodiments, some or all such automated operations of the APACM system may be implemented in part or in whole by a Multiple User-System Access Coordinator component of the APACM system, with additional details included below regarding such interactions and automated operations, including with respect to the examples of FIGS. 3B and 7A-7B and their associated descriptions.

The described techniques provide various benefits in various embodiments, including to enable access to physical properties involving multiple previously unaffiliated users to be scheduled more efficiently and rapidly (e.g., using significantly reduced computing power and time relative to prior existing techniques) and in manners not previously available, including for specific types of access and scheduling activities, such as to enable one or more of the following: electronic interactions involving an application program executing on a mobile client computing device of one of the users to schedule real-time confirmed access to a particular property at a particular availability time, and including API calls by the application program to one or more remote server computing devices during an ongoing telephone call (e.g., VoIP telephone call) or other ongoing interactive electronic communication session between the client computing device and another device of another user of the group, such as to retrieve real-time property availability information and to schedule real-time confirmed access to a particular property at a particular availability time, and such as while further exchanging other electronic communications with one or more other computing devices; electronic interactions involving one or more server computing devices/systems and including multiple sequential telephone call interactions (e.g., VoIP calls) by the server devices/systems with multiple client computing devices of alternative candidate users for participation in the group to obtain immediate confirmation of participation of at least one of the candidate users in a group with another first user for access to a particular property, such as accompanied by concurrent other electronic communications exchanged between the server devices/systems and at least some of the client computing devices; electronic interactions involving one or more server computing devices/systems and including activities of the server devices/systems in determining multiple alternative candidate users to accompany a first user as part of a scheduled access for one or more properties and initiating corresponding electronic communications to client computing devices of one or more of the candidate users to confirm participation of at least one such candidate user as part of a group with the first user for the scheduled access, and optionally further determining additional information (e.g., multiple candidate properties for the first user, real-time availability information for one or more properties, etc.) and sending corresponding electronic communications to the client computing device of the first user, and optionally exchanging electronic communications with client computing devices of some or all users of a group as part of tracking device locations and otherwise coordinating a scheduled property access for the group; etc. In addition, in some embodiments the described techniques may be used to provide an improved GUI in which a user may more accurately and quickly identify obtain information and functionality about such access scheduling and associated functionality (e.g., using a mobile client computing device of the user, such as a smartphone and/or tablet computer). Various other benefits are also provided by the described techniques, some of which are further described elsewhere herein.

For illustrative purposes, some embodiments are described below in which specific types of information are acquired, used and/or presented in specific ways for specific types of properties and by using specific types of devices—however, it will be understood that the described techniques may be used in other manners in other embodiments, and that the invention is thus not limited to the exemplary details provided. In addition, the term "property" herein includes any one or more connected or otherwise co-located buildings and associated land or other land without buildings, optionally with restricted access, and the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), supplemental structures on a property with another main building (e.g., a detached garage or shed on a property with a house), etc. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify the same or similar elements or acts.

FIG. 1 includes an example block diagram of various computing devices and systems that may participate in the described techniques in some embodiments, such as to perform automated operations involving scheduling in-person access to a physical property that includes a group of multiple users traveling from disparate locations to the physical property.

In particular, FIG. 1 illustrates example client users 110 who each has a mobile client computing device 185 that has one or more types of wireless communication capabilities, such as smartphone computing devices or other mobile computing devices (e.g., a tablet, laptop, etc.), although in other embodiments some or all such client devices may be fixed-location devices and/or may not support wireless communications. The handheld client computing device 185 of example user 110a is illustrated in additional detail, such as to include a smartphone device or tablet device with a touch-sensitive display. In this example, the display is separated into sections 186a and 186b by a graphical user interface ("GUI") displayed on the device 185, with the portion 186b being used in this example to provide user-selectable functionality controls (e.g., buttons or icons), and the separate portion 186a being used to display or otherwise present various information to the user, although it will be appreciated that in other embodiments a device may have other types of GUIs (or no GUI), including to have both displayed information and user-selectable controls that are intermixed. In the illustrated embodiment, additional details are further shown regarding example internal components of the client device 185. In particular, in this example, client device 185 is suitable for performing at least some of the described techniques, such as by executing an embodiment of an Automated Property Access Control Manager ("APACM") client application 154 that interacts over one or more networks 170 with an embodiment of the APACM system 140 executing on one or more server computing devices/systems 180—in other embodiments and situations, some or all of an APACM system may instead execute on each of one or more client devices 185 (e.g., in a distributed manner across multiple such client devices). Various components of the client computing device 185 are also illustrated in FIG. 1, including one or more hardware processors 132 (e.g., CPUs, GPUs, etc.) that execute software (e.g., application 154, optional browser 153, etc.) using executable instructions stored and/or loaded on one or more memory/storage components 152 of the device 185, a display system 149 (e.g., including one or more displays, optionally with touch-sensitive screens), one or more control systems 147 managing I/O (input/output) and/or communications and/or networking for the device 185 (e.g., to receive instructions from and present information to an associated user) such as for the display and other device I/O and communication components 151 (e.g., network interfaces or other connections, keyboards, mice or other pointing devices, microphones, speakers, GPS receivers, etc.), one or more location sensors 134 (e.g., a GPS, or Global Positioning System, sensor or other position determination sensor), optionally other components, etc. The device 185 may store and use various types of data during operation, such as calendar data 151 for an associated user 110 to reflect one or more scheduled accesses for the user. In the illustrated embodiment, the client users 110 may include, for example, acquirer showing agent users and/or listing agent users who access and use specialized functionality of the APACM system available to them, including functionality related to participating in access scheduling activities available to them, such as using a first APACM client application program 154 that includes additional or different capabilities than a second APACM client application program used by other end users of client computing devices 165.

Other computing devices and systems may also interact with the APACM system over the network(s) 170 to receive and provide various types of functionality, such as the following: end-user client computing devices 165 used by acquirer users or other first users (not shown) and optionally each executing an APACM client application and storing calendar data and/or other data for those first users; other computing devices 175 for other users (e.g., property owners and/or tenants, not shown) and optionally storing calendar data and/or other data for those other users; one or more property availability server computing devices/systems 120 storing property tour availability data and other property-related data 126 (e.g., as part of an executing access management system, not shown); optional computing devices 105 used by system operator users (not shown) of the APACM system, such as to perform operations to maintain the APACM system and in some embodiments to assist in automated operations of the APACM; optional other computing systems (not shown) to provide other functionality; etc. In at least some embodiments and situations, the server computing devices/systems 180 and property availability server computing devices/systems 120 may be the same devices/systems or otherwise operate as an affiliated overall device/system 100, while in other embodiments the computing devices/systems 180 and 120 may operate separately (e.g., by different organizations).

In the illustrated embodiment, the APACM system 140 receives information from various users and associated computing devices (e.g., calendar scheduling systems or information from those computing devices, location information, etc.), and performs automated operations related to scheduling in-person access to physical properties (not shown) that each includes a group of multiple users traveling from disparate locations to the physical property, such as with some or all of the users of the group being unaffiliated before the automated operations of the APACM system to form the group. As part of doing so, the APACM system may retrieve or otherwise obtain various information and store it for use on storage 139 or elsewhere, such as client user data 141 (e.g., from client computing devices 185 for agent users, optionally including calendar data, location data, preference data, device data, contact information, etc. for those users), end user data 144 (e.g., from client computing devices 165 for acquirer first users or other first users, optionally including calendar data, location data, preference data, device data, contact information, etc. for those users), other user data 148 (e.g., from computing devices 175 for other users, optionally including calendar data, location data, preference data, device data, contact information, etc. for those users), property data 146 (e.g., from server computing systems 120, such as via one or more API calls by the APACM system to an access management system or other system executing on the systems 120 if separate from the APACM system, and optionally including property availability calendar data and other property-related information for properties), scheduled property access information 142 generated by the APACM system 140 via interactions with the other computing devices/systems 120, 165, 175 and 185 and shared with those other computing systems/devices, property access scheduling rules 141 (e.g., as specified by other users of other computing devices 175 for their associated properties and/or as programmed or otherwise specified by system operator users of the devices 105), etc. Other devices/systems 105, 120, 165, 175 and 180 may each include various hardware components and stored information in a manner analogous to mobile device 185, which are not shown in this example for the sake of brevity.

In the illustrated embodiment, the APACM system includes multiple APACM system components 133-137 and interacts with APACM client applications 154 on client computing devices 185 and APACM client applications (not shown) on client computing devices 165, but in other embodiments may include only one of the components 133-137 and/or may interact with end users of client computing devices 165 in other manners (e.g., via a GUI of the APACM system provided via one or more Web sites). The illustrated components 133-137 include an APACM In-Application Access Scheduler component 133, an APACM Multiple User-System Access Coordinator component 135, and an APACM Candidate Daisy Chain Access Scheduler component 137. During operations of the APACM system 140, the system 140 may initiate VoIP telephone calls 122 involving client computing devices 185 and/or 165, whether between two such client devices (e.g., two client devices 185, a client device 185 and a client device 165, etc.) and/or between the APACM system 140 and a client computing device 185 or 165, and provide prompts (e.g., push notifications) to users of client devices to access their APACM client applications to obtain additional information sent to the APACM client applications from the APACM system 140 via additional electronic communications 124, to connect users of two or more client devices, etc. In addition, the electronic communications 124 may be sent from the APACM client applications to the APACM system 140 to request and/or provide various information (e.g., about properties, availability times, attributes of the users of the client devices, etc.) and to receive various information (e.g., about properties, availability times, etc.), as well as for the APACM system 140 to provide push electronic notifications to prompt a user of a client device to access the APACM client application on that client device or to take other action. The APACM client applications may further perform other electronic communications, including to make API calls 126 to the property availability server devices/systems to receive real-time property availability information, to request a reservation of a particular property availability time for scheduled access to a particular property and receive a real-time confirmation of the scheduled access, etc. Additional details related to the operations of the components 133-137 and the system 140, and to electronic interactions that include calls 122 and 126 and other electronic communications 124, are included elsewhere herein.

In the depicted computing environment of FIG. 1, the network 170 may be one or more publicly accessible linked networks, possibly operated by various distinct users, such as the Internet, or may instead have other forms in other implementations. For example, the network 170 may instead be a private network, such as a corporate or university network that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks in various situations. In addition, the client devices 105, 165 and 175 and server computing systems 120 and 180 may include various hardware components and stored information in a manner similar to that illustrated for device 185.

It will also be appreciated that the illustrated computing systems devices/systems 105, 120, 165, 175, 180 and 185 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smartphones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated APACM system 140 may in some embodiments be distributed in various components, some of the described functionality of the APACM system 140 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the APACM system 140 executing on server computing systems 180, by the APACM client application 154 executing on client computing devices 185, by an APACM client application executing on client computing devices 165, etc.) and/or data structures, such as by execution of software instructions of the one or more software programs and/or by storage of such software instructions and/or data structures, and such as to perform algorithms as described in the flow charts and other disclosure herein.

Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Various details are provided with respect to FIG. 1, but it will be appreciated that the provided details are non-exclusive examples included for illustrative purposes, and other embodiments may be performed in other manners without some or all such details. In addition, additional details and non-exclusive examples are included in U.S. Provisional Patent Application No. 63/410,210, filed Sep. 26, 2022 and entitled "Automated Property Tour Scheduling Involving Multiple Interacting Scheduling Systems"; in U.S. Provisional Patent Application No. 63/410,214, filed Sep. 26, 2022 and entitled "Automated Property Tour Scheduling Involving Multiple Unaffiliated Participants In Disparate Locations"; and in U.S. Provisional Patent Application No. 63/410,219, filed Sep. 26, 2022 and entitled "Automated Property Tour Scheduling Involving Multiple Sequential Call Prompt Interactions"; each of which is hereby incorporated by reference in its entirety.

Figure 2:
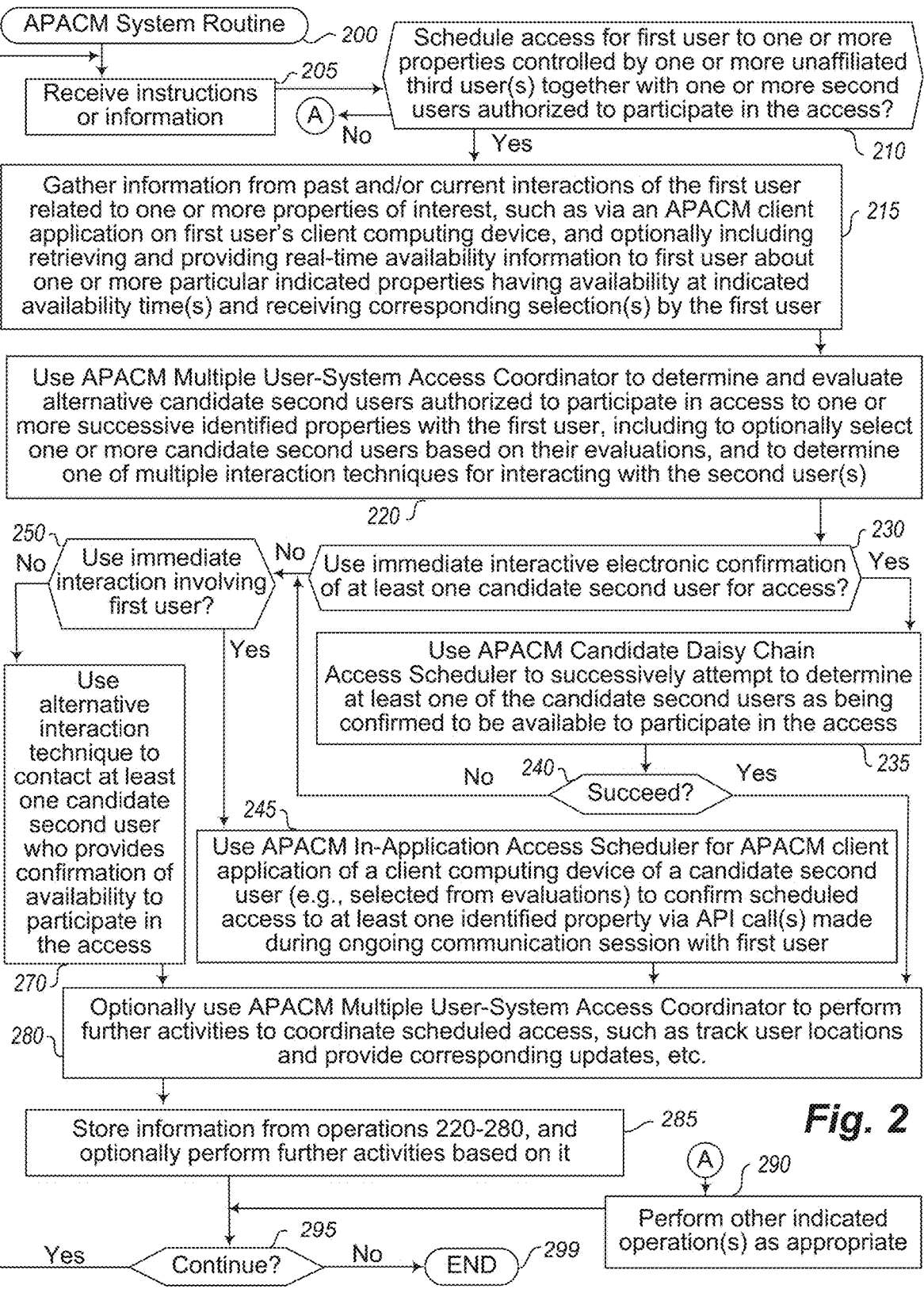
FIG. 2 illustrates an example embodiment of a flow diagram for an Automated Property Access Control Manager (APACM) system routine in accordance with an embodiment of the present disclosure.

FIG. 2 illustrates an example embodiment of a flow diagram for an Automated Property Access Control Manager (APACM) system routine 200 in accordance with an embodiment of the present disclosure. The routine may be performed by, for example, execution of the APACM system 140 of FIG. 1, and/or an APACM system as described with respect to FIGS. 5A-7B and elsewhere herein, such as to perform automated operations related to automatically scheduling in-person access to a physical property involving a group of multiple users traveling from disparate locations to the physical property. In the example embodiment of FIG. 2, the properties may include houses or other buildings, and multiple different types of access scheduling functionality are provided, but in other embodiments, only one or some of such different types of scheduling functionality may be provided and/or other types of related functionality may be provided, and/or access scheduling functionality may be provided for other types of venues, as discussed elsewhere herein. In addition, while access is scheduled for an indicated property involving a group with a first user and a second user in the example embodiment of FIG. 2, it will be appreciated that the same or other techniques may be further used to schedule such access to an indicated property for groups of three or more users (e.g., one or more first users, such as one or more acquirer users, including multiple acquirer users operating independently of each other or in concert; one or more second users, such as one or more showing agent users, including multiple showing agent users operating independently of each other or in concert, such as by being part of the same team and/or brokerage or other organization; one or more additional users, such as one or more listing agent users, including multiple listing agent users operating independently of each other or in concert, such as by being part of the same team and/or brokerage or other organization) and optionally further in situations in which one or more other third users (e.g., owners, tenants, etc.) may leave the indicated property to not be part of the group. Furthermore, in the example embodiment of FIG. 2, the routine 200 may execute on one or more server computing devices/systems and interact with separate client computing devices of some or all users involved in access to a particular property, but in other embodiments some or all of the functionality of the routine 200 may be executed in other manners, such as on one or more client computing devices of some or all of the users (e.g., as part of APACM client application programs executing on those client computing devices or otherwise by some or all of the APACM system executing on those client computing devices, such as in a distributed manner on multiple such client computing devices and optionally in a peer-to-peer manner).

The illustrated embodiment of the routine 200 begins at block 205 where it receives instructions or other information (e.g., waiting until such instructions or other information is received). In block 210, the routine then determines whether the instructions or other information received in block 205 relate to scheduling access for a group of users including an indicated first user (e.g., an acquirer) to one or more properties controlled by one or more unaffiliated third users (e.g., one or more owners and/or tenants and/or listing agents), such as based on a request from or other interaction by the first user with a GUI of the APACM system (e.g., using an APACM client application program executing on a client computing device of the first user, using a Web site provided by the APACM system, etc.) or with another system that sends corresponding information to the APACM system, and with such access to be scheduled further including one or more second users (e.g., one or more acquirer showing agent users) that are authorized to access to the property(ies) and are not yet identified or affiliated with the first user or the third user(s), and if so continues to block 215. The routine in block 215 gathers information from past and/or current interactions with the first user related to one or more properties of interest (e.g., one or more particular indicated properties, one or more types of properties and/or other attributes of properties, etc.) and optionally otherwise about the user (e.g., by posing questions and receiving answers; by tracking interactions of the first user, such as from one or more clickstreams, and optionally further analyzing those interactions to determine information about properties of implicit interest to the first user and/or otherwise about the first user; by retrieving stored information about the first user; by receiving corresponding information in block 205; etc.). In some embodiments and situations, the interactions with the first user may include receiving indications of one or more particular properties of interest, obtaining (e.g., from a separate property availability server device/system) and providing to the first user real-time property availability information for the one or more particular indicated properties (e.g., one or more availability times for each of the one or more particular indicated properties, optionally staggered in an order corresponding to visiting multiple indicated properties in that order and accounting for factors such as predicted travel time between the different locations of the properties), and optionally receiving corresponding selections by the first user of one or more requested availability times for each of at least one particular indicated property. In some embodiments and situations, the indications of the one or more particular properties of interest may indicate multiple particular properties to which to obtain sequential access during a time period (e.g., so as to have multiple reserved availability times for the multiple properties), and to include one or more second users for the sequential access (e.g., an initial second user to participate in the access to an initial one or more of the multiple properties, a different subsequent second user to participate in the access to a subsequent one or more of the multiple properties, etc.).

Figure 3A:
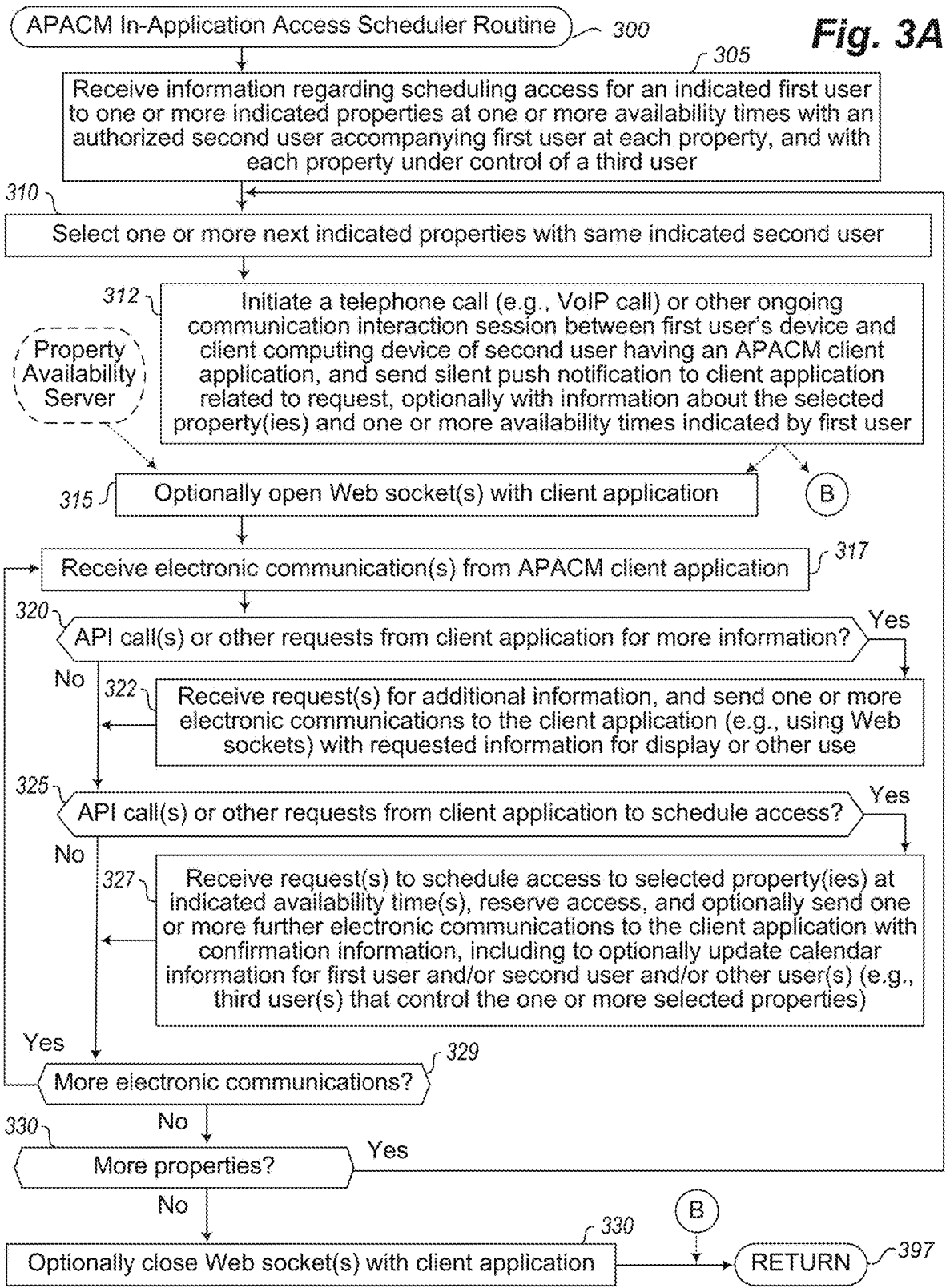
FIG. 3A illustrates an example embodiment of a flow diagram for an APACM In-Application Access Scheduler component routine in accordance with embodiments of the present disclosure.
Figure 3B:
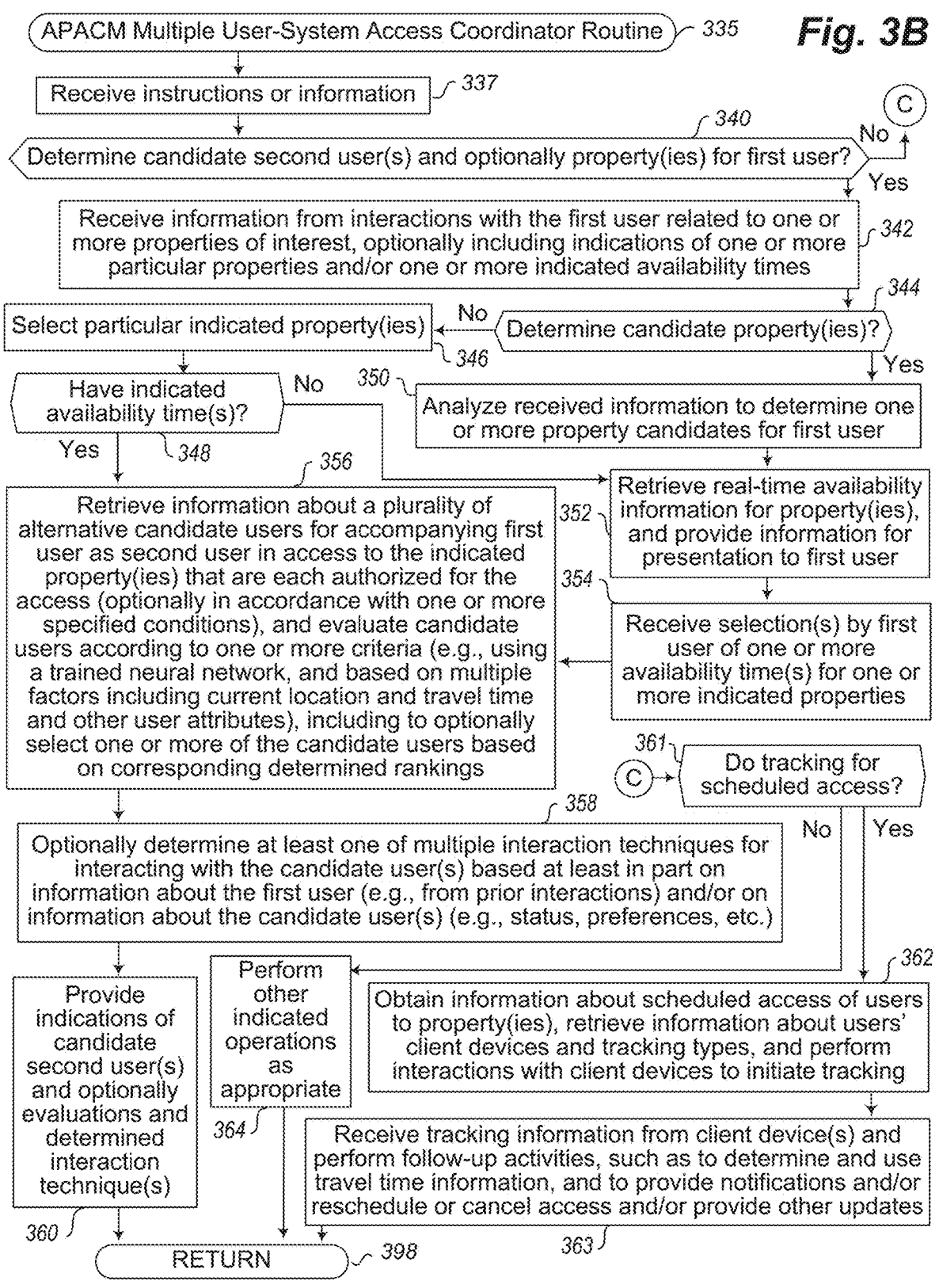
FIG. 3B illustrates an example embodiment of a flow diagram for an APACM Multiple User-System Access Coordinator component routine in accordance with embodiments of the present disclosure.

After block 215, the routine continues to block 220 to use the APACM Multiple User-System Access Coordinator component to determine and evaluate multiple alternative candidate users to act as the one or more second users accompanying the first user in the access to one or more properties (e.g., one or more particular properties indicated by the first user, optionally selected by the first user from one or more suggested candidate properties determined by the component for the first user based on the gathered information of block 215), including to optionally select one or more of the candidate users to participate in the access with the first user or to receive an opportunity to participate in the access—in situations in which the component determines one or more suggested candidate properties for the first user in block 220, the operations in block 220 may further include presenting some or all of the suggested candidate properties to the first user and optionally receiving a selection by the first user of one or more particular indicated properties from those candidate properties. If there are multiple particular indicated properties, whether from information provided from block 215 and/or based on selections of candidate properties made by the first user in block 220, the routine may further in block 220 determine whether a single second user is to accompany the first user in the access to all of the multiple indicated properties (e.g., based at least in part on information about locations of the indicated properties, attributes of the candidate second users, a request of the first user, etc.) or to use multiple different candidate second users for different subsets of the multiple indicated properties (with each subset including at least one of those multiple indicated properties), while in other embodiments the determination of whether to use one or multiple such second users may instead be made based in part or in whole on subsequent interactions with the candidate second users (e.g., to use a single second user if one is identified that is available for the access to all of the multiple indicated properties, or to instead use one or more other criteria). The routine in block 220 in the illustrated example embodiment further determines one of multiple alternative interaction techniques for interacting with one or more of the candidate users (e.g., a single interaction technique to use with all the candidate users), such as corresponding to blocks 235, 245 and 270, and such as based at least in part on the gathered information about the first user (e.g., past interactions with the first user, such as to only use the immediate interactive electronic confirmation interaction technique of block 235 if the first user does not have a history of canceling or missing scheduled accesses and/or if one or more other indicated criteria are satisfied for the first user) and/or about the second users (e.g., if there are multiple candidate users that are selected or otherwise available, optionally separated into multiple groups of related or affiliated second users), to only use the immediate interactive session technique of block 245 if there is a single candidate second user to participate in the session (e.g., a highest ranked candidate second user from block 220), etc. FIG. 3B provides one example of a routine for the APACM Multiple User-System Access Coordinator component, such as to invoke that routine from block 220 and return to block 220 (optionally with output of that routine) before proceeding with the scheduling activities involving the first user, whether in a synchronous manner (e.g., by waiting for the response before performing any other automated operations) or in an asynchronous manner (e.g., in which the routine 200 continues to perform other operations, such as for a different first user, while waiting for the response).

After block 220, the routine continues to block 230, where it determines if the interaction technique determined in block 220 includes performing an immediate interactive electronic confirmation of at least one of the candidate second users to participate in the access to at least one indicated property for the first user, such as by successively contacting candidate second users in a determined order until identifying a first such contacted second user that agrees to the participation, and such as in an order that is determined based on the rankings or other evaluations of block 220 and/or in a different manner (e.g., random). If so, the routine continues to block 235, where it uses the APACM Candidate Daisy Chain Access Scheduler component to, for the one or more indicated properties (or for each separate subset of multiple indicated properties determined to have a different second user), identify one of the alternative candidate users to participate as the second user in the access to that indicated property with the first user, and with one example of a routine for the APACM Candidate Daisy Chain Access Scheduler component being shown in FIG. 3C, such as to invoke that routine from block 235 and return to block 235 (optionally with output of that routine) before proceeding with the scheduling activities involving the first user, whether in a synchronous or asynchronous manner. After block 235, the routine continues to block 240 to determine whether the operations of block 235 succeeded in identifying one or more candidate second users to participate in the access for the indicated one or more properties, and if so continues to block 280.

If it is instead determined in block 240 that the operations of block 235 did not succeed in identifying one or more candidate second users to participate in the access for the indicated one or more properties, or in block 230 that the determined interaction technique to use was not the immediate interactive electronic confirmation, the routine continues instead to block 250, where it determines if the determined interaction technique is to use an immediate interactive electronic communication session between the first user and a selected candidate second user, and if so continues to block 245. In block 245, the routine uses the APACM In-Application Access Scheduler component to initiate an immediate interactive electronic communication session between the first user and the selected candidate second user in which the second user uses his or her APACM client application to perform a real-time confirmation of a selected availability time for each of the one or more indicated properties, such as by the client application making API calls to a property availability server device/system to determine current availability times and to receive a confirmation of a requested reservation for the scheduled access for a selected availability time for each of the one or more indicated properties. One example of a routine for the APACM In-Application Access Scheduler component is shown in FIG. 3A, such as to invoke that routine from block 245 and to return to block 245 (optionally with output of that routine) before proceeding with the scheduling activities involving the first user, whether in a synchronous or asynchronous manner. If the operations of block 245 are unable to determine a confirmed scheduled access with a first selected candidate user (e.g., due to the one or more indicated properties not having any availability times at which the first user and/or the candidate second user are available), the routine may in some embodiments return to block 205 via block 295, such as perform the confirmed scheduled access for the first user using a different candidate second user(s) and/or interaction technique, or may instead repeat block 245 (not shown) using a different selected candidate second user. After block 245, the routine continues to block 280.

If it is instead determined in block 250 that the determined interaction technique is not to perform an immediate interactive electronic communication session between the first user and a selected candidate second user, the routine continues instead to block 280 where it uses an alternative interaction technique to contact at least one candidate second user and to obtain confirmation from one or more of the contacted candidate second users to participate in the scheduled access to the one or more indicated properties. As one non-exclusive example, the routine in block 270 may do a broadcast to the APACM client applications on the client computing devices of some or all possible candidate second users to provide an opportunity to participate in the access with the first user, and select the one or more candidate second users for the scheduled access based on their responses (e.g., on a first-come first-served basis, using one or more other criteria, etc.). As another non-exclusive example, the routine in block 270 may initiate telephone calls (e.g., VoIP telephone calls) to one or more of the candidate second users to contact them, whether concurrently or serially, to obtain the confirmation. Other interaction techniques may be used in other embodiments and situations. After block 270, the routine continues to block 280.

In block 280, after the access has been scheduled for a group of users including the first user in one of the blocks 235, 245 or 270, the routine optionally further uses the APACM Multiple User-System Access Coordinator component to perform further activities involved in coordinating the scheduled access, such as to track user locations for some or all of the users in the group before the scheduled access begins (e.g., during a defined time period before the first reserved availability time for the scheduled access) and to provide corresponding notifications and/or updates to some or all of the users of the group and/or to one or more other users (e.g., to notify an owner or tenant at a property when some or all users of the group are approaching, such as if the owner or tenant is to leave the property before the scheduled access), and with one example of a routine for the APACM Multiple User-System Access Coordinator component being further shown in FIG. 3B. After block 280, the routine continues to block 285 to store information from the operations 220-280 and optionally perform further activities based on it (e.g., to analyze information from multiple scheduled accesses, such as to determine trends or to perform other analytics activities).

If it is instead determined in block 210 that the instructions or other information received in block 205 are not related to scheduling access for a first user to one or more properties, the routine continues instead to block 290 to perform one or more other indicated operations as appropriate. Non-exclusive examples of such other operations may include one or more of the following: to receive and store information about particular properties; making changes to existing scheduled access to an indicated physical property (e.g., to reschedule or cancel the access) and/or to update the scheduled access with information from a third user that controls access to the indicated physical property (e.g., to verify availability of the third user to attend the scheduled access, to indicate changes to instructions for performing the scheduled access or to other information about the scheduled access, etc.); to receive and respond to other interactions of users with their APACM client applications or otherwise with a GUI of the APACM system, including to receive and store information about particular users (e.g., to provide information about determined trends in accesses scheduled for and/or performed for a group of physical properties, such as a group that includes one or more indicated physical properties and other physical properties that are similar to or otherwise related to the one or more indicated physical properties; to provide information to a first user and/or a second user about prior activities involving a particular indicated physical property, such as prior traffic involving other first users and/or second users that access that indicated physical property, changes to price of or specified conditions for or other information for that indicated property, etc.; to assist in performing serial scheduled access to a group of multiple physical properties by a first user and one or more second users, including to predict travel times and to identify corresponding candidate second users and to identify candidate physical properties for some or all of the multiple physical properties, such as to use tracked or gathered information about a first user to generate and provide suggested candidate properties or other suggestions to the first user and/or to a second user interacting with the first user; to manage updates to calendar data for a first user or second user or third user or other user; to receive notes or other information from a first user or a second user in their APACM client application and to save them for later access, such as in an account of the APACM system maintained for that user; etc.); to perform further automated operations during or after a scheduled access to an indicated property (e.g., to gather feedback from some or all users of a group participating in the access and/or to provide such feedback to others, such as one or more third users who control the indicated property); to set reminders or other alerts related to a scheduled access; to determine one or more specified conditions for use in one or some or all scheduled accesses to an indicated physical property, such as based on other conditions specified for other properties that are similar to or otherwise related to the indicated physical property, and/or on other conditions specified by a third party that controls access to the indicated physical property for other physical properties controlled by the third party, and/or on attributes specific to a first user and/or to a third user involved in the scheduled access such as to reflect issues that have previously arisen for the first user and/or the second user in prior scheduled accesses to other properties and/or in other activities, etc.; to monitor a telephone call between a first user and a second user, such as to use speech recognition to determine a particular indicated physical property for which the users agree to schedule access and/or to determine one or more particular indicated availability times at which the users agree to schedule access; to interact with one or more other computing systems to update calendar information related to a scheduled access; etc.

After blocks 285 or 290, the routine continues to block 295 to determine whether to continue, such as until an explicit indication to terminate is received, or instead only if an explicit indication to continue is received. If it is determined to continue, the routine returns to block 205 to wait for additional instructions or information, and otherwise continues to block 299 and ends.

While not illustrated with respect to the automated operations shown in the example embodiment of FIG. 2, in some embodiments, the routine may perform multiple activities in an asynchronous manner, such as to simultaneously support multiple acquirer showing agent users (e.g., via client application programs executing on client computing devices of the users or other GUI interfaces provided to the users) and/or multiple listing agent users (e.g., via client application programs executing on client computing devices of listing agents or other GUI interfaces provided to listings agent users, whether the same or different client application programs or other GUI interfaces provided to acquirer showing agent users) and/or multiple acquirer users (e.g., via a Web site or client application program executing on a client computing device of an acquirer or other GUI interface provided to an acquirer user, whether the same or different client application programs or other GUI interfaces provided to acquirer showing agents and/or listing agents). In addition, in some embodiments, human users may further assist in facilitating some of the operations of the APACM system, such as for operator users to provide input of one or more types that is further used in subsequent automated operations.

FIG. 3A illustrates an example embodiment of a flow diagram for an APACM In-Application Scheduler component routine 300 in accordance with embodiments of the present disclosure. The routine may be performed by, for example, execution of the APACM In-Application Scheduler component 133 of FIG. 1 in communication with a client computing device 185 of an acquirer showing agent user 110 and/or of a listing agent user 110, and/or an APACM system as described with respect to FIGS. 5A-7B and elsewhere herein, such as to perform automated operations related to responding to a request from a first user (e.g., an acquirer user) to schedule access to an indicated property that is controlled by one or more unaffiliated third users (e.g., one or more owners and/or tenants and/or listing agents). The routine 300 may, in at least some embodiments, be invoked from block 245 of routine 200 of FIG. 2, and return to that block.

The illustrated embodiment of the routine 300 begins at block 305 where it receives information regarding scheduling access of at least a first user and a selected second candidate user to one or more indicated properties under control of one or more third users (e.g., one or more unaffiliated third users). After block 305, the routine continues to block 310 where, if there are multiple indicated properties and multiple selected candidate users each associated with one or more of the multiple properties, the routine selects the next one or more indicated properties having the same indicated selected candidate second user, beginning with the first. After block 310, the routine continues to block 312, where it initiates a telephone call (e.g., a VoIP call) or other ongoing interactive electronic communication session between a client device of the first user and a client device of the selected candidate second user, and optionally sends a push notification to an APACM client application on the device of the second user to initiate interaction of the second user with the client application, as well as to optionally send one or more electronic communications to the client device of the second user with information about the selected one or more indicated properties and one or more availability times indicated by the first user as being alternatives for the scheduled access. After block 312, and in order to support ongoing interactions between the APACM client application on the client device of the second user with the APACM system and/or with a separate property availability server device/system, the routine in block 315 optionally opens one or more Web sockets between the client application and the APACM system and/or the separate property availability server device/system. In embodiments and situations in which the APACM client application interacts directly with the property availability server device/system as part of further activities involved in scheduling the access to the one or more selected indicated properties without further immediate interactions with the APACM system, the routine may proceed to block 330.

In block 317, the APACM system and/or the property availability server device/system receive one or more electronic communications from the APACM client application of the candidate second user, and proceed to block 320 to determine if the electronic communication(s) include an API call or other request from the client application for more information (e.g., about an indicated property), optionally using an opened Web socket. If so, the routine continues to block 322, where the APACM system and/or the property availability server device/system receives the request, and sends one or more response electronic communications to the client application (e.g., using an open Web socket) with the requested information, for display or other use by the client application. After block 322, or if it is instead determined in block 320 that the electronic communication(s) received in block 317 do not include a request for more information, the routine continues to block 325 to determine if the electronic communication(s) received in block 317 include an API call or other request from the client application to reserve an indicated availability time for scheduled access to an indicated property, optionally using an opened Web socket. If so, the routine continues to block 327, where the APACM system and/or the property availability server device/system receives the request, and sends one or more response electronic communications to the client application (e.g., using an open Web socket) with corresponding confirmation information after the indicated availability time is reserved for the scheduled access (or to indicate an inability to reserve the selected availability time, such as to prompt the APACM client application to send a subsequent request to schedule access for another selected availability time). The routine in block 327 may further optionally update calendar information for the first user and/or the second user and/or one or more other users, such as one or more third users that control the one or more selected properties and need to take action at or near the time of the scheduled access. While not illustrated in FIG. 3A, various other electronic communications may occur between the client application and the APACM system and/or the property availability server device/system, and various electronic communications may occur in various orders.

After block 327, or if it is instead determined in block 325 that the electronic communication(s) received in block 317 are not to schedule the access at an indicated availability time, the routine continues to block 329 to determine if there are more electronic communications between the client application and the APACM system and/or the property availability server device/system related to the selected one or more indicated properties (e.g., until a termination request is received and/or a timeout occurs), and if so returns to block 317 to await a next electronic communication. Otherwise, the routine continues to block 330 to determine if there are one or more additional indicated properties having a different indicated candidate second user that have not yet been selected, and if so returns to block 310 to select a next such group of one or more indicated properties with a different indicated second user. Otherwise, the routine continues to block 332 to optionally close any Web sockets opened in block 315, and then continues to block 397 and returns (e.g., to return to the flow of routine 200 of FIG. 2 if routine 300 is invoked at block 245 of routine 200).

Figure 6A:
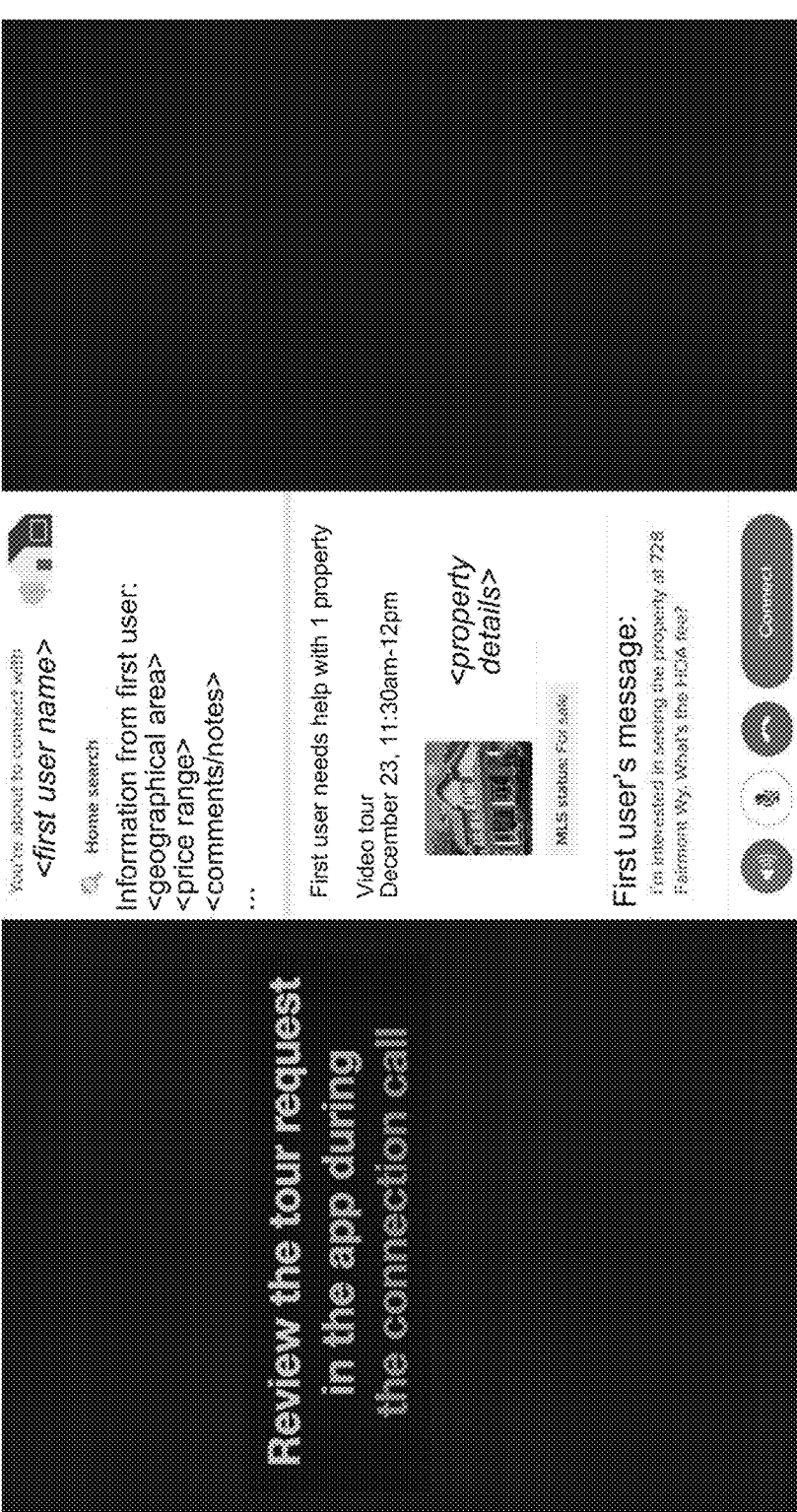

In one non-exclusive embodiment, the client application(s) in the routine of FIG. 3A use REST (REpresentational State Transfer) HTTP-based API calls to gather various details from the APACM system's server device/system and/or the property availability server device/system and present them to the user of the client application. For example, as the telephone call or other ongoing interactive electronic communication session between a first user and a candidate second user progresses, the client application may receive more details via a silent push notification from the server(s), such as to trigger the client application to make further REST API calls to the server devices/systems to fetch availability status for one or more availability times selected by the first user, and to make one or more additional REST API calls to confirm a scheduled access for an indicated property once one of those availability times are selected. The client application may further use Web sockets to increase the speed of the exchange of real-time information between the client application and the server devices/systems. In a situation in which such a silent push notification does not arrive at the client application within a specified time frame, the client application in this non-exclusive embodiment uses efficient polling as a backup, such as by controlling the frequency between successive network requests and limiting how many total requests the client application will make (e.g., for a total interactive session, for a period of time, etc.)—such parameters may, for example, be configured from the remote server devices/systems, and may optionally be dynamically modified for a particular client application and interactive electronic communication session to provide desired performance. If used, the Web sockets may provide a better delivery mechanism between the server devices/systems and a client application than silent push notifications or other HTTP-based network requests, such as to reduce latency and/or improve speed, and silent push notifications and/or efficient polling may be used only if Web sockets are not in use. In addition, in some situations of the non-exclusive embodiment, initial requests for more information (e.g., in block 322) may obtain information about the current selected indicated property(ies) and/or the first user (e.g., first user's name, notes from the first user, MLS status, street address, zip code, price, etc.), such as to enable the candidate second user to determine whether to accept the opportunity to participate in the access, and optionally with the telephone call or other connection between the candidate second user and the first user only being established after the candidate second user accepts the opportunity (e.g., with the APACM system then assigning the first user to the candidate second user and sending additional information to the client application via silent push notification or otherwise, such as the first user's email, phone number and other information used by the candidate second user to request property availability times). Furthermore, the non-exclusive embodiment may in some situations include two silent push notifications, with the first one indicating that the first user and candidate second user have begun communicating via the telephone call or other interactive electronic communication session (e.g., their audio streams were connected), such as to signal the client application to reveal the first user's name and/or contact information (e.g., phone number, email address, etc.), and with the second push notification arriving soon afterwards (e.g., within a few seconds of the first notification) and including additional data, with non-exclusive examples including the following: a contact ID for the first user (e.g., if the first user is assigned a unique ID in an APACM account of the candidate second user once he/she accepts the opportunity, such as by pressing a green connect button as shown in the example of FIG. 6A); messageId (e.g., a unique ID assigned to an inbox message added to an inbox in the account of the candidate second user); connectionId (e.g., a unique ID representing the connection with the first user); an array of objects that contains zpid, appointmentId, and primary (e.g., Zpid, such as a unique property ID representing a listing on a Web site of the APACM system; appointmentId, such as an appointmentId used to make a reservation for scheduled access; and primary, such as a Boolean value to indicate whether the associated property is a primary one of interest to the first user), and with the array provided for each property indicated by the first user, optionally up to a defined upper limit (e.g., 10 properties); etc. The client application may then use the contactID to make one or more subsequent API calls (e.g., an HTTP GET call) to retrieve availability times for the associated property.

FIG. 3B illustrates an example embodiment of a flow diagram for the APACM Multiple User-System Scheduler component routine 335 in accordance with embodiments of the present disclosure. The routine may be performed by, for example, execution of the APACM Multiple User-System Scheduler component 135 of FIG. 1, and/or an APACM system as described with respect to FIGS. 5A-7B and elsewhere herein, such as to perform automated operations related to determining alternative candidate users to act as a second user to accompany a first user as part of a scheduled access to one or more indicated properties, as well as to optionally provide additional functionality (e.g., determine and provide suggested candidate properties for a first user, track user locations and provide related functionality, etc.). The routine 335 may, in at least some embodiments, be invoked from blocks 220 and/or 280 of routine 200 of FIG. 2, and return to the block from which it was invoked.

The illustrated embodiment of the routine 335 begins at block 337, where instructions or other information is received. The routine continues to block 340 to determine if a request or instructions are received to determine alternative candidate second users and optionally candidate properties for a first user, and if not continues to block 361. Otherwise, the routine continues to block 342, where it receives information from interactions with the first user related to one or more properties of interest (e.g., one or more particular indicated properties, information about types of properties of interest, etc.), optionally including one or more indicated availability times for one or more particular indicated properties. The routine then continues to block 344 to determine whether to identify and suggest candidate properties to the first user, such as if there are not any particular indicated properties yet, or if the request or instructions otherwise indicates to do so (e.g., for use in a scheduled access to multiple properties that may include at least one initially indicated property and one or more additional suggested properties), and if not continues to block 346 to identify the one or more particular properties previously indicated by the first user in the received information. After block 346, the routine continues to block 348 to determine if the first user has indicated one or more availability times for the particular indicated properties, and if not continues to block 352. If it is instead determined in block 344 to determine and provide one or more suggested candidate properties to the first user, the routine continues instead to block 350, where it analyzes the received information about the first user to determine one or more candidate properties for the first user. After block 350, or if it is determined in block 348 that the first user has not provided indicated availability times for one or more particular indicated properties, the routine continues to block 352, where it retrieves real-time availability information for the property(ies) indicated by the first user and/or the candidate properties determined in block 350, and provides information for presentation to the first user about the real-time availability information for the particular indicated properties and/or suggested candidate properties. In block 354, the routine then receives selections by the first user of one or more availability times for one or more indicated properties, whether the particular indicated property(ies) selected in block 346 and/or one or more of the suggested candidate properties that are indicated by the first user in block 354.

After block 354, or if it is instead determined in block 348 that the first user has previously indicated one or more availability times, the routine continues to block 356 to retrieve information about a plurality of alternative candidate second users to accompany the first user in access to the indicated one or more properties and who are each authorized to participate in the access (e.g., by being showing agent users), optionally in accordance with one or more specified conditions (e.g., as specified by the first user, such as corresponding to languages spoken or other attributes of the second user; as specified by one or more third owners who control at least one of the indicated one or more properties, such as to restrict access to groups that include a specified listing agent third user and/or that include at least one showing agent second user; etc.). The routine further in block 356 evaluates the candidate users according to one or more criteria, including in some embodiments to use a trained machine learning model to consider a combination of multiple factors (e.g., a candidate second user's current location and travel time to a separate location of a first indicated property, such as if the scheduled access may occur immediately or soon on the same day based on the indicated availability times from the first user; other attributes of the second user, such as based on past experience and/or activities involving other scheduled access to other properties with other first users; etc.). The routine may further in block 356 optionally select one or more particular candidate second users to receive an opportunity to participate in the scheduled access with the first user, such as based on their corresponding determined rankings or other evaluations (e.g., a highest ranked candidate second user to receive a first such opportunity). After block 356, the routine continues to block 358 to optionally determine at least one of multiple interaction techniques for interacting with the candidate second users, such as based at least in part on information about the first user (e.g., from one or more prior interactions with the first user) and/or on information about one or more selected candidate second users (e.g., preferences, defined status from prior interactions involving scheduled accesses, etc.). After block 358, the routine continues to block 360 to provide indications of some or all of the candidate second users and optionally their evaluations, and of the determined interaction technique.

If it is instead determined in block 340 that the instructions or other information received in block 337 are not related to determining one or more selected candidate second users, the routine continues to block 361 to determine if the instructions or other information received in block 337 are to perform location-based tracking for a previously scheduled access, and if so continues to block 362 to obtain information about the scheduled access of a group of multiple users to one or more properties, to retrieve information about those users' client devices, to determine one or more types of location-based tracking to perform, and to perform interactions with the client devices to initiate the tracking. In block 363, the routine subsequently receives tracking information from one or more of the client devices and performs related follow-up activities, such as to determine and use travel time information based on a user's current location that is not at the separate location of an indicated property for the scheduled access in order to identify if the user is early or late for the scheduled access, to provide notifications and or updates related to such location-based tracking (e.g., related to rescheduling or canceling of the scheduled access, to provide predicted arrival times, etc.), to reschedule or cancel the scheduled access if one or more such users will not be available for the scheduled access, etc. If it is instead determined in block 361 that the instructions or other information received in block 337 are not related to doing location-related tracking, the routine continues to block 364 to perform one or more other indicated operations as appropriate (e.g., to determine and provide suggested candidate properties for a first user before the first user has initiated a request to schedule access for at least one property, etc.).

After blocks 360, 363 or 364, the routine continues to block 398 and returns (e.g., to return to the flow of routine 200 of FIG. 2 if routine 335 is invoked at block 220 or 280 of routine 200).

In one non-exclusive embodiment, the routine of FIG. 3B allows a buyer to digitally book a scheduled house access by automating the complex matching and scheduling process across multiple users, such as four users (home buyer, buyer agent, seller agent, and seller), multiple software systems, and many complex steps to request and confirm (e.g., in 60 minutes or less) the scheduled access for a selected availability time. As part of doing so, the routine may perform activities related to one or more of the following: determining and using real-time property availability information (e.g., to check eligibility of a house for instant booking using the immediate scheduling activities of blocks 235 and/or 245 of FIG. 2, such as based on market, agent availability, house availability, etc.; calculate the open times available, such as based on selected availability times for previously scheduled accesses, lead time required, time zones, etc.; allow a user to request a specific set of availability times for a given house; etc.); performing related request routing (e.g., to validate the quality of a lead involving a first user based on one or more of user-provided answers to qualification questions, user contact information, analytics and other known data about the user, etc.; to route the request using one of multiple possible interaction techniques; etc.); to perform matching for a first user to candidate second users (e.g., acquirer showing agent users), such as by routing the request to an appropriate set of candidate second users based on program eligibility and the geographic market, and determine a prioritized ranked list of candidate second users to match to the request using a ranking algorithm (e.g., based on candidate second users quality, capacity, lead pacing, etc.); performing scheduled access reservation and confirmation, such as to notify the next candidate second user to confirm the request via a mobile APACM client application with an automated VoIP process (until an available candidate second user is able to confirm), and once the request is confirmed by a candidate second user, to complete the scheduling of the access for a group including that second user. In some embodiments, the routine may further use one or more of the following: a bidding system for allowing first users to bid money and/or tokens for obtaining scheduled access to desirable houses first (e.g., if desirable houses do not stay on the market for a long time, first users are motivated to access newer houses first and make offers quickly); discard overbookings; detect fake bookings; doing candidate second user/first user matching; etc. Such candidate second user/first user matching may be based on one or more of the following: a first user likelihood score (e.g., likelihood of first user to transact, such as to match high intent first users with more efficient candidate second users); candidate second user score (e.g., whether they are good for first users participating in a property acquisition for a first time house buyers, or for investors, or for combination buyer-seller first users, etc.); affinity score between a first user and a candidate second user (e.g., using a trained machine learning model to match a first user to, based similar first users who work well with particular second users, similar candidate second users); etc. With respect to such an affinity score, one approach is to divide the first users into clusters using k-Means or k-Nearest-Neighbors with data from past first users, calculate second user affinity for each such cluster, and select the top N (e.g., 3) second users for each cluster to which to route future first user leads—if a second user has satisfied one or more criteria (e.g., filled their quota for a defined time period), the system moves on to the next second user in the list. Examples of types of data used to train such a machine learning model include one or more of the following: first user likelihood to perform an acquisition; first user browsing behavior (e.g., clickstream); first user past transactions/interactions with the APACM system; first user co-shopping behavior (e.g., are they browsing with someone); has the first user gone on a scheduled house tour access yet; is the first user pre-qualified for a loan; is this the first time the first user is buying a house via the APACM system; first user's self-stated knowledge level of the house buying process; first user's self-stated timeline to buy; candidate second user CSAT score (e.g., customer satisfaction score); quantity of sales the candidate second user has closed in the past 3 months; quantity of sales the candidate second user has closed in the past 6 months; quantity of sales the candidate second user has closed in the past 9 months; quantity of sales the candidate second user has closed in the past 12 months; quantity of sales the candidate second user has closed all time in the past; candidate second user WWR score (e.g., a work with rate score, such as based on a percentage of users that responded "Yes" to a 24-hour survey question confirming the user plans to continue working with the second user or a member of the second user's team of multiple related second users); candidate second user cumulative spend via the APACM system in the past 3 months and/or 6 months and/or 9 months and/or 12 months and/or all time; candidate second user's years of experience (e.g., bucketed); etc.

FIG. 3C illustrates an example embodiment of a flow diagram for an APACM Candidate Daisy Chain Scheduler component routine 365 in accordance with embodiments of the present disclosure. The routine may be performed by, for example, execution of the APACM Candidate Daisy Chain Scheduler component 137 of FIG. 1, and/or by an APACM system as described with respect to FIGS. 5A-7B and elsewhere herein, such as to perform automated operations related to responding to a request from a first user (e.g., an acquirer user) to schedule access to an indicated property, including using multiple sequential telephone call interactions (e.g., VoIP, or Voice over IP, calls) with multiple client computing devices of alternative candidate second users to prompt participation in the access. The routine 365 may, in at least some embodiments, be invoked from block 235 of routine 200 of FIG. 2, and return to the block from which it was invoked.

The illustrated embodiment of the routine 365 begins at block 366, where information is received regarding scheduling access for an indicated first user to one or more indicated properties at one or more availability times with one or more of multiple alternative candidate second users, and with the alternative candidate users optionally separated into multiple different groups (e.g., teams of multiple showing agent users working together at a particular brokerage or other organization) each including at least one of the candidate second users. The routine then continues to block 367 to select a next group of the candidate users, beginning with the first (e.g., a highest ranked group or a group that is selected in one or more other manners, such as randomly, and including selecting all of the candidate users if there is only one group), and to select a next candidate user in the selected group, beginning with the first (e.g., a highest ranked candidate user for the group; a first user that is selected in one or more other manners, such as randomly; etc.). The routine then continues to block 369 to initiate, to a client computing device of the current selected candidate user, a telephone VoIP call, optionally passing one or more data parameters in the call for an APACM client application on that client computing device. In block 371, the routine then determines if the current selected candidate user answers the call, and if not continues to block 379. Otherwise, the routine continues to block 373 to optionally send one or more audio transmissions over the call (e.g., about using the client application for further interactions related to the access), to optionally send one or more push notifications to the client computing device separate from the call to prompt the current candidate user to access and use the client application, and to send one or more further electronic communications separate from the call to the client application with information about at least one of the indicated properties and the one or more availability times, for display in the client application along with one or more user-selectable controls to decline participation in the access to the indicated at least one property with the first user, or to accept the participation at one of the availability time selected by the current candidate user (or, if there is only one indicated availability time, at that availability time).

After block 373, the routine continues to block 375 to determine if the user indicates to accept the participation at a selected availability time, and if so continues to block 377, or if the user instead declines the participation or a timeout is reached without a selection by the user, to continue to block 379. In block 377, the routine receives the participation acceptance from the current candidate user, and optionally proceeds to reserve the selected one availability time and confirm the scheduled access for that time along with updating the calendar information for the current candidate user and/or the first user for the selected one availability time. After block 377, the routine continues to block 390 to provide an indication of success and of the current candidate user and of the selected one availability time. Alternatively, if the current user has not accepted participation in the access, the routine in block 379 determines if there are more users in the current group, and if so continues to block 381 to select the next candidate user in the current selected group, and to return to block 369. Otherwise, the routine continues to block 383 to determine if there are more groups, and if so returns to block 367. If not, the routine continues to block 385 to, after attempting to obtain accepted participation by all of the candidate second users without initial success, determine whether to retry interactions with some or all of the candidate second users, such as all of the candidate second users that did not explicitly decline participation. If so, the routine continues to block 387 to remove the candidate users that explicitly declined participation, to reset the group and user selections to start over, and optionally wait a retry time (e.g., 5 to 15 minutes) before returning to block 367. If it is instead determined in block 385 not to perform a retry (e.g., after one or more previous retries, such as two previous retries; after all candidate second users have explicitly declined participation; if retries are not being used; etc.), the routine continues to block 389 to provide an indication of a lack of success. After blocks 389 or 390, the routine continues to block 399 and returns (e.g., to return to the flow of routine 200 of FIG. 2 if routine 365 is invoked at block 235 of routine 200).

In one non-exclusive embodiment, the routine of FIG. 3C allows a candidate second user 5 minutes to accept or decline a request to participate in a property access with a first user once they have answered the call; and suggests that such a candidate second user uses a displayed button (e.g., 'Pass to a Teammate' button) to refuse participating in a requested accept, does not accept participation for the request and then later reschedule, sends an introduction text/email after accepting participation in the request, contacts an alternative candidate user to fill in if their schedule changes and the cannot attend a scheduled property access, cancels a scheduled property access with the APACM system if it does not occur (e.g., using cancellation codes for tracking purposes), etc.

Figure 4A:
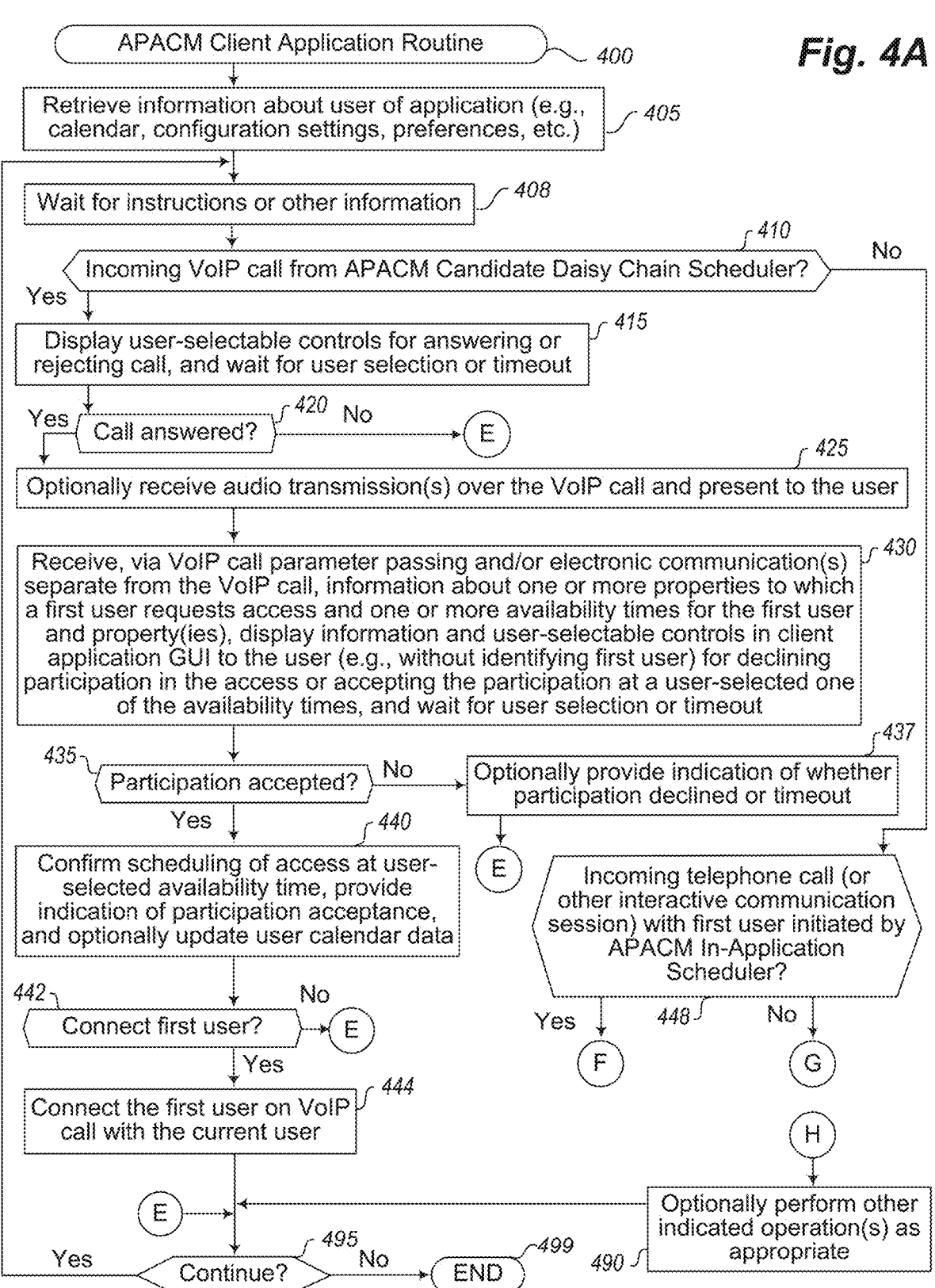
Figure 4B:
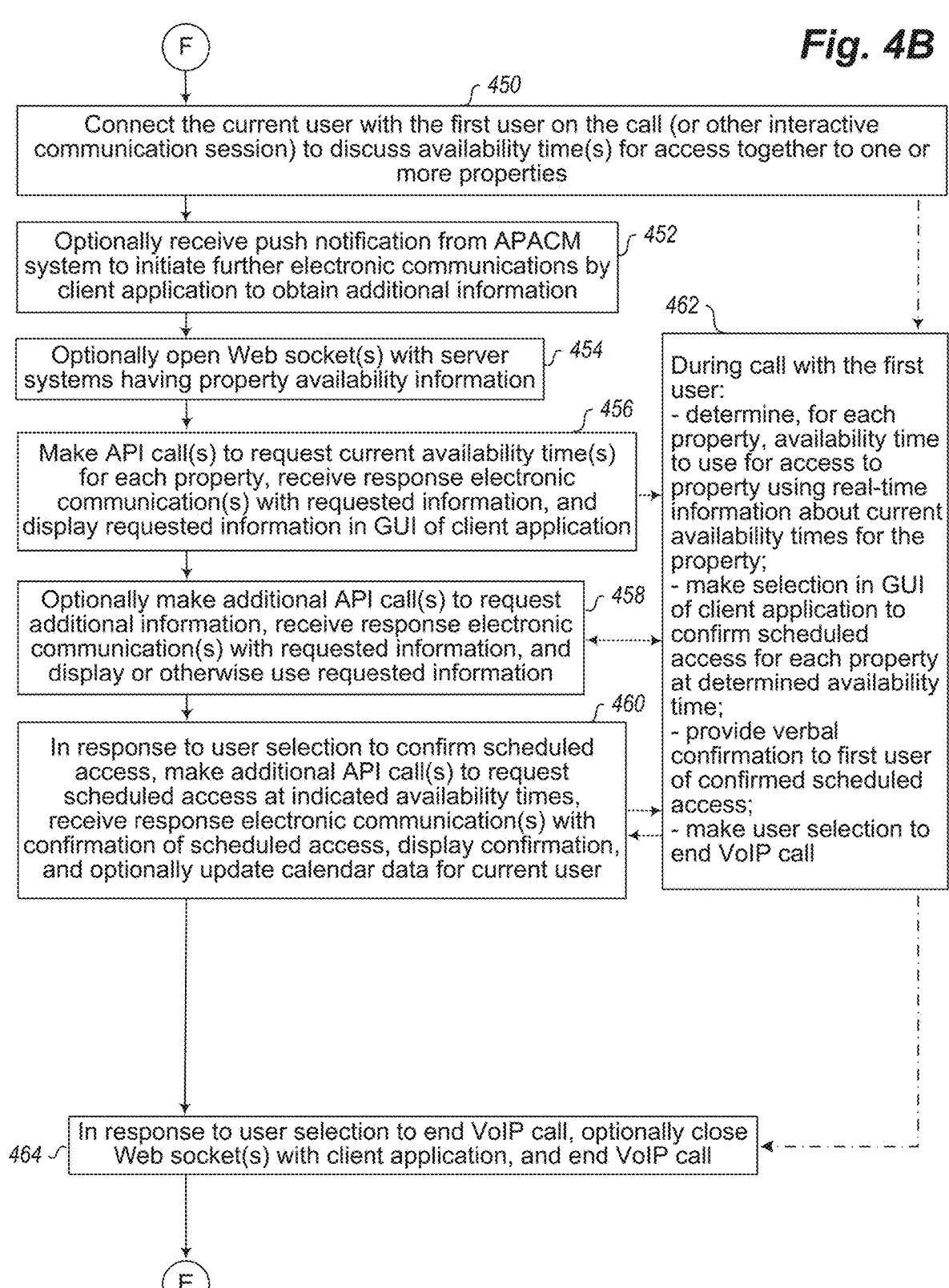

FIGS. 4A-4C illustrate an example embodiment of a flow diagram for the APACM Client Application routine 400 in accordance with embodiments of the present disclosure. The routine may be performed by, for example, execution of the APACM client application 154 of FIG. 1 on client computing device 185 and/or an APACM client application (not shown) on client computing device 165 of FIG. 1, and/or an APACM client application as described with respect to FIGS. 5A-7B and elsewhere herein, such as to perform automated operations related to supporting activities of a second user or first user in using the client application to interact with the APACM system and to otherwise receive functionality from automated operations of the APACM system, including interactions with the client application initiated by the APACM system components. In other embodiments, first and second users may use different client applications that provide different functionality and/or receive access to different functionality of the APACM system, such as for a first user to not receive access to functionality corresponding to incoming requests for a second user, and/or for a second user to not receive access to functionality corresponding to interactions with a first user.

The illustrated embodiment of the routine begins at block 405, where information is retrieved by the client application routine about a current user and client device on which the application executes, such as calendar information, configuration settings, preferences, etc. The routine then continues to block 408 to wait for instructions or other information. After receiving such instructions or information, the routine continues to block 410 to determine if the instructions or other information received in block 408 are an incoming VoIP call from the APACM Candidate Daisy Chain Scheduler component to a current second user, such as if the current user is a candidate second user for accompanying a first user in access to one or more indicated properties, and if not continues to block 448. Otherwise, the routine continues to block 415 to display user-selectable controls for answering or rejecting the call, proceeds to block 420 to determine if the call was answered using a corresponding one of the user-selectable controls, if not continues to block 495, and otherwise proceeds to block 425—in other embodiments, the display of the user-selectable controls for answering the incoming call may be handled by the client computing device separate from the client application, such that the routine proceeds directly to block 425 but only if the call is answered by the second user outside the control of the client application. In block 425 after the call is answered, the routine optionally receives one or more audio transmissions over the call and presents them to the user (or in alternative embodiments such audio transmissions are handled by the client device separately from the client application). In block 430, the routine receives, via VoIP call parameter passing and/or one or more electronic communications separate from the call, information about one or more properties to which a first user requests access and one or more availability times for the first user and the one or more properties, and displays the information to the second user in a GUI of the client application (optionally without identifying the first user) along with user-selectable controls for either declining participation in the access or for accepted participation at a user-selected one of the availability times (or at the only availability time, if only one is displayed), and waits for a selection by the second user or timeout. In block 435, the routine determines whether the user has selected to accept the participation, and if not proceeds to block 437 to optionally provide an indication to the APACM system of whether the participation was explicitly declined or the timeout was reached, before proceeding to block 495. Otherwise, the routine continues to block 440 to confirm scheduling of the access at the user-selected availability time, to provide an indication of the participation acceptance, and to optionally update calendar data for the second user reflecting the access. After block 440, the routine continues to block 442 to determine whether to connect the first user to the second user on the VoIP call, and if so proceeds to block 444 to make the connection, with the VoIP call being handled by the client computing device separately from the client application in at least some embodiments. After block 444, or if it is instead determined in block 442 to not connect the first user, the routine continues to block 495.

If it is instead determined in block 410 that the instructions or other information received in block 408 are not an incoming VoIP call from the APACM Candidate Daisy Chain Scheduler component for a second user, the routine in block 448 determines if the instructions or other information received in block 408 are an incoming telephone call (or other interactive electronic communication session) to a current second user with a first user as initiated by the APACM In-Application Scheduler component, such as if the current user is a candidate second user for accompanying the first user in a scheduled access to one or more indicated properties. If so, the routine continues to block 450 to connect the current user with the first user on the call (or other interactive electronic communication session), such as to enable discussion 462 of one or more availability times for use in access together to one or more indicated properties. In block 452, the routine optionally receives a push notification from the APACM system to initiate further electronic communications by the client application to obtain additional information from the APACM system, and in block 454 optionally opens one or more Web sockets with one or more devices/systems having property availability information (e.g., the APACM system's server devices/ systems if they implement a property availability server, a separate property availability server's devices/systems, etc.). In block 456, the routine then makes one or more API calls (e.g., using one or more open Web sockets) to request current availability times for each property, such as to the property availability server's devices/systems, receives one or more response electronic communications with the requested information, and displays the received information in the GUI of the client application. In block 458, the routine optionally makes one or more additional API calls (e.g., using one or more open Web sockets) to request additional information (e.g., from the APACM system), receives one or more response electronic communications with the requested information, and displays or otherwise uses the received information. In block 460, in response to a user selection to confirm a scheduled access at an indicated availability time for an indicated property, the routine makes one or more additional API calls (e.g., using one or more open Web sockets) to request the scheduled access, such as to the property availability server's devices/systems, receives a response electronic communication with confirmation of the scheduled access, displays the confirmation, and optionally updates calendar data for the current user to reflect the scheduled access. While not illustrated here, if the routine is unable to confirm scheduled access for the current user, the routine may perform other operations, such as to return an indication of a lack of success (e.g., to prompt the APACM system to select another candidate second user for which to schedule the access for the first user). In addition, concurrent with the interactions of the current user with the client application as indicated in blocks 452-460, the current user participates 462 in the telephone call (or other interactive electronic communication session) with the first user, such as to exchange information with the first user related to availability times for accessing each of one or more indicated properties (e.g., using real-time property availability information received in the client application), to provide a verbal confirmation to the first user of a confirmed scheduled access, to end the VoIP call after the scheduled access is been confirmed, etc. After block 460, such as in response to a user selection to end the VoIP call, the routine in block 464 optionally closes any previously opened Web sockets for the client application, and ends the VoIP call. After block 464, the routine continues to block 495.

If it is instead determined in block 448 that the instructions or other information received in block 408 are not an incoming communication session for a current second user with a first user as initiated by the APACM In-Application Scheduler component, the routine continues instead to block 466 to determine if the instructions or other information received in block 408 correspond to one or more interactions by a first user of the client application related to obtaining access to one or more properties. If so, the routine continues to block 468 to display a GUI on the client device, and to perform interactions with the first user to obtain information about the first user and/or about one or more properties of interest. In block 470, the routine then determines if a request has been received from the first user for access to one or more indicated properties, and if not, the routine continues to block 472 to obtain information about one or more suggested candidate properties for the first user, such as by one or more interactions with the APACM Multiple User-System Access Coordinator component, and to optionally present the information to the first user and optionally further receive one or more selections from the user of one or more indicated properties. After block 472, or if it is instead determined in block 470 that a request was received from the first user for access to one or more indicated properties, the routine in block 474 obtains real-time availability information for the properties (whether one or more properties indicated by the first user, and/or one or more suggested candidate properties), presents information to the first user in the GUI about the availability for the one or more properties, and receives one or more selections by the first user of one or more availability times for one or more indicated properties. In block 476, the routine then sends a request for access to the indicated property(ies) for at least one of the one or more availability times to the APACM system, and after the APACM system has performed activities to determine one or more candidate second users to accompany the first user for the selected access (optionally with a telephone call or other interactive electronic communication session between the first user and one or more such candidate second users), the routine receives confirmation of the scheduled access in block 478 for one or more indicated availability times and one or more indicated properties, and optionally updates calendar information for the first user corresponding to the scheduled access.

If it is instead determined in block 466 that the instructions or other information received in block 408 do not correspond to interactions with a first user to initiate property access, the routine continues instead to block 480 to determine if the information or other instructions received in block 408 indicate to perform location-related activities, and if so continues to block 482 to optionally receive tracking-related instructions or other information from the APACM system, to determine a current location of the client device (e.g., using GPS coordinates) and optionally perform additional location-related determinations (e.g., with respect to one or more defined geofences, such as to determine and report to the APACM system if they have been breached, or based on other location-based criteria), and to provide corresponding information to the APACM system. After block 482, the routine continues to block 495.

If it is instead determined in block 480 that the instructions or other information received in block 408 are not to perform a location-related activity, the routine continues instead to block 484 to determine whether the instructions or other information received in block 408 correspond to receiving a notification or other information update, and if so continues to block 486 to present the received information in the GUI and to optionally take further actions based on the received information. After block 486, the routine continues to block 495.

If it is instead determined in block 484 that the information or other instructions received in block 408 are not related to receiving a notification or other update, the routine continues instead to block 490 to perform one or more other indicated operations as appropriate. Non-exclusive examples of such other operations may include receiving and storing information about defined location-related tracking to be performed (e.g., defined geofences to check at specified times or repeatedly until otherwise notified), receiving and storing information about the user of the application (e.g., preferences, configuration settings, etc.), receiving and responding to other requests from the user and/or the APACM system and/or external systems for information or functionality, providing calendar-related alerts and reminders, etc.

After blocks 437, 444, 464, 478, 482, 486, or 490, or if it is instead determined in block 420 that a call is not answered, or in block 442 that the first user is not to be connected, the routine continues to block 495 to determine whether to continue, such as until an explicit indication to terminate is received, or instead only if an explicit indication to continue is received. If it is determined to continue, the routine returns to block 408 to wait for additional instructions or information, and otherwise continues to block 499 and ends.

FIGS. 5A-5G illustrate non-exclusive examples of one type of interactions of the APACM system with multiple candidate users as part of scheduling an in-person access to a physical property that includes multiple users traveling from disparate locations to the physical property, with the multiple candidate users being alternatives to participate as a second user (e.g., an acquirer showing agent user) for access with a first user (e.g., an acquirer user), and with the interactions involving respective client application programs executing on respective client computing devices of the multiple candidate users. The interactions of FIGS. 5A-5G may, for example, be controlled or otherwise managed by an example embodiment of an APACM Candidate Daisy Chain Access Scheduler component using multiple alternative candidate second users determined by an example embodiment of an APACM Multiple User-System Access Coordinator component, as described elsewhere herein.

Figure 5A:
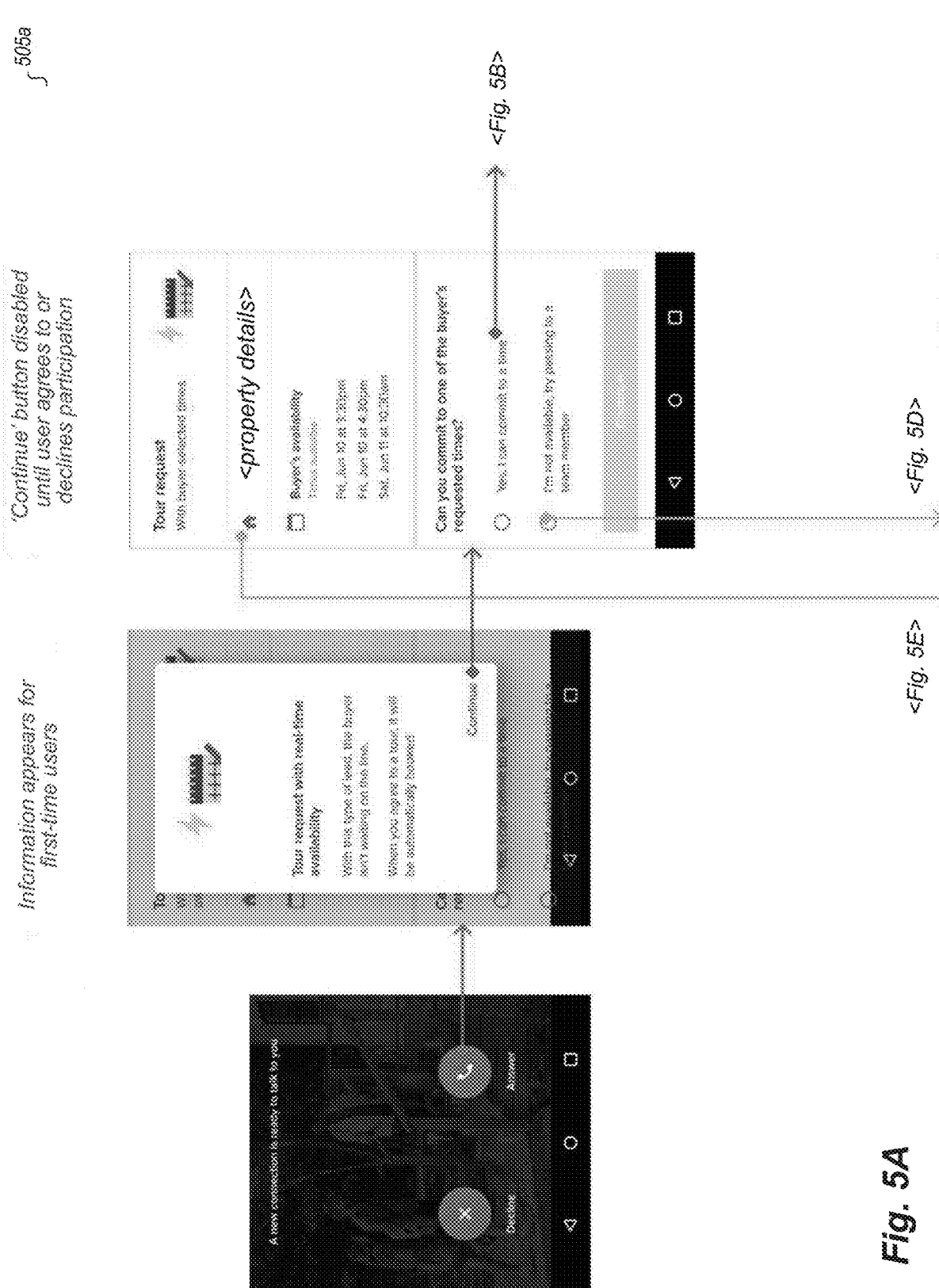
FIGS. 5A-5G illustrate examples of interactions of the APACM Candidate Daisy Chain Access Scheduler component with multiple alternative candidate users via APACM client application programs executing on client computing devices of the users as part of automated operations involving scheduling in-person access to a physical property that includes at least one of the alternative candidate users and a first user traveling from disparate locations to the physical property.
Figure 5B:
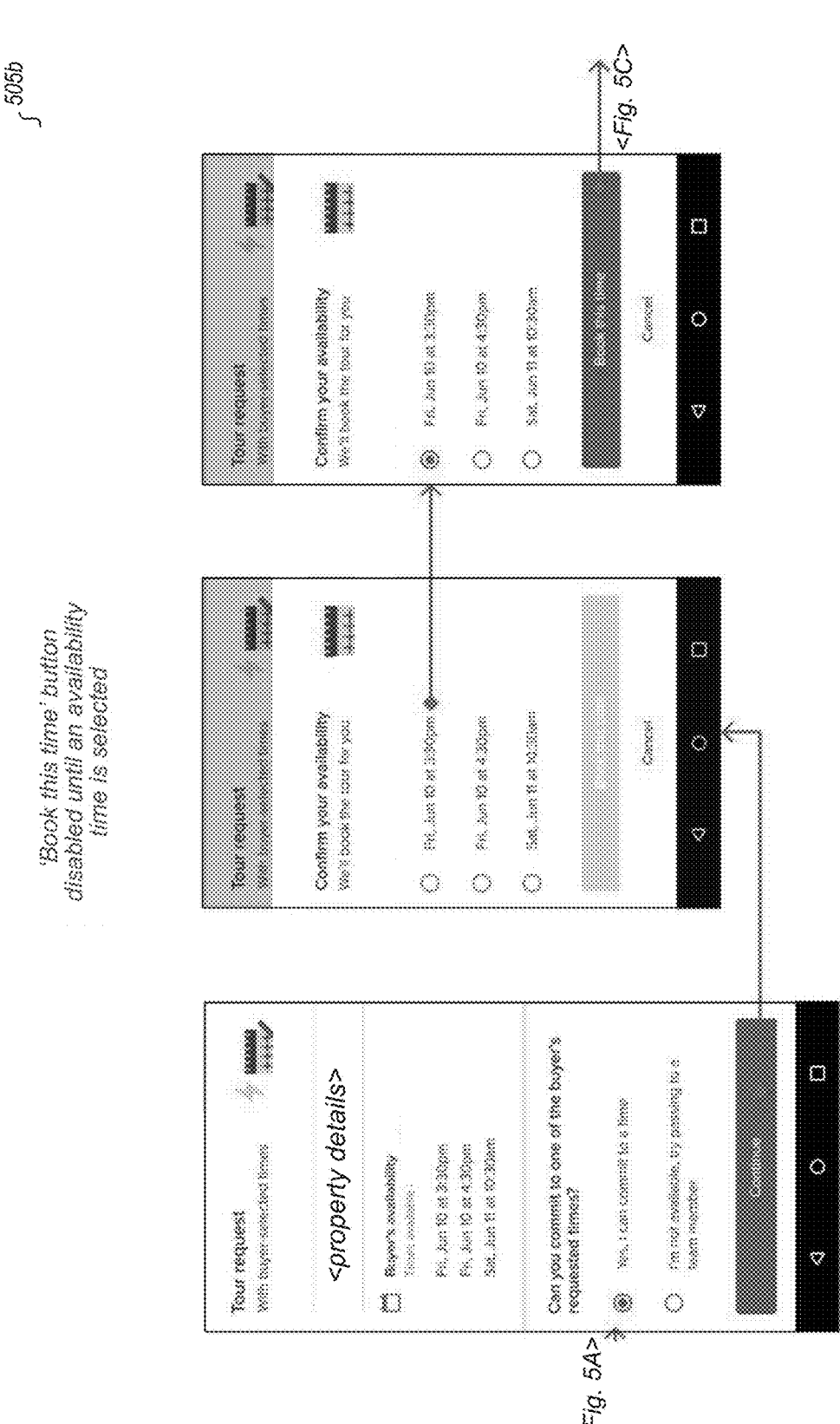
Figure 5C:
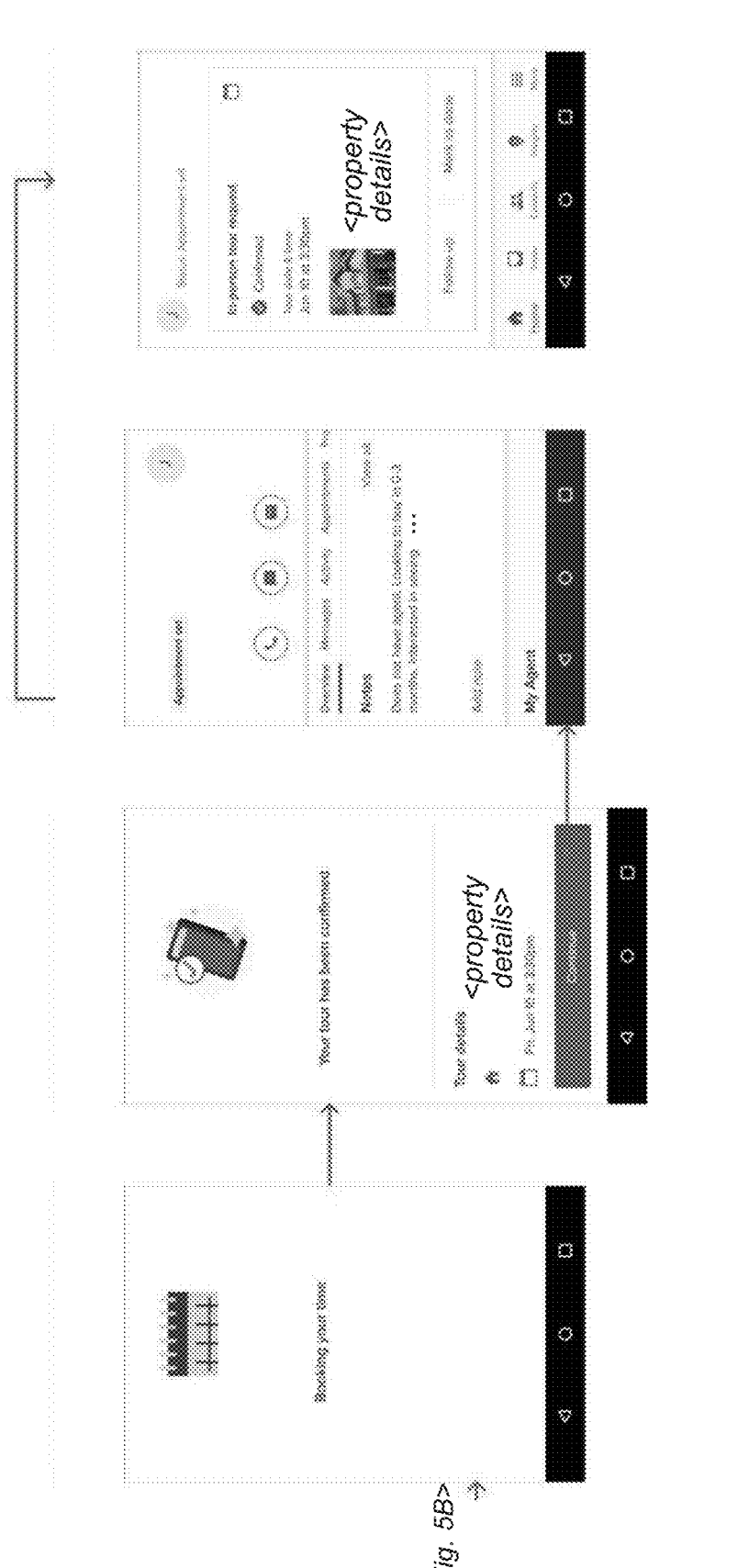
Figure 5D:
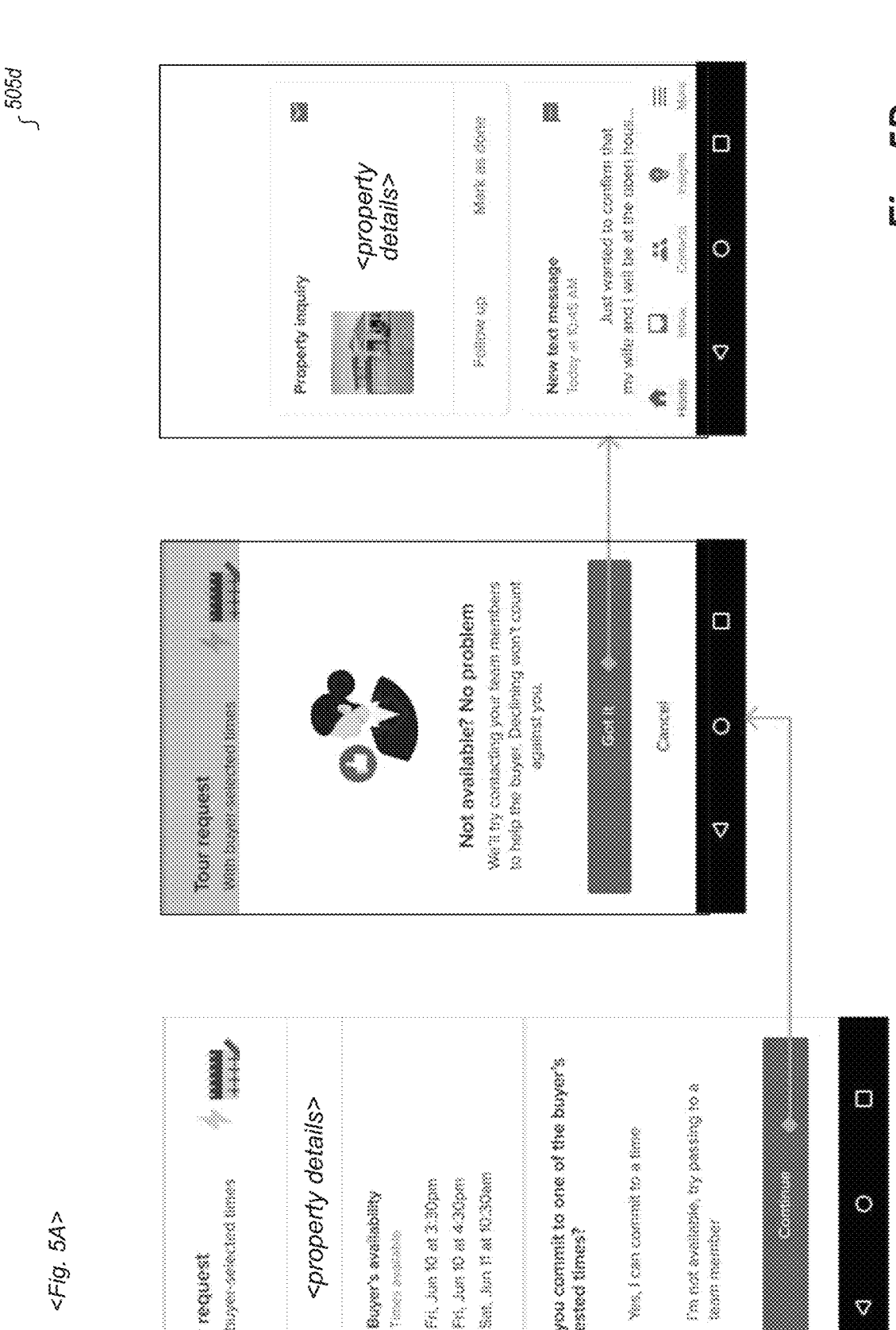
Figure 5E:
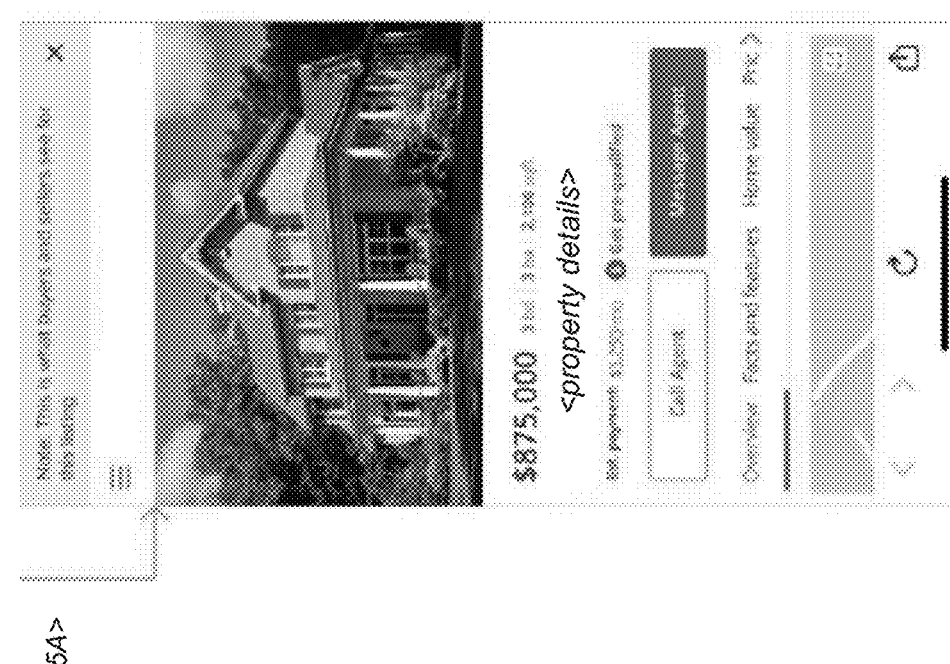
Figure 5F:
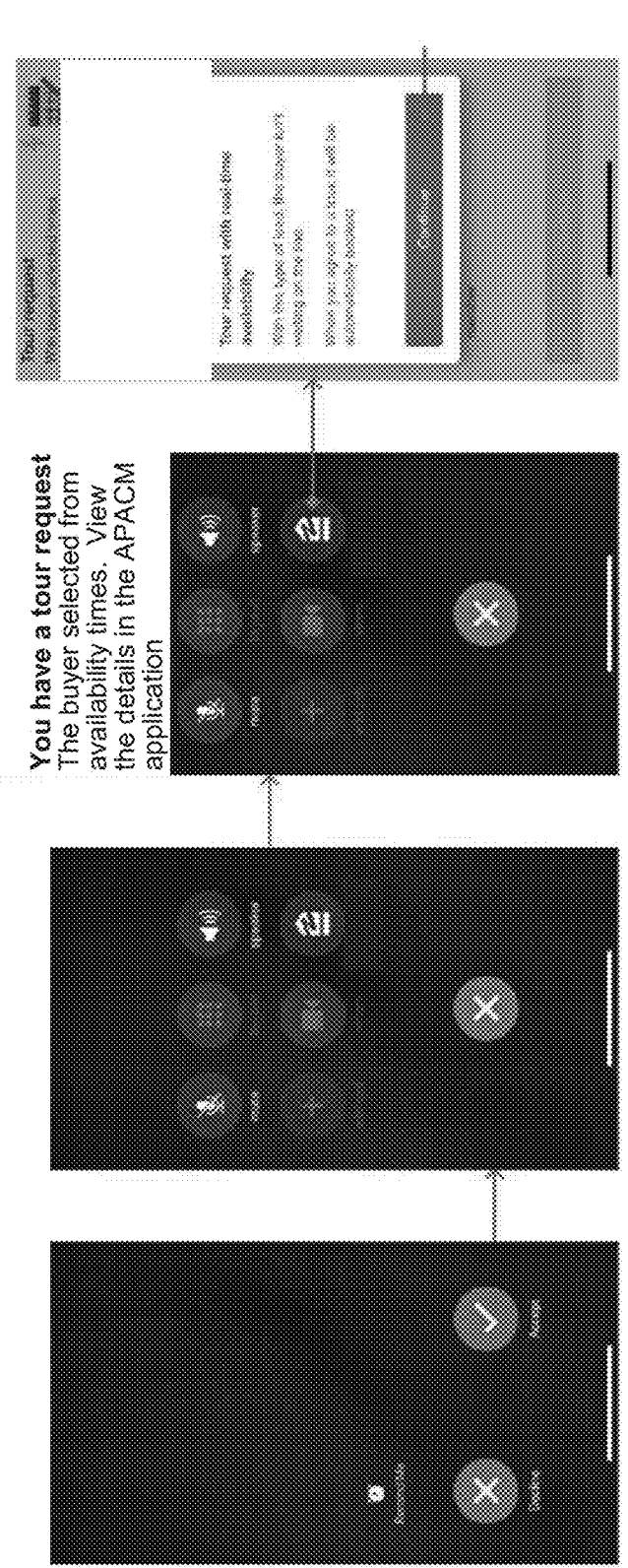
Figure 5G:
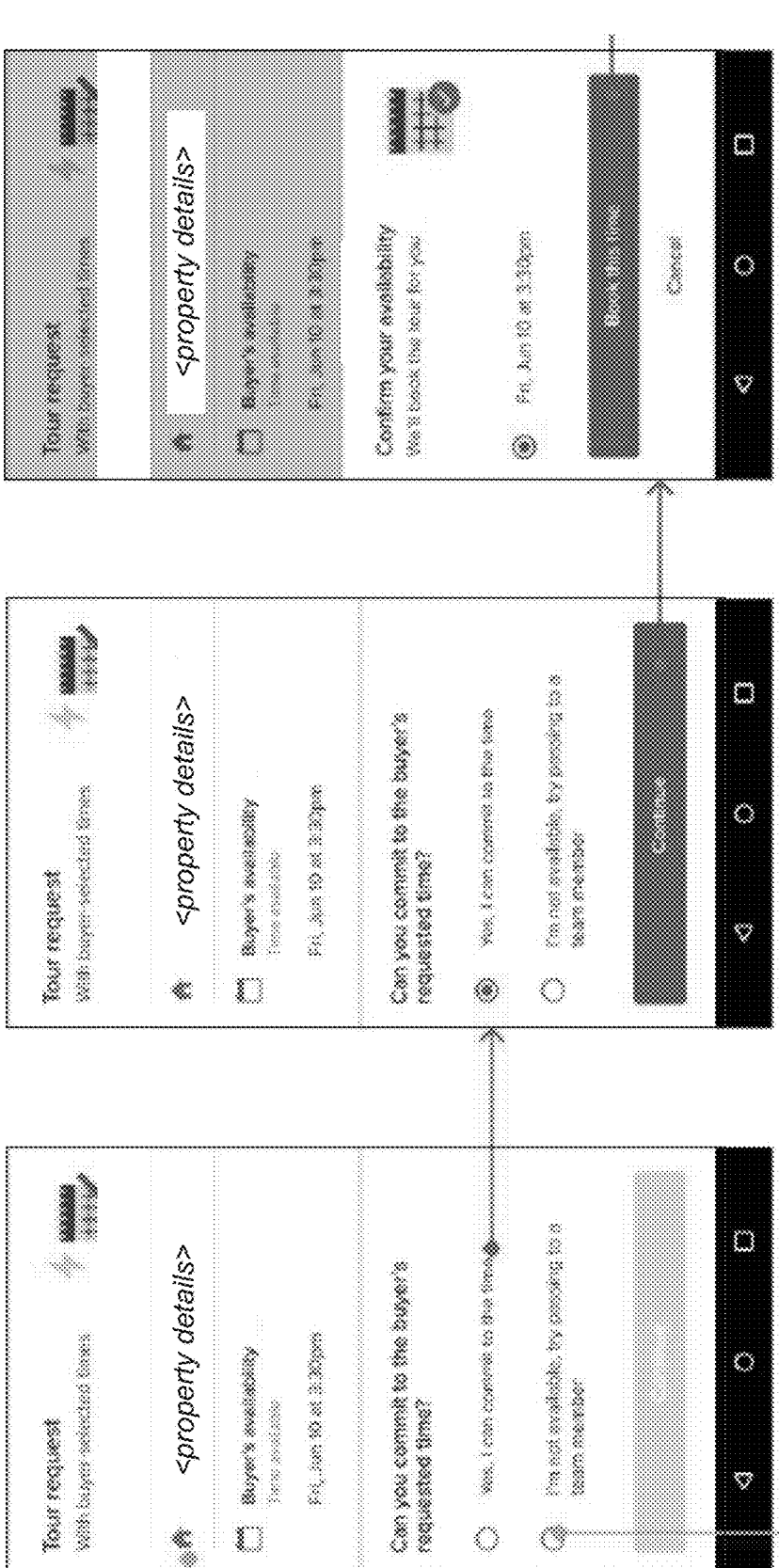

In particular, FIG. 5A illustrates information 505a that is an example GUI illustrating an incoming property access request (referred to at times as a 'tour' request in these non-exclusive examples of FIGS. 5A-5G) in a client application program (e.g., an app on a smartphone device or tablet device) executing on a client computing device of a candidate second user (e.g., an acquirer showing agent user who is one of multiple candidate second users, with information illustrated (progressing from left to right) about an incoming call (e.g., a VoIP call) on behalf of a first user (referred to at times as a 'new connection' or 'buyer' in these non-exclusive examples of FIGS. 5A-5G), with the candidate second user answering the call, and with information subsequently displayed in the client application program about an indicated property and requested availability time for the access (in a manner similar to that of FIG. 6A, but without the first user details or the message communication from the first user in this example), and with additional user-selectable GUI controls provided for the candidate second user to agree to commit to participating in the access at one of the indicated requested availability times from the first user or to decline (and cause the opportunity to pass to another candidate second user). FIG. 5B continues the example of FIG. 5A, and illustrates information 505b corresponding to the candidate second user having confirmed availability to commit to participate in the access at one of the availability times of the first user, with the GUI information further including (progressing left to right) the candidate second user selecting a particular time at which to schedule the access—if the first user has provided only one availability time, the GUI information would be updated accordingly. FIG. 5C continues the examples of FIGS. 5A-5B, and illustrates information 505c in which the GUI continues to display information related to confirming the scheduling of the access, and to providing corresponding confirmation information to the first user in the right-most GUI screen. FIG. 5D continues the examples of FIGS. 5A-5C, and illustrates information 505d corresponding to a situation in which the candidate second user in FIG. 5A indicates unavailability to commit to participation in the access at the requested availability time(s) of the first user, and in which the APACM system proceeds to offer the opportunity to another candidate second user via another copy of the client application program executing on another client computing device of that other candidate second user, with the other candidate second user in this example similarly indicating unavailability to commit to participation in the access at the requested availability times of the first user, and with the APACM system further proceeding to offer the opportunity to yet another candidate second user via another copy of the client application program executing on yet another client computing device of that yet another candidate second user. The illustrated process continues until one of the multiple candidate users is available to accept the opportunity, and the system proceeds in this example to schedule the property in a manner similar to that described elsewhere herein. FIG. 5E continues the examples of FIGS. 5A-5D, and illustrates information 505e corresponding to a situation in which the candidate second user in FIG. 5A selects a user-selectable control of the GUI to obtain additional information about the indicated property, such as via one or more API calls to an access management system executing on one or more other remote computing systems. FIG. 5F continues the examples of FIGS. 5A-5E, and in particular illustrates information 505f similar to that of FIG. 5A, but information from a push notification being further illustrated while the candidate second user is receiving the incoming VoIP call to prompt the candidate second user to access the APACM client application to obtain further details. FIG. 5G continues the examples of FIGS. 5A-5F, and in particular illustrates information 505g similar to that of FIGS. 5A and 5B, but in which the first user has only indicated a single availability time, such that the candidate second user either accepts or declines participation in that indicated single availability time without further selecting one of multiple availability times.

FIGS. 6A-6K illustrate non-exclusive examples of one type of interactions of the APACM system with a candidate second user (e.g., an acquirer showing agent user) for access with a first user (e.g., an acquirer user) via a client application program executing on a client computing device of the second user, as part of automated operations involving scheduling in-person access to a physical property that includes multiple users traveling from disparate locations to the physical property, such as to include automated interactions between multiple scheduling systems executing on separate computing devices. The interactions of FIGS. 6A-6K may, for example, be controlled or otherwise managed by an example embodiment of an APACM In-Application Access Scheduler component using a candidate second user determined by an example embodiment of an APACM Multiple User-System Access Coordinator component, as described elsewhere herein.

Figure 6B:
Figure 6C:
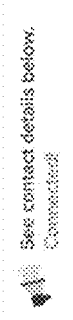
Figure 6D:
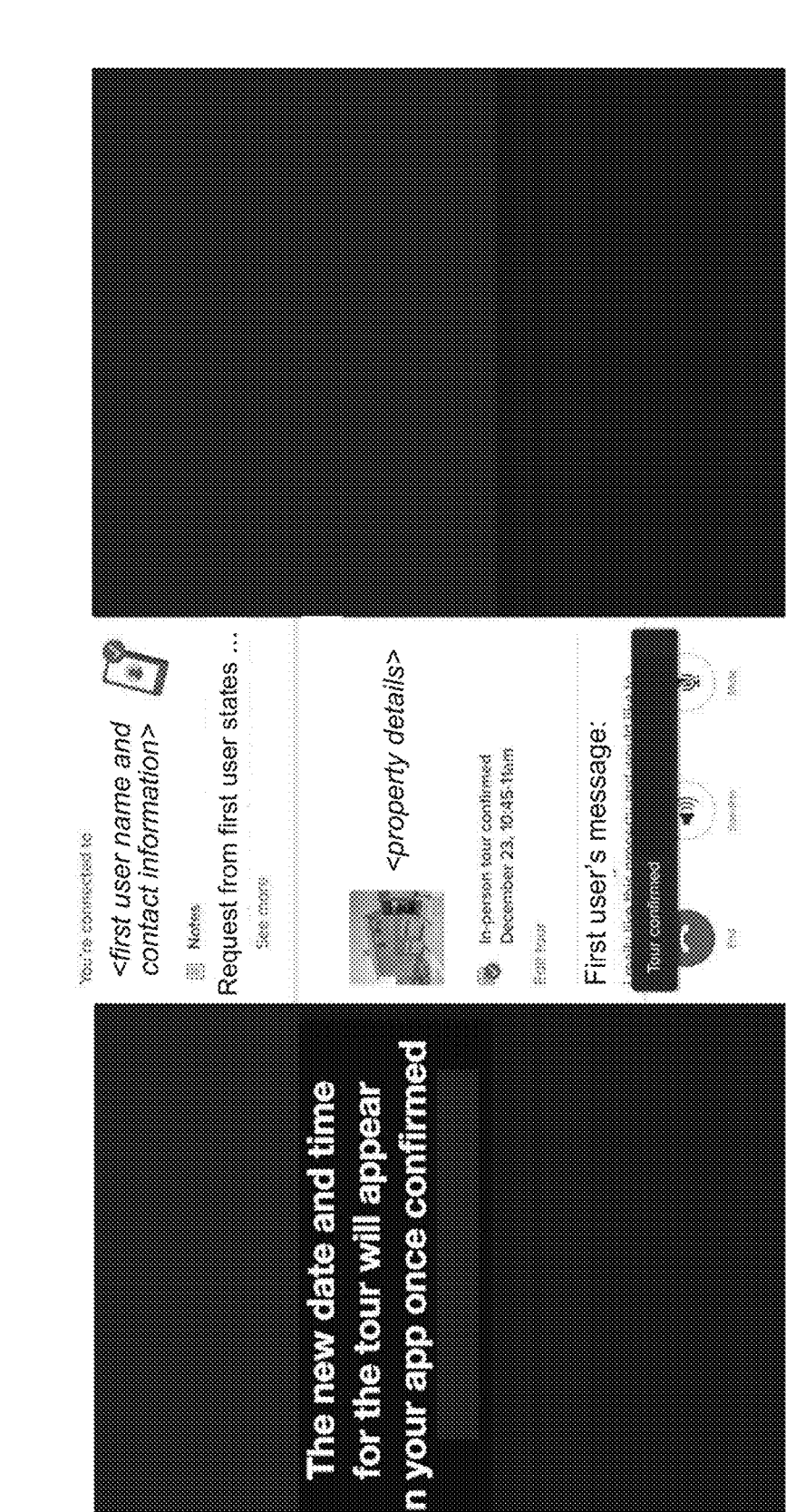
Figure 6E:
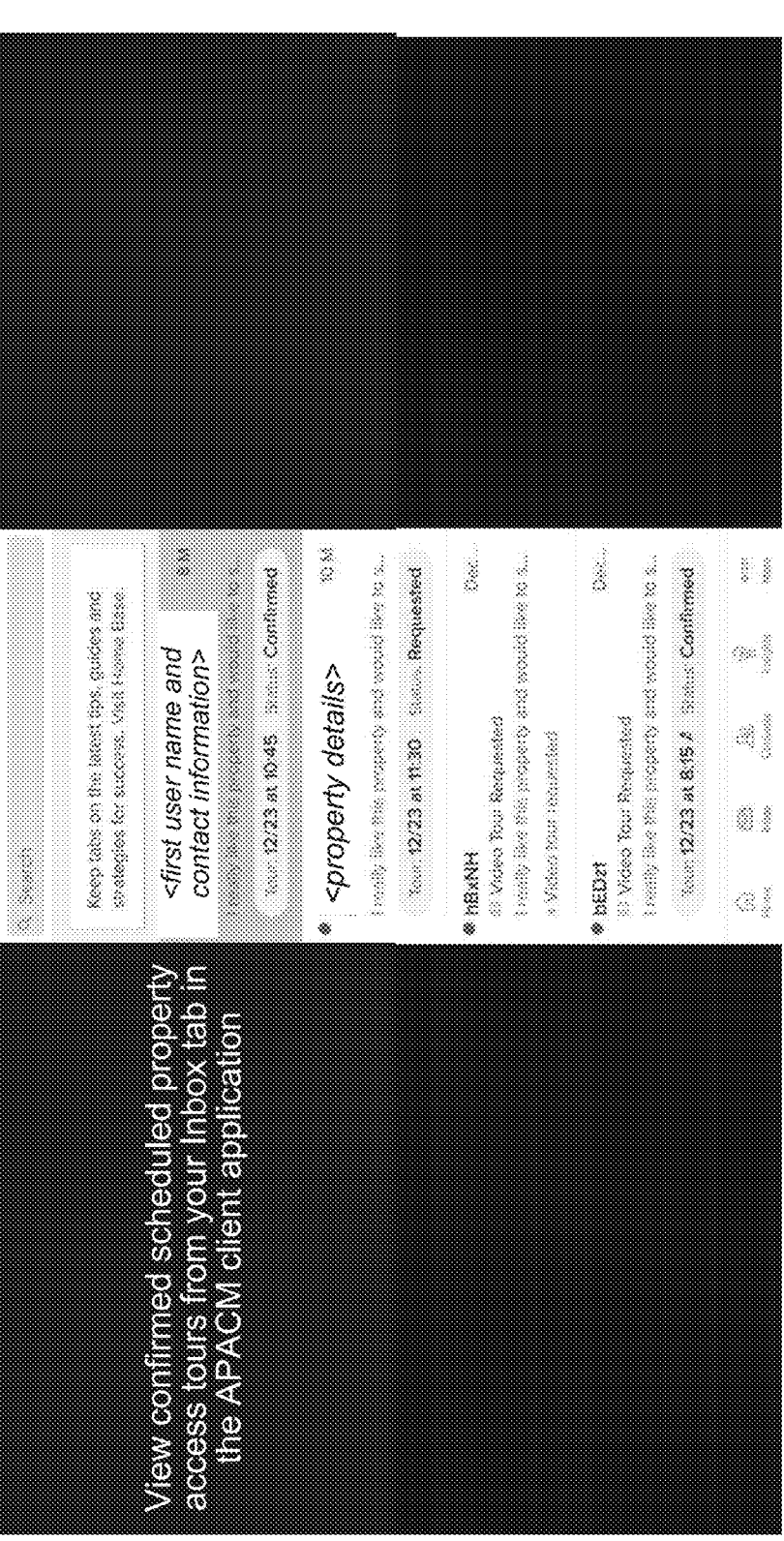
Figure 6G:
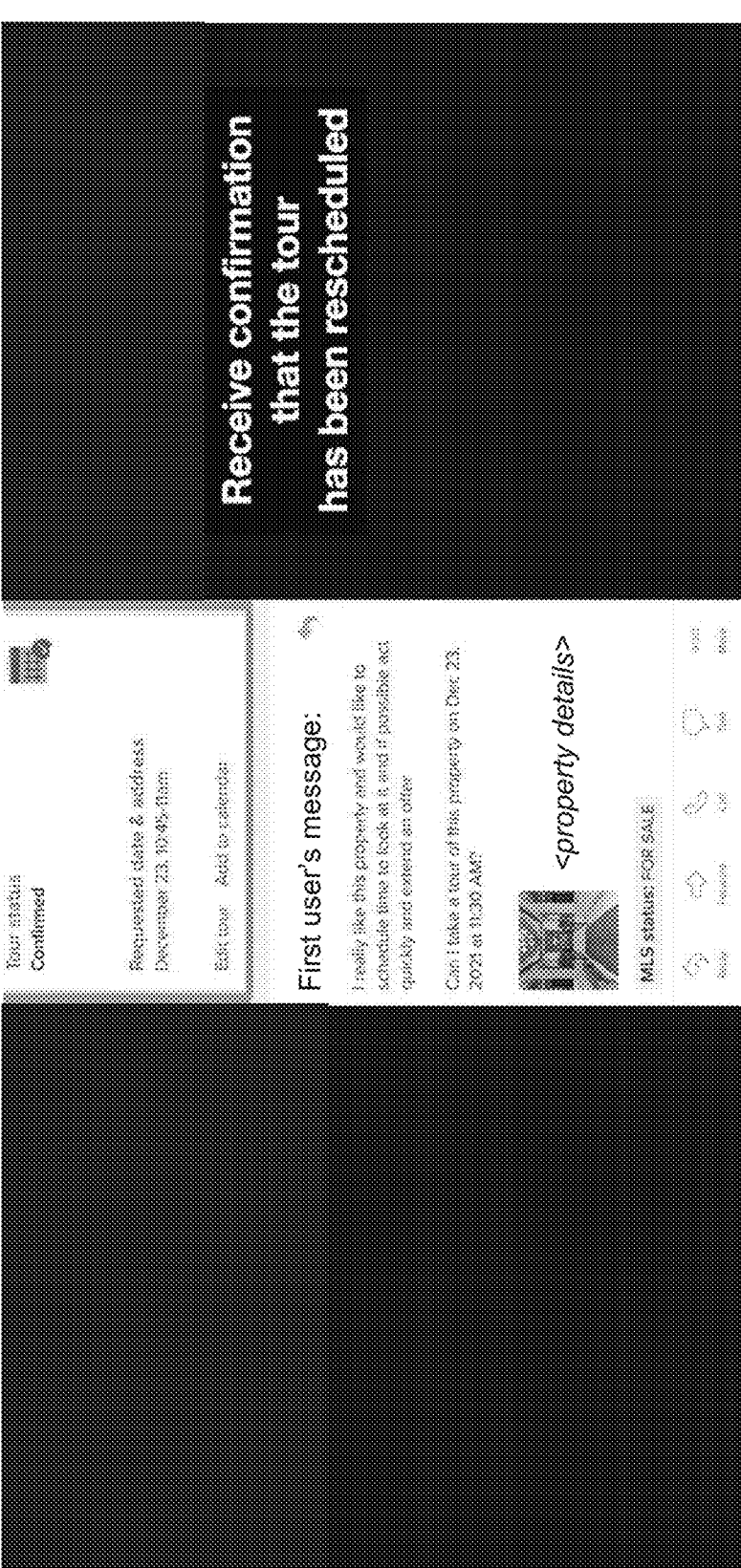
Figure 6H:
Figure 6I:
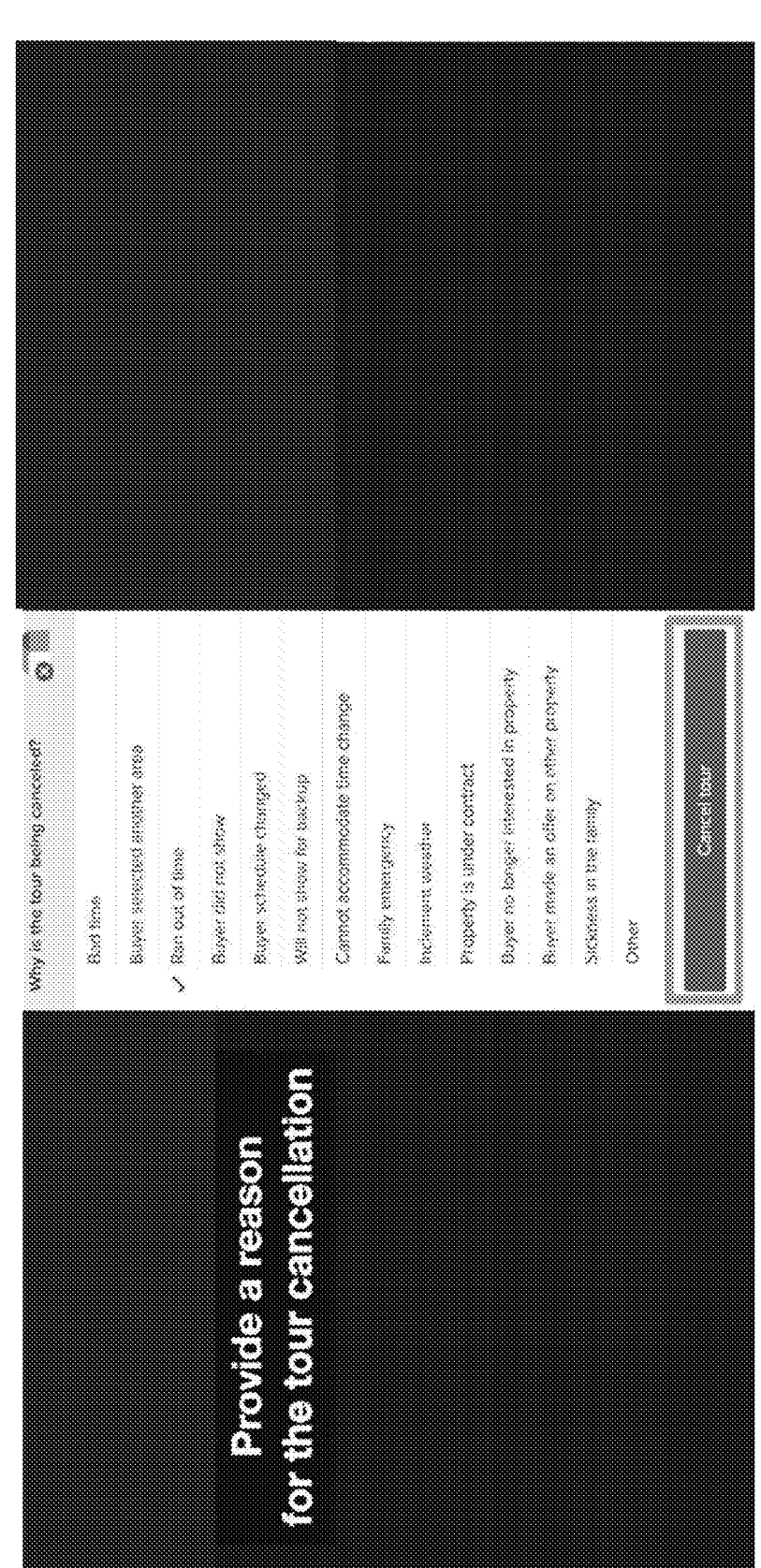
Figure 6J:
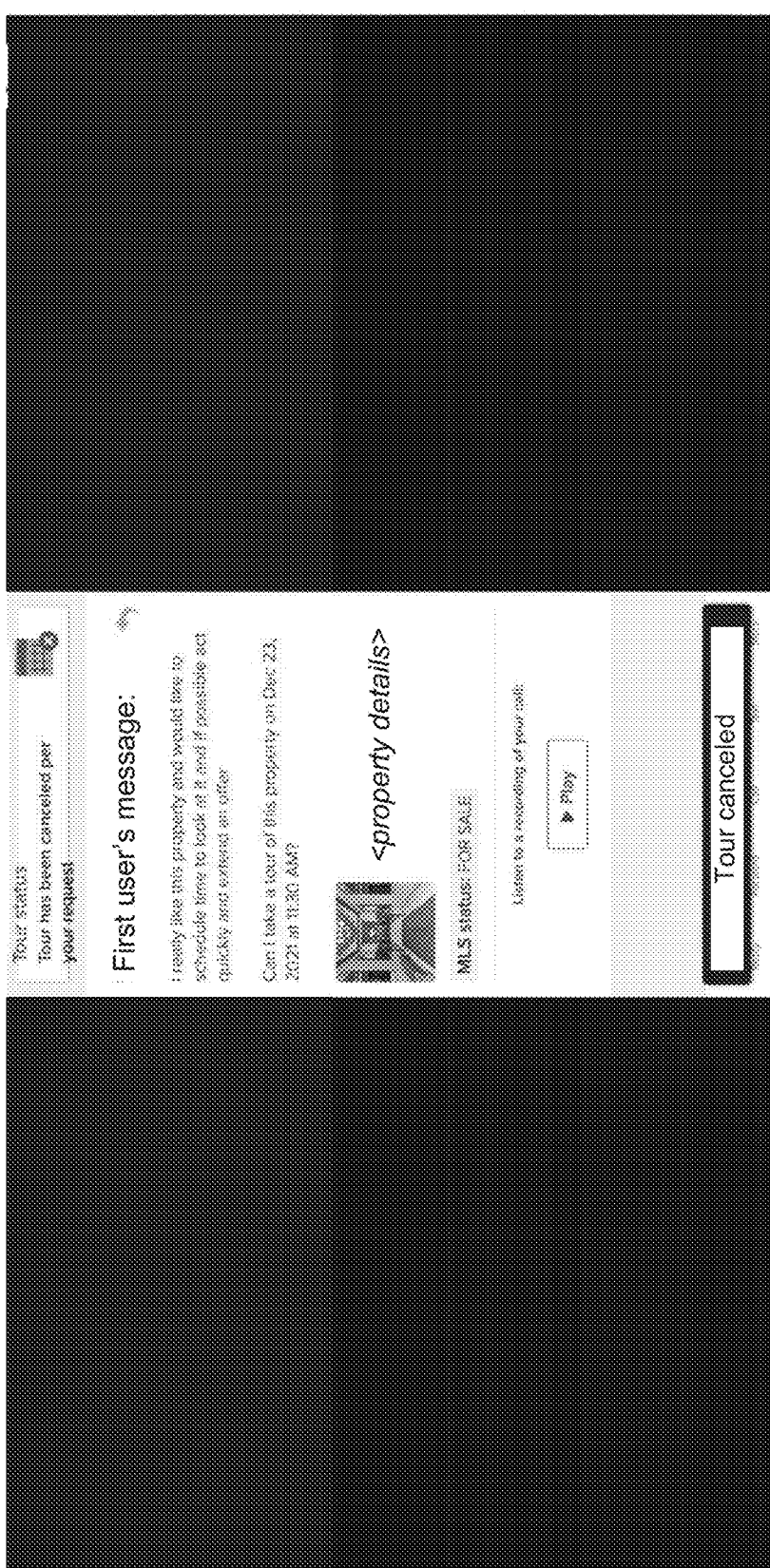

In particular, FIG. 6A illustrates information 605a that is an example GUI illustrating an incoming property access request (referred to at times as a 'tour' request in these non-exclusive examples of FIGS. 6A-6K) in an application program (e.g., an app executing on a smartphone device or tablet device) executing on a client computing device of a candidate second user, with information illustrated about a potential first user (referred to at times as a 'new connection' or 'buyer' in these non-exclusive examples of FIGS. 6A-6K), indicated property, and requested property access availability time, along with various information gathered from the first user including a message communication—in the illustrated example, the request includes the illustrated information in the client application program concurrent with an incoming telephone call (e.g., VoIP call) from the first user, such as to enable the candidate second user to simultaneously interact with the GUI of the client application program to complete the property access scheduling while talking to the first user. FIG. 6B continues the example of FIG. 6A, and illustrates information 605b corresponding to the candidate second user being provided with a user-selectable button control ("See more availability") of the GUI to request availability information for the indicated property (e.g., via interactions with an access management system executing on one or more remote computing systems, such as via an API call to the remote computing systems) and a user-selectable button control ("Request Confirmation") of the GUI to request confirmation of a reserved availability time for the scheduled access, with information 605c of FIG. 6C illustrating the requested availability times for the property corresponding to the "See more availability" button. FIG. 6D continues the examples of FIGS. 6A-6C, and includes information 605d illustrating further interactions with the GUI after the candidate second user has selected one of the property's availability times, including an indication that the access scheduling has been confirmed, and with information 605e of FIG. 6E illustrating similar information in a different part of the GUI (e.g., corresponding to an inbox tab of the client application program, such as for an account of the second user with the APACM system). FIGS. 6F and 6G continue the examples of FIGS. 6A-6E, and illustrate information 605f and 605g, respectively, related to interactions with the GUI to reschedule a previously confirmed scheduled access. FIGS. 6H and

Figure 6K:
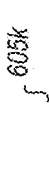

6I and 6J continue the examples of FIGS. 6A-6G, and illustrate information 605h and 605i and 605j, respectively, related to interactions with the GUI to cancel a previously confirmed scheduled access, including to provide a cancellation reason. FIG. 6K continues the examples of FIGS. 6A-6J, and illustrates information 605K related to an alternative situation in which approval for requested house access is to be supplied by a listing agent user associated with the property before the access scheduling is completed and confirmed, with corresponding information displayed and waiting for agreement from that listing agent user.

Figure 7A:
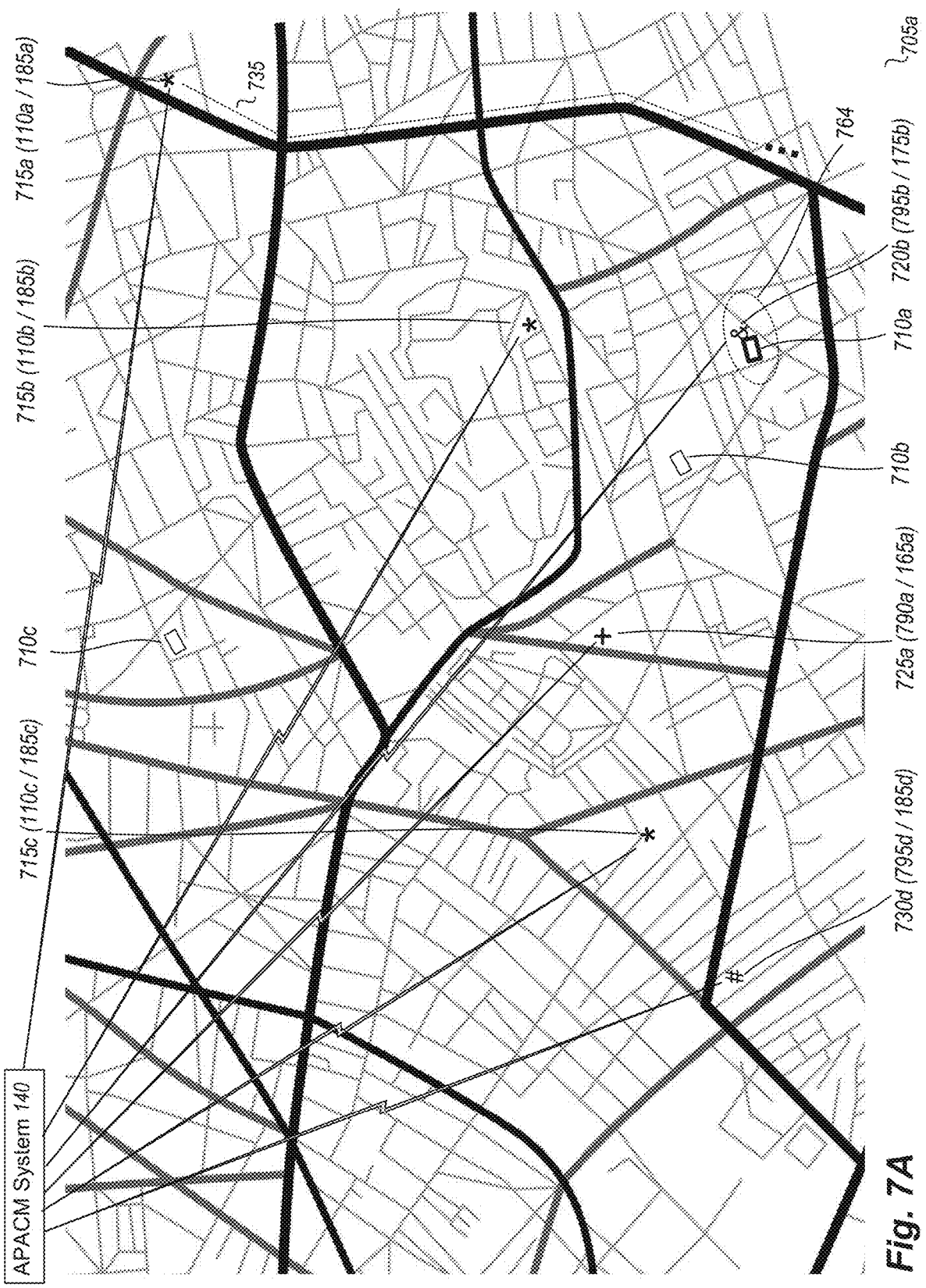
FIGS. 7A-7B illustrate examples of functionality of the APACM Multiple User-System Access Coordinator component involving interactions between multiple computing devices to provide automated connections between and coordination of multiple users.
Figure 7B:
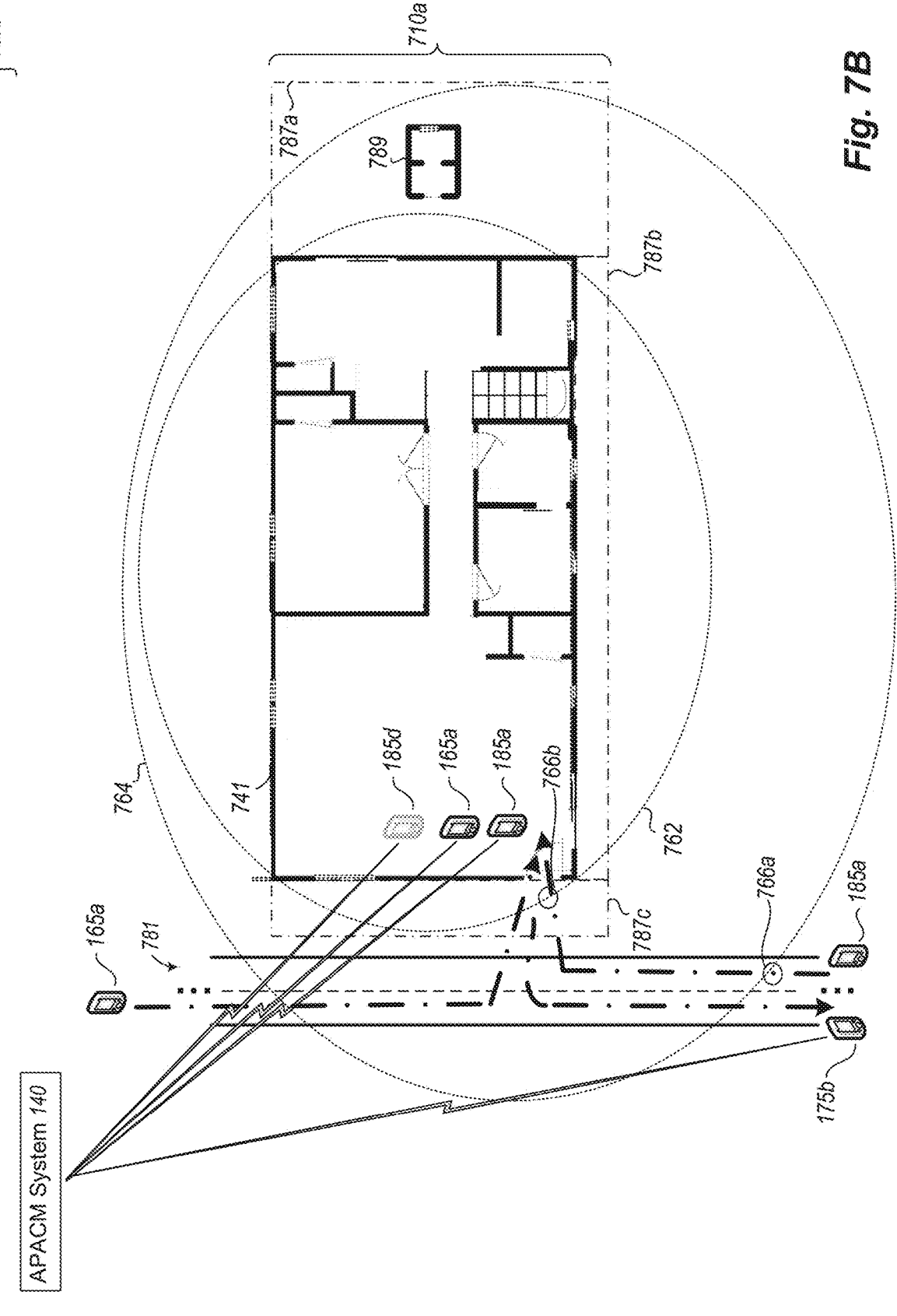

FIGS. 7A-7B illustrate non-exclusive examples of types of operations that may be performed by the APACM system in identifying alternative candidate second users (e.g., acquirer showing agent users) for participating in scheduled access with a first user (e.g., an acquirer user) to an indicated property. The operations of FIGS. 7A-7B may, for example, be controlled or otherwise managed by an example embodiment of an APACM Multiple User-System Access Coordinator component, as described elsewhere herein.

In particular, FIG. 7A illustrates information 705a that includes an example map of a city area (e.g., from Freepik), including an indication of an example property 710a indicated by a first user for which access is requested, of various other example properties including properties 710b and 710c, of possible candidate second users 110a-110c having associated client computing devices 185a-185c at various locations 715a-715c, of a client computing device 165a of the first user 790a at location 725a, of a client computing device 175b of a third user 795b who occupies the property 710a and is currently at location 720b at that property, and of a client computing device 185d of another user 795d who may join that scheduled access (a listing agent user representing the third user occupying the property) and is currently at location 730d—the information 705a further illustrates an embodiment of the APACM system 140 at a remote location and in wireless communication with the various client computing devices. In this example, the first user may have initiated a request for access to the property 710a at an availability time that is close to or at the current time (e.g., within minutes or hours of the current time). Accordingly, the APACM system determines alternative candidate second users to accompany the first user, optionally along with the additional user 795d, and/or with the third user 795b not being part of the group and leaving the location of the property 710a during the scheduled access. The APACM system may consider a number of possible candidate second users that are not shown (e.g., all candidate second users within a geographic area, such as the map), and select the illustrated candidate second users 110a-c based on factors associated with those users, such as their locations, predicted travel times to the property 710a, and various other attributes of those second users. In this example, the candidate second user 110a at location 715a may be a highest ranked candidate second user, despite being farther from the property 710a location than other candidate second users, such as based on a predicted travel time for that candidate second user along travel path 735 being less time than a predicted travel time for candidate second user 110b (despite that candidate second user 110b being closer to the property 710a location) and/or on other factors. Accordingly, the APACM system may perform various interactions to provide the opportunity to participate in the access to the property 710a with the first user to candidate second user 110a before the other candidate second users.

After one of the candidate second users agrees to participate in the access at a particular indicated availability time as part of a group of users including at least the first user (in this example, second user 110a), and optionally along with the other user 795d, the APACM system may perform further automated operations to schedule the access and to perform follow-up activities involved in tracking locations of some or all users of the group. For example, in the illustrated example, the APACM system may define a geofence 764 around the location of the property 710a, and notify the client computing devices of some or all users of the group to monitor for a breach of the geofence and to notify the APACM system of the breach, such as with the APACM system further notifying the third user 795b at a time of the breach to depart the property 710a. In addition, in at least some embodiments and situations, the APACM system may further participate in activities to schedule access to a group of multiple properties that include the property 710a and one or more other properties. For example, the APACM system may suggest other candidate properties to the first user for such a multi-property access that include property 710b (e.g., based at least in part on the property 710b being close to property 710a) and 710c (e.g., based at least in part on the property 710c being very similar to property 710a)—if the first user then agrees to include one or more of the suggested candidate properties in the scheduled access, the activities of the APACM system in scheduling access may include either determining that one of the candidate second users is available to participate in the access to all of the properties, or alternatively identifying two or more different candidate second users to each participate in the access at different ones of the properties. Additional details related to such determination of candidate second users and of suggested candidate properties are included elsewhere herein.

FIG. 7B continues the example of FIG. 7A, and illustrates additional information 705b that includes a zoomed-in view of the property 710a, with further details about the defined geofence 764 being shown, as well as a second smaller geofence 762 that is defined by the APACM system (e.g., to use the smaller geofence to determine when some or all of the users of the group have arrived at the property 710a to begin the scheduled access). In this example, the client computing devices 185a and 165a of the second user 110a and the first user 725a are shown as they approach the property 710a along adjacent road 781, while the client computing device 175b of the third user 720b is shown departing the property 710a—in this example, the group of users include the first user 725a, the selected second user 110a, and optionally the other user 795d with device 185d, although the arrival path for device 185d is not illustrated in this example. The location tracking activities may include identifying a location 766a and associated time at which the device 185a breaches the geofence 764, and a location 766b and associated later time at which the device 185a breaches the geofence 762, with such information similarly being provided to the APACM system 140 in this example via wireless communications for further use (e.g., to notify the client computing device 175b of the geofence breach 766a, and/or to notify other client computing devices of the group of the geofence breaches 766a or 766b). In this example, the property 710a includes a main building 741 and an outbuilding 789, as well as an associated yard/land 787 (including front yard 787c, side yard 787b and back yard 787a in which the outbuilding is located). It will be appreciated that the examples of FIG. 7A-7B have been provided for illustrative purposes and are not intended to limit the scope of the current disclosure.

Various details have been provided with respect to FIGS. 5A-5G and 6A-6K and 7A-7B, but it will be appreciated that the provided details are non-exclusive examples included for illustrative purposes, and other embodiments may be performed in other manners without some or all such details.

Non-exclusive example embodiments described herein are further described in the following clauses.

A01. A computer-implemented method for one or more computing devices to perform automated operations comprising: receiving, by one or more server computing devices of the one or more computing devices, a first request from a first user to obtain access for a tour of an indicated physical property at one of multiple availability times together with a second user that is not yet identified and is authorized to access the indicated physical property for the tour under specified conditions, wherein the indicated physical property is under control of at least one third user who is unaffiliated with the first user and the second user; and confirming, in response to the receiving of the first request, the access for the tour of the indicated physical property by the first user together with the second user via multiple electronic communications of multiple types, including:

(a) determining, by the one or more server computing devices, a plurality of alternative candidate users to be the second user, wherein the one or more server computing devices are operated by a first organization, and wherein the plurality of alternative candidate users are part of multiple second organizations separate from the first organization;

(b) selecting, by the one or more server computing devices, a current candidate user from the plurality of alternative candidate users to receive a second request to act as the second user for the tour of the indicated physical property;

(c) initiating, by the one or more server computing devices, a telephone Voice Over Internet Protocol (VoIP) call to a client computing device of the current candidate user corresponding to the second request;

(d) activating, by the client computing device of the current candidate user and in response to receiving the telephone VoIP call, a copy of an application program executing on the client computing device of the current candidate user to show first user-selectable controls for answering or rejecting the telephone VoIP call;

(e) sending, by the one or more server computing devices and in response to the current candidate user selecting one of the first user-selectable controls for answering the telephone VoIP call, electronic communications of multiple types to the client computing device for the second request, including one or more audio transmissions to the current candidate user over the telephone VoIP call related to the access for the tour, and further including one or more data communications separate from the telephone VoIP call to the copy of the application program for the current candidate user with information about at least the multiple availability times and the indicated physical property;

(f) presenting, by the client computing device, the one or more audio transmissions to the current candidate user via the telephone VoIP call, and updates in a displayed graphical user interface of the copy of the application program that include the information from the one or more data communications and that further include second user-selectable controls for the current candidate user to either decline participation as the second user in the tour of the indicated physical property, or agree to the participation as the second user in the tour of the indicated physical property at one of the multiple availability times that is selected by the current candidate user via the second user-selectable controls;

(g) receiving, by the client computing device and via one or more interactions by the current candidate user with at least one of the second user-selectable controls, a selection by the current candidate user to decline the participation as the second user in the tour of the indicated physical property, and sending a notification to the one or more server computing devices of the selection;

(h) performing, in response to the selection by the current candidate user to decline the participation as the second user in the tour of the indicated physical property, additional interactions with one or more additional candidate users that are each consecutively selected from the plurality of alternative candidate users to be a next current candidate user, including, for each of the one or more additional candidate users, performing elements (c)-(f) and further receiving a further selection by that additional candidate user to either decline or agree to the participation as the second user in the tour of the indicated physical property;

(i) identifying, by the one or more server computing devices, the second user to participate in the tour of the indicated physical property with the first user at a selected one of the multiple availability times, including determining that the specified conditions are satisfied for the second user participating in the tour of the indicated physical property with the first user at the selected one availability time;

(j) initiating, by the one or more server computing devices, updating of calendar data for the second user to include the selected one availability time for the tour; and (k) reserving, by the one or more server computing devices, the selected one availability time for the tour of the indicated physical property by the first user and the second user.

A02. A computer-implemented method for one or more computing devices to perform automated operations comprising:

receiving, by the one or more computing devices, information about a first request for an indicated first user to obtain access to an indicated physical property at one of multiple availability times together with a second user that is not yet identified and is authorized to access the indicated physical property under one or more specified conditions, wherein the indicated physical property is under control of at least one third user who is unaffiliated with the first user and the second user; and confirming, by the one or more computing devices and in response to the first request, the access to the indicated physical property by the first user together with the second user via multiple electronic communications of multiple types, including:

determining, by the one or more computing devices, a plurality of alternative candidate users to be the second user, and selecting a current candidate user from the plurality of alternative candidate users to receive a second request to act as the second user for the access to the indicated physical property;

initiating, by the one or more computing devices, a telephone Voice Over Internet Protocol (VoIP) call to a client computing device of the current candidate user on behalf of the first request for the first user;

sending, by the one or more computing devices, electronic communications to the client computing device separate from the telephone VoIP call, including to cause display of information for the current candidate user in a copy of an application program on the client computing devices that indicates the multiple availability times and that includes user-selectable controls for the current candidate user to either decline participation in the access to the indicated physical property, or to agree to the participation as the second user in the access to the indicated physical property at a user-selected one of the multiple availability times; and updating, by the one or more computing devices and in response to the current candidate user agreeing to the participation in the access to the indicated physical property at the selected one availability time and in accordance with the specified one or more conditions, calendar data for the current candidate user to include the selected one availability time for the access to the indicated physical property by the first user and by the current candidate user acting as the second user.

A03. A computer-implemented method for one or more computing devices to perform automated operations comprising:

receiving, by one of the one or more computing devices, and based at least in part on a first request from an indicated first user to obtain access to an indicated physical property at one of multiple availability times together with a second user that is not yet identified and is authorized to access the indicated physical property under specified conditions, an incoming telephone Voice Over Internet Protocol (VoIP) call corresponding to a second request to a user of the one computing device to act as the second user for the access to the indicated physical property, wherein the user of the one computing device is selected from a plurality of alternative candidate users to be the second user, and wherein the indicated physical property is under control of at least one third user who is unaffiliated with the first user and the second user;

activating, by the one computing device and in response to receiving the telephone VoIP call, a copy of an application program executing on the one computing device to show first user-selectable controls for answering or rejecting the telephone VoIP call, and receiving a selection by the user of the one computing device of one of the first user-selectable controls for answering the telephone VoIP call;

receiving, by the one computing device, electronic communications of multiple types for the second request, including one or more audio transmissions over the telephone VoIP call related to the access to the indicated physical property, and further including one or more data communications separate from the telephone VoIP call with information about at least the multiple availability times and the indicated physical property;

presenting, by the one computing device and to the user of the one computing device, the one or more computer-generated voice transmissions via the telephone VoIP call, and updates in a displayed graphical user interface of the copy of the application program that include the information from the one or more data communications and that further include second user-selectable controls for the user of the one computing device to either decline participating in the access to the indicated physical property, or to agree to participation as the second user in the access to the indicated physical property at one of the multiple availability times that is selected by the user of the one computing device via the second user-selectable controls;

receiving, by the one computing device and in response to the user of the one computing device agreeing to participate in the access to the indicated physical property at the selected one availability time, confirmation of the access to the indicated physical property by the first user and by the user of the one computing device acting as the second user at the selected one availability time in accordance with the specified conditions, and initiating updating of calendar data for the user of the one computing device to include the selected one availability time; and presenting, by the one computing device, information about the received confirmation in the displayed graphical user interface of the copy of the application program.

A04. A computer-implemented method for one or more computing devices to perform automated operations comprising:

receiving information about a first request for a first user to obtain access to an indicated physical property at one or more availability times together with a second user that is not yet identified and is authorized to access the indicated physical property; and confirming the access to the indicated physical property by the first user together with the second user, including:

determining one or more candidate users to be the second user, and selecting a current candidate user from the one or more candidate users to receive a second request to act as the second user for the access to the indicated physical property;

sending one or more electronic communications to a copy of an application program executing on a client computing device of the current candidate user to cause display of information in the copy of the application program that indicates the one or more availability times and that includes user-selectable controls for the current candidate user to either decline participating in the access to the indicated physical property, or to agree to participation as the second user in the access to the indicated physical property at one of the one or more availability times; and initiating, in response to the current candidate user agreeing to participate in the access to the indicated physical property at the one availability time, updating of calendar data for the current candidate user to include the one availability time for the access to the indicated physical property by the first user and by the current candidate user acting as the second user.

A05. A computer-implemented method for one or more computing devices to perform automated operations comprising:

determining, by a first application program executing on a first user's first client computing device of the one or more computing devices, an indicated physical property to which the first user requests access at one of multiple availability times, including:

obtaining, by the executing first application program and via interactions of the first user with a first graphical user interface (GUI) displayed on the first client computing device, information about one or more physical properties that are under control of one or more third users who are unaffiliated with the first user and with a second user authorized to access the one or more physical properties under one or more specified conditions;

retrieving, by the executing first application program and via one or more first electronic communications that are received in response to one or more first application programming interface (API) calls transmitted over one or more computer networks from the first client computing device to one or more remote server computing systems that maintain availability information about the one or more physical properties, first property information from the one or more remote server computing systems about the one or more physical properties that includes, for each of the one or more physical properties, multiple availability times at which that physical property is currently available for access by the second user;

presenting, by the executing first application program and to the first user via the first GUI, at least some of the retrieved first property information; and receiving, by the executing first application program and via one or more first interactions by the first user with the displayed first GUI, selections by the first user of, from the multiple availability times for one of the one or more physical properties, one or more indicated availability times at which the first user requests access to the one physical property, wherein the one physical property is the indicated physical property;

connecting a telephone call between the first client computing device and a second client computing device of the one or more computing devices that is operated by the second user to enable audio exchanges between the first and second users;

confirming, by a second application program executing on the second client computing device and concurrently with the audio exchanges between the first and second users during the telephone call, the access to the indicated physical property, including:

receiving, by the executing second application program, one or more second electronic communications having information about the one or more availability times at which the first user requests access to the indicated physical property;

presenting, by the executing second application program and to the second user via a second GUI displayed on the second client computing device, at least the one or more availability times for the indicated physical property;

determining, by the executing second application program and via one or more second interactions by the second user with the displayed second GUI, one of the one or more availability times at which both the first and second users are available to access the indicated physical property;

confirming, by the executing second application program and via one or more third electronic communications that are received in response to one or more second API calls transmitted between the second client computing device and the one or more remote server computing systems over the one or more computer networks, scheduling of the access to the indicated physical property by the first and second users at the determined one availability time that is reserved for the first and second users; and presenting, by the executing second application program and to the second user via the displayed second GUI, the confirmation of the scheduled access to the indicated physical property at the determined one availability time;

presenting, by the executing first application program and in response to one or more received fourth electronic communications with information about the confirmation of the scheduled access, and to the first user via the displayed first GUI concurrently with the audio exchanges between the first and second users during the telephone call, the confirmation of the scheduled access to the indicated physical property at the determined one availability time; and terminating, by at least one of the first and second client computing devices, the telephone call between the first and second users.

A06. A computer-implemented method for one or more computing devices to perform automated operations comprising:

answering, by a second user's second client computing device of the one or more computing devices, an incoming telephone call involving a first client device of a first user, wherein the first user has requested access to an indicated physical property under control of at least one third user who is unaffiliated with the first user and the second user, and wherein the second user is authorized to access the indicated physical property under one or more specified conditions; and confirming, by an application program executing on the second client computing device and concurrently with audio exchanges between the first and second users during the telephone call, the access by the first and second users to the indicated physical property, including:

retrieving, by the executing application program and via one or more first electronic communications transmitted over one or more computer networks between the second client computing device and one or more remote computing systems that maintain availability information about the indicated physical property, property information from the one or more remote computing systems about the indicated physical property that includes multiple availability times at which the indicated physical property is currently available for access by the second user;

presenting, by the executing application program and to the second user via a graphical user interface (GUI) displayed on the second client computing device, at least some of the retrieved property information that includes at least some of the multiple availability times;

determining, by the executing application program and based at least in part on one or more first interactions of the second user with the displayed GUI, one of the multiple availability times at which the first and second users are available to access the indicated physical property;

scheduling, by the executing application program and via one or more second electronic communications transmitted over the one or more computer networks between the second client computing device and the one or more remote computing systems, the access to the indicated physical property by the first and second users at the determined one availability time, including obtaining confirmation from the one or more remote computing systems of the scheduled access; and presenting, by the executing application program and to the second user via the displayed GUI, information about the confirmation of the scheduled access to the indicated physical property at the determined one availability time.

A07. A computer-implemented method for one or more computing devices to perform automated operations comprising:

exchanging, by a second client computing device of the one or more computing devices and during an interactive electronic communication session between a first user of a first client device and a second user of the second client computing device, multiple electronic communications with the first client device that are part of the interactive electronic communication session, wherein the first user has requested access to an indicated physical property under control of at least one third user who is unaffiliated with the first user and the second user, and wherein the second user is authorized to access the indicated physical property; and confirming, by an application program executing on the second client computing device and concurrently with the exchanging of the multiple electronic communications, the access by the first and second users to the indicated physical property, including:

retrieving, by the executing application program and via one or more first electronic communications transmitted over one or more computer networks between the second client computing device and one or more remote computing systems that maintain availability information about the indicated physical property, property information from the one or more remote computing systems about the indicated physical property that includes one or more availability times at which the indicated physical property is currently available for access;

presenting, by the executing application program and to the second user via a graphical user interface (GUI) displayed on the second client computing device, at least some of the retrieved property information that includes at least one of the one or more availability times;

determining, by the executing application program and based at least in part on one or more first interactions of the second user with the displayed GUI, one of the one or more availability times at which the first and second users are available to access the indicated physical property;

scheduling, by the executing application program and via one or more second electronic communications transmitted over the one or more computer networks between the second client computing device and the one or more remote computing systems, the access to the indicated physical property by the first and second users at the determined one availability time, including obtaining confirmation from the one or more remote computing systems of the scheduled access; and presenting, by the executing application program and to the second user via the displayed GUI, information about the confirmation of the scheduled access to the indicated physical property at the determined one availability time.

A08. A computer-implemented method for one or more computing devices to perform automated operations comprising:

determining one or more physical properties that match tracked information associated with a first user;

exchanging, by a second client computing device of the one or more computing devices that is operated by a second user, verbal communications with a first client device of a first user during a telephone call between the first client device and the second client computing device to discuss the one or more physical properties, wherein the second user is authorized to access the one or more physical properties; and confirming, by an application program executing on the second client computing device and concurrently with the exchanging of the verbal communications, access by the first and second users to at least one indicated physical property of the one or more physical properties, including:

retrieving, by the executing application program and via one or more first electronic communications transmitted over one or more computer networks between the second client computing device and one or more remote computing systems that maintain availability information about the one or more physical properties, property information from the one or more remote computing systems about the one or more physical properties that includes, for each of the one or more physical properties, one or more availability times at which that physical property is currently available for access;

presenting, by the executing application program and to the second user via a graphical user interface (GUI) displayed on the second client computing device, at least some of the retrieved property information;

determining, by the executing application program, and for each of the at least one indicated physical properties, one of the one or more availability times for that indicated physical property at which the first and second users are available to access that indicated physical property;

scheduling, by the executing application program and via one or more second electronic communications transmitted over the one or more computer networks between the second client computing device and the one or more remote computing systems, and for each of the at least one indicated physical properties, the access to that indicated physical property by the first and second users at the determined one availability time for that indicated physical property, including obtaining confirmation from the one or more remote computing systems of the scheduled access; and presenting, by the executing application program and to the second user via the displayed GUI, and for each of the at least one indicated physical properties, information about the confirmation of the scheduled access to that indicated physical prop-
erty at the determined one availability time for that
indicated physical property.

A09. A computer-implemented method for one or more
computing devices to perform automated operations
comprising:

determining, by the one or more computing devices, at
least one indicated physical property to which a first
user requests access for one or more first availability
times together with a second user who is authorized to
access the at least one indicated physical property and
is not yet identified, including:
gathering, by the one or more computing devices and
via first interactions of the first user with a first
graphical user interface (GUI) displayed on a first
client computing device of the first user, information
about one or more physical properties and about first
attributes of the first user and about a first location of
the first client computing device;
determining, by the one or more computing devices and
based at least in part on the gathered information,
multiple physical properties for the first user from a
plurality of physical properties that are under control
of one or more third users who are unaffiliated with
the first user and with the second user;
retrieving, by the one or more computing devices and
via one or more first electronic communications with
one or more remote computing systems that maintain
availability information about access to the plurality
of physical properties, current availability times for
the multiple physical properties; and
performing second interactions with the first user via
the first GUI, including presenting information about
the multiple physical properties that includes the
retrieved current availability times, and receiving
selections by the first user of the at least one indi-
cated physical property from the multiple physical
properties and of the one or more first availability
times from the current availability times;
determining, by the one or more computing devices and
from multiple alternative candidate users authorized to
access the at least one indicated physical property, one
of the multiple alternative candidate users to access the
at least one indicated physical property as the second
user together with the first user, including:
determining, by the one or more computing devices and
for each of the multiple alternative candidate users,
a second location of a second client computing
device of that alternative candidate user and second
attributes of that alternative candidate user corre-
sponding to prior activities accessing physical prop-
erties;
ranking, by the one or more computing devices and
using a trained machine learning model, each of the
multiple alternative candidate users for acting as the
second user based on a combination of at least one
physical location of the at least one indicated physi-
cal property, and of the first location for the first user,
and of the first attributes of the first user, and of the
second location of the second client computing
device of that alternative candidate user, and of the
second attributes of that alternative candidate user;
and
selecting, by the one or more computing devices and
based at least in part on the ranking of the one
alternative candidate user, the one alternative candi-
date user to access the at least one indicated physical property as the second user together with the first
user, including verifying, via interactions of the one
alternative candidate user with a second GUI dis-
played on the second client computing device of the
one alternative candidate user, that the one alterna-
tive candidate user agrees to access the at least one
indicated physical property in accordance with one
or more specified conditions and for at least one
availability time of the one or more first availability
times;
confirming, by the one or more computing devices and via
one or more second electronic communications with
the one or more remote computing systems, scheduled
access to the at least one indicated physical property for
the at least one availability time by the first user and by
the second user, including to cause updates to remove
the at least one availability time for the at least one
indicated property from the current availability times;
updating, by the one or more computing devices, calendar
information for at least one of the first user or the
second user to reserve the at least one availability time;
tracking, by the one or more computing devices and
during a time period before the at least one availability
time, updated second locations of the second client
computing device of the second user and updated first
locations of the first client computing device of the first
user; and
transmitting, by the one or more computing devices and
during the time period, one or more third electronic
communications to at least one of the second client
computing device of the second user or the first client
computing device of the first user with information
based on one or more tracked updated second locations
of the second client computing device of the second
user and on one or more tracked updated first locations
of the first client computing device.

A10. A computer-implemented method for one or more
computing devices to perform automated operations
comprising:

retrieving, by the one or more computing devices and via
one or more first electronic communications with one
or more remote computing systems that maintain avail-
ability information about access to an indicated physi-
cal property, current availability times for the indicated
physical property;
gathering, by the one or more computing devices and
from interactions of a first user with a first computing
device of the first user, information about the first user
that includes one or more first availability times at
which the first user is available to access the indicated
physical property together with a second user who is
not yet identified and is authorized to access the indi-
cated physical property, wherein the indicated physical
property is under control of at least one third user who
is unaffiliated with the first user and with the second
user, and wherein the one or more first availability
times are some or all of the current availability times;
selecting, by the one or more computing devices and from
multiple alternative candidate users who are authorized
to access the indicated physical property, the second
user for accessing the indicated physical property
together with the first user, including:
identifying, by the one or more computing devices, the
second user based at least in part on a combination
of two or more of multiple factors, the multiple
factors including a second location of a second
computing device of the second user, and a property location of the indicated physical property, and the gathered information about the first user, and one or more attributes of the second user corresponding to accessing physical properties; and verifying, by the one or more computing devices, that the second user is available to access the indicated physical property in accordance with one or more specified conditions at one availability time of the one or more first availability times; and confirming, by the one or more computing devices and via one or more second electronic communications with the one or more remote computing systems, scheduled access to the indicated physical property at the one availability time by the first user and by the second user, including to cause updates to remove the one availability time from the current availability times for the indicated property.

A11. A computer-implemented method for one or more computing devices to perform automated operations comprising:

gathering, by the one or more computing devices, information about a first user that includes one or more first availability times at which the first user is available to access an indicated physical property together with a second user who is not yet identified and is authorized to access the indicated physical property;

selecting, by the one or more computing devices and from multiple alternative candidate users who are authorized to access the indicated physical property, the second user for accessing the indicated physical property together with the first user based at least in part on a combination of two or more of multiple factors, the multiple factors including a property location of the indicated physical property, and the gathered information about the first user, and a second location of a second computing device of the second user, and one or more attributes of the second user corresponding to accessing physical properties, and availability of the second user to access the indicated physical property at one availability time of the one or more first availability times;

confirming, by the one or more computing devices, scheduled access to the indicated physical property at the one availability time by the first user and by the second user;

tracking, by the one or more computing devices and during a time period before the one availability time, updated second locations of the second computing device of the second user and first locations of a first computing device of the first user; and transmitting, by the one or more computing devices and during the determined time period, one or more first electronic communications to at least one of the second computing device of the second user or the first computing device of the first user with information that is based on at least one of the tracked updated second locations or the tracked first locations.

A12. A computer-implemented method for one or more computing devices to perform automated operations comprising:

gathering, based at least in part on interactions of a first user with a first computing device, information about the first user including based on one or more activities of the first user involving at least one physical property;

determining, from a plurality of physical properties, one or more suggested candidate physical properties for the first user based at least in part on the gathered information about the first user;

transmitting information to the first computing device about the one or more suggested candidate physical properties and about current availability times for the one or more suggested candidate physical properties, and receiving information from the first user of an indicated physical property of the one or more physical properties and of one or more first availability times of the current availability times at which the first user is available to access the indicated physical property together with a second user who is not yet identified;

selecting, from multiple alternative candidate users who are authorized to access the indicated physical property, the second user for accessing the indicated physical property together with the first user, including identifying the second user based at least in part on a combination of two or more of multiple factors, the multiple factors including a property location of the indicated physical property, and a second location of a second computing device of the second user, and one or more attributes of the second user corresponding to accessing physical properties, and availability of the second user to access the indicated physical property at one availability time of the one or more first availability times; and confirming scheduled access to the indicated physical property at the one availability time by the first user and by the second user.

A13. The computer-implemented method of any one of clauses A01-A12 wherein the initiating of the telephone VoIP call and the sending of the electronic communications are performed as part of interacting with the current candidate user regarding the first request for the first user, and wherein the method further comprises, before the initiating of the telephone VoIP call:

selecting one or more other users of the plurality of alternative candidate users to receive the second request to act as the second user for the access to the indicated physical property; and consecutively interacting with the selected one or more other users regarding the first request for the first user, including, for each of the selected one or more other users:

initiating, by the one or more computing devices, an additional telephone VoIP call to an additional client computing device of the selected other user on behalf of the first request for the first user; and determining, by the one or more computing devices, that the selected other user does not agree to the participation as the second user in the access to the indicated physical property, wherein the determining is based on one of the selected other user not answering the additional telephone VoIP call to the additional client computing device of the selected other user, or of the selected other user not agreeing to the participation as the second user in the access to the indicated physical property after the answering of the additional telephone VoIP call to the additional client computing device of the selected other user.

A14. The computer-implemented method of clause A13 wherein the plurality of alternative candidate users include at least a first group of multiple first alternative users, wherein the one or more other users and the current candidate user are some or all of the multiple first alternative users of the first group, and wherein the method further comprises determining an ordering of the multiple first alternative users to receive the second request that includes the one or more other users being ordered before the current candidate user.

A15. The computer-implemented method of clause A14 wherein the multiple first alternative users of the first group are part of a first organization, wherein the one or more computing devices are operated by another organization separate from the first organization, wherein the plurality of alternative candidate users further includes a second group of one or more second alternative users that are part of a second organization separate from the first organization and from the another organization, and wherein the method further comprises, before interacting with any of the multiple first alternative users of the first group on behalf of the first request for the first user, consecutively interacting with the one or more second alternative users of the second group regarding the first request for the first user and including, for each of the one or more second alternative users:

initiating, by the one or more computing devices, a further telephone VoIP call to a further client computing device of the second alternative user on behalf of the first request for the first user; and determining, by the one or more computing devices, that the second alternative user does not agree to the participation as the second user in the access to the indicated physical property, wherein the determining is based on one of the second alternative user not answering the further telephone VoIP call to the further client computing device of the second alternative user, or of the second alternative user not agreeing to the participation as the second user in the access to the indicated physical property after the answering of the further telephone VoIP call to the further client computing device of the second alternative user.

A16. The computer-implemented method of clause A15 wherein the multiple first alternative users of the first group include the one or more other users and the current candidate user and one or more other first alternative users, wherein the second group has multiple second alternative users that include the one or more second alternative users and one or more other second alternative users, wherein the consecutive interacting with the one or more second alternative users of the second group regarding the first request for the first user and the consecutive interacting with the selected one or more other users regarding the first request for the first user and the interacting with the current candidate user regarding the first request for the first user are performed during a second time period after a first time period, and wherein the method further comprises, during the first time period:

consecutively interacting a first time with each of the multiple second alternative users of the second group regarding the first request for the first user, and retaining the one or more second alternative users of the second group as possible second users for the second time period after the one or more second alternative users do not answer telephone VoIP calls sent for the first time, and discarding the one or more other second alternative users as possible second users for the second time period after the one or more other second alternative users decline the participation in the access to the indicated physical property; and consecutively interacting a first time with each of the multiple first alternative users of the first group regarding the first request for the first user, and retaining the one or more other users and the current candidate user as possible second users for the second time period after the one or more other users and the current candidate user do not answer telephone VoIP calls sent for the first time, and discarding the one or more other first alternative users as possible second users for the second time period after the one or more other first alternative users decline the participation in the access to the indicated physical property.

A17. The computer-implemented method of any one of clauses A01-A16 further comprising:

receiving, by one or more computing devices, information about an additional first request for an additional first user to obtain additional access to an additional indicated physical property at one of multiple additional availability times together with an additional second user that is not yet identified and is authorized to access the additional indicated physical property; and confirming, by the one or more computing devices and in response to the additional first request, the additional access to the additional indicated physical property by the additional first user together with the additional second user, including:

consecutively interacting a first time, by the one or more computing devices and regarding the additional first request for the additional first user, with each of multiple first alternative users of a first group via first additional telephone VoIP calls to first client computing devices of the multiple first alternative users, and determining that each of the multiple first alternative users of the first group does not agree to participation as the additional second user in the additional access to the additional physical property;

consecutively interacting a first time, by the one or more computing devices and regarding the additional first request for the additional first user, with each of multiple second alternative users of a second group via second additional telephone VoIP calls to second client computing devices of the multiple second alternative users, and determining that each of the multiple second alternative users of the second group does not agree to participation as the additional second user in the additional access to the additional physical property;

consecutively interacting, by the one or more computing devices and regarding the additional first request for the additional first user and for each of one or more second times after the first time, with each of at least some of the multiple first alternative users of the first group via further first telephone VoIP calls to the first client computing devices and with each of at least some of the multiple second alternative users of the second group via further second telephone VoIP calls to the second client computing devices, and determining that each of the at least some first alternative users and each of the at least some second alternative users does not agree to participation as the additional second user in the additional access to the additional physical property; and identifying, without additional telephone VoIP calls to another user who is separate from the multiple first alternative users and the multiple second alternative users, the another user to act as the additional second user for the additional access to the additional indicated physical property with the additional first user.

A18. The computer-implemented method of any one of clauses A01-A17 further comprising sending, by the one or more computing devices and via the telephone VoIP call, at least one of one or more voice transmissions for presentation to the current candidate user, or of one or more data elements for the copy of the application program.

A19. The computer-implemented method of any one of clauses A01-A18 wherein the sending of the electronic communications includes sending a push notification to the client computing device to prompt the current candidate user to access the copy of the application program.

A20. The computer-implemented method of any one of clauses A01-A19 further comprising, in response to the current candidate user agreeing to the participation in the access to the indicated physical property at the selected one availability time, connecting the first user with the current candidate user via the telephone VoIP call.

A21. The computer-implemented method of any one of clauses A01-A20 wherein the first request is further for the first user to obtain access beginning at one of the multiple availability times to multiple physical properties in succession that include the indicated physical property, and wherein the confirming of the access to the indicated physical property by the first user further includes confirming of the access to the multiple physical properties in succession by the first user and by, for each of the multiple physical properties, at least one of the plurality of candidate users.

A22. The computer-implemented method of clauses A21 wherein the confirming of the access to the multiple physical properties in succession by the first user further includes, for each of the multiple physical properties other than the indicated physical property, interacting with one of the plurality of candidate users via an additional telephone VoIP call and via one or more additional electronic communications to obtain agreement of that one candidate user to participate in access to that physical property with the first user as the at least one candidate user for that physical property, and wherein the access to the multiple physical properties includes multiple users of the plurality of candidate users acting as the respective at least one candidate user for respective ones of the multiple physical properties.

A23. The computer-implemented method of any one of clauses A01-A22 further comprising determining, by the one or more computing devices, that the one or more specified conditions are satisfied for the access to the indicated physical property at the selected one availability time, wherein the one or more specified conditions include at least one of the current candidate user having a defined qualification, or the selected one availability time being a time authorized by or on behalf of the at least one third user.

A24. The computer-implemented method of any one of clauses A01-A23 wherein the one computing device is a client computing device interacting over one or more computer networks with at least one server computing device of the one or more computing devices, and wherein the automated operations further include:

receiving, by the at least one server computing device and before initiating of the telephone VoIP call, the first request from the indicated first user; and confirming, by the at least one server computing device and in response to the first request, the access to the indicated physical property by the first user together with the second user via multiple electronic communications of multiple types, including:

determining, by the at least one server computing device, the plurality of alternative candidate users, and selecting the user of the computing device from the plurality of alternative candidate users as a current candidate user to receive the second request;

initiating, by the at least one server computing device, the telephone VoIP call to the one computing device;

sending, by the at least one server computing device and in response to the user of the one computing device answering the telephone VoIP call, electronic communications to the computing device, including the one or more audio transmissions via the telephone VoIP call and the one or more data communications separate from the telephone VoI P call; and confirming, by the at least one server computing device and in response to the user of the computing device agreeing to participate in the access to the indicated physical property at the selected one availability time, the access to the indicated physical property by the first user and by the current candidate user acting as the second user at the selected one availability time in accordance with the specified conditions, including sending to the computing device the confirmation of the access to the indicated physical property.

A25. The computer-implemented method of any one of clauses A01-A24 wherein the indicated physical property is under control of at least one third user who is unaffiliated with the first user and the second user and who specifies one or more conditions for the access to the indicated physical property, and wherein the automated operations further include determining that the access to the indicated physical property at the one availability time by the first user and the second user satisfies the specified one or more conditions.

A26. The computer-implemented method of any one of clauses A01-A25 wherein the first request for the first user includes multiple availability times selected by the first user, and wherein the automated operations further include receiving, after the sending of the one or more electronic communications, an indication of a selection by the current candidate user of the one availability time via one or more interactions with the displayed user-selectable controls.

A27. The computer-implemented method of any one of clauses A01-A26 wherein the sending of the one or more electronic communications includes initiating to the client computing device a telephone Voice Over Internet Protocol (VoIP) call, wherein the one or more computing devices include the client computing device, and wherein the automated operations further include displaying, by the client computing device, one or more initial user-selectable controls for the current candidate user to answering or rejecting the telephone VoIP call, and further displaying, after the current candidate user performs one or more interactions with the one or more initial user-selectable controls to answer the telephone VoIP call, the user-selectable controls.

A28. The computer-implemented method of any one of clauses A01-A27 wherein the sending of the one or more electronic communications includes initiating to the client computing device a telephone Voice Over Internet Protocol (VoIP) call, and further includes send-ing, after answering of the telephone VoIP call by the current candidate user, one or more audio transmissions to the current candidate user over the telephone VoIP call related to scheduling of the access to the indicated physical property.

A29. The computer-implemented method of any one of clauses A01-A28 wherein the sending of the one or more electronic communications further includes send-ing, after answering of the telephone VoIP call by the current candidate user, one or more data communica-tions separate from the telephone VoIP call to the copy of the application program with information about at least the one or more availability times and the indi-cated physical property.

A30. The computer-implemented method of any one of clauses A01-A29 wherein the sending of the one or more electronic communications includes initiating to the client computing device a push notification to access the copy of the application program, and further includes sending one or more data communications to the copy of the application program with information about at least the one or more availability times and the indicated physical property.

A31. The computer-implemented method of any one of clauses A01-A30 wherein the sending of the one or more electronic communications includes initiating to the client computing device a telephone Voice Over Internet Protocol (VoIP) call and using the telephone VoIP call to provide one or more data communications for the copy of the application program with informa-tion about at least the one or more availability times and the indicated physical property.

A32. The computer-implemented method of any one of clauses A01-A31 wherein the one availability time includes an indicated day and an indicated starting time-of-day on the indicated day and at least one of an indicated duration or an indicated ending time-of-day on the indicated day, and wherein the identifying of the second user includes receiving, by the one or more server computing devices, and via one or more inter-actions by one of the additional candidate users with at least one second user-selectable control displayed in a copy of the application program executing on a client computing device of the one additional candidate user, an indication of a selection by the one additional candidate user to agree to participation as the second user in the tour of the indicated physical property at the selected one availability time, and halting the (h) per-forming of the elements (c)-(f) for the one or more additional candidate users in response to the selection by the one additional candidate user.

A33. The computer-implemented method of any one of clauses A01-A32 wherein the (h) performing of the elements (c)-(f) for the one or more additional candi-date users is performed a first time for all of the plurality of alternative candidate users without identi-fying any of the plurality of alternative candidate users who agree to participation as the second user in the tour of the indicated physical property with the first user, and wherein the elements (c)-(f) are further performed for at least a second time for one or more of the plurality of alternative candidate users until receiving, by the one or more server computing devices and via one or more interactions by one of the or more candi-date users with at least one second user-selectable control displayed in a copy of the application program executing on a client computing device of the one candidate user, an indication of a selection by the one candidate user to agree to participation as the second user in the tour of the indicated physical property at the selected one availability time.

A34. The computer-implemented method of any one of clauses A01-A33 further comprising performing, by the one or more server computing devices and before the identifying of the second user, further interactions with one or more further candidate users that are each selected from the plurality of alternative candidate users to be a next current candidate user, including, for each of the one or more further candidate users, per-forming elements (c)-(d) and further receiving an indi-cation of a failure of that further candidate user to answer the telephone VoIP call to that further candidate user and not performing elements (e)-(f) for that can-didate user.

A35. The computer-implemented method of any one of clauses A01-A34 wherein the identifying of the second user is performed after the performing of the elements (c)-(f) for all of the plurality of alternative candidate users without identifying any of the plurality of alter-native candidate users who agree to participation as the second user in the tour of the indicated physical prop-erty with the first user, and further includes assigning, by the one or more server computing devices, an additional user separate from the plurality of alternative candidate users to be the second user without perform-ing of the elements (c)-(f) for the additional user.

A36. The computer-implemented method of any one of clauses A01-A35 wherein the application program is a client application of an Automated Property Access Control Manager (APACM) system that further pro-vides the second user with an account, and wherein the method further comprises updating, by the executing application program, calendar data for the second user in the account to indicate the scheduled access to the indicated physical property at the determined one avail-ability time.

A37. The computer-implemented method of clause A36 wherein the APACM system executes on one or more server computing devices remote from the second client computing device, and wherein the method fur-ther comprises:

receiving, by the one or more server computing devices and before the connecting of the telephone call, one or more third electronic communications from the first client device to the APACM system that provide one or more availability times at which the first user requests access to the indicated physical property;

initiating, by the one or more server computing devices, the telephone call between the first client device and the second client computing device; and sending, by the one or more server computing devices and in response to the receiving of the one or more third electronic communications and before the retrieving of the property information, one or more fourth electronic communications to the executing application program to provide the one or more availability times for the indicated physical properties.

A38. The computer-implemented method of any one of clauses A36-A37 further comprising selecting, by the one or more server computing devices and before the connecting of the telephone call, the second user from a plurality of candidate second users to accompany the first user in the access to the indicated physical property.

A39. The computer-implemented method of any one of clauses A01-A38 wherein the one or more remote computing systems are property availability server computing systems that execute a software program to implement a property access management system and provide one or more application programming interfaces (APIs) for use by other software programs in accessing functionality of the property access management system, and wherein the one or more first electronic communications include one or more API calls by the executing application program to the property access management system, and one or more responses by the property access management system to the executing application program.

A40. The computer-implemented method of clause A39 wherein the first client device of the first user is a first client computing device, and wherein the method further comprises, before the connecting of the telephone call:

obtaining, by a first application program executing on the first client computing device of the first user and via interactions of the first user with a first GUI displayed on the first client computing device, information about one or more physical properties;

retrieving, by the executing first application program and via one or more third electronic communications transmitted over the one or more computer networks between the first client computing device and the one or more remote computing systems, additional property information from the one or more remote server computing systems about the one or more physical properties that includes, for each of the one or more physical properties, a plurality availability times at which that physical property is currently available for access, wherein the one or more third electronic communications include one or more additional API calls by the executing first application program to the property access management system, and one or more additional responses by the property access management system to the executing first application program;

presenting, by the executing first application program and to the first user via the first GUI, at least some of the retrieved first property information; and receiving, by the executing first application program and via one or more first interactions by the first user with the displayed first GUI, selections by the first user of, from the plurality of availability times for one of the one or more physical properties, the multiple availability times, wherein the one physical property is the indicated physical property, and wherein the determining of the one availability time includes a selection by the second user of one of the multiple availability times.

A41. The computer-implemented method of any one of clauses A01-A40 wherein the retrieving of the property information includes receiving from the one or more remote computing systems additional information specified by the at least one third user regarding implementing of the access to the indicated physical property for use by the second user in determining at least one of the one or more specified conditions, and wherein the presenting of the at least some retrieved property information includes presenting the additional information.

A42. The computer-implemented method of any one of clauses A01-A41 wherein the retrieving of the property information includes receiving from the one or more remote computing systems additional information that includes at least one of summary data about prior access to the indicated physical property by other users, or data from analysis of a plurality of prior interactions involving a plurality of physical properties that includes the indicated physical property, or additional candidate properties that are determined for the first user based at least in part on the indicated physical property, and wherein the presenting of the at least some retrieved property information includes presenting the additional information.

A43. The computer-implemented method of any one of clauses A01-A42 further comprising exchanging, by the executing application program and after the presenting of the information about the confirmation of the scheduled access to the indicated physical property at the determined one availability time, one or more additional electronic communications with the one or more remote computing systems that reflect a change in the scheduled access, including obtaining confirmation from the one or more remote computing systems of the change, wherein the change includes at least one of a cancellation of the scheduled access, or a rescheduling of the scheduled access for a different availability time, or an update to the scheduled access initiated by the at least one third user.

A44. The computer-implemented method of clause A43 further comprising updating, by the executing application program and in response to the change in the scheduled access, calendar data for the second user to reflect the change in the scheduled access.

A45. The computer-implemented method of any one of clauses A01-A44 wherein the determining of the one availability time includes monitoring, by the executing application program, the audio exchanges on the telephone call to identify one or more statements about the one availability time.

A46. The computer-implemented method of any one of clauses A01-A45 wherein the determined one availability time includes an indicated day and an indicated starting time-of-day on the indicated day and at least one of an indicated duration or an indicated ending time-of-day on the indicated day, wherein the one or more specified conditions include a user participating in access to the indicated physical property is licensed to handle transactions involving real estate properties, and wherein the method further comprises obtaining, by the executing application program, additional information from the second user about at least one of the first user or the indicated physical property or about other physical properties or about other availability times.

A47. The computer-implemented method of any one of clauses A01-A46 wherein the interactive electronic communication session includes a Voice over Internet Protocol (VoIP) telephone call, wherein the multiple electronic communications include audio exchanges, wherein the automated operations further include displaying, by the second client computing device and before the exchanging of the multiple electronic communications, one or more user-selectable controls for the second user to answer or reject the VoIP telephone call, and further displaying additional user-selectable controls as part of the displayed GUI with the at least some retrieved property information, and wherein the one or more first interactions of the second user with the displayed GUI including selecting one of the additional user-selectable controls associated with the determined one availability time.

A48. The computer-implemented method of any one of clauses A01-A47 wherein the retrieving of the property information includes retrieving information about one or more conditions for the access to the indicated physical property that are specified by the at least one third user, and wherein the automated operations further include determining that the access to the indicated physical property at the determined one availability time by the first user and the second user satisfies the specified one or more conditions.

A49. The computer-implemented method of any one of clauses A01-A48 wherein the automated operations include receiving, by the executing application program and via one or more third electronic communications received before the retrieving of the property information, multiple availability times selected by the first user, wherein the presenting of the at least some retrieved property information includes presenting at least two availability times from the multiple availability times that are some or all of the one or more availability times at which the indicated physical property is currently available for access, and wherein the determining of the one availability time includes receiving an indication of a selection by the second user of the one availability time via the one or more first interactions.

A50. The computer-implemented method of any one of clauses A01-A49 wherein the telephone call is a Voice over Internet Protocol (VoIP) telephone call, wherein the verbal communications are sent as a plurality of electronic communications with audio data over the VoIP telephone call, wherein the automated operations further include displaying, by the second client computing device and before the exchanging of the verbal communications, one or more user-selectable controls for the second user to answer or reject the VoIP telephone call, and further displaying additional user-selectable controls as part of the displayed GUI with the at least some retrieved property information, and wherein the determining of the one availability time for each of the at least one indicated physical properties includes receiving an indication of a selection by the second user of one of the additional user-selectable controls associated with the determined one availability time.

A51. The computer-implemented method of any one of clauses A01-A50 wherein the retrieving of the property information includes retrieving, for each of the at least one indicated physical properties, information about one or more conditions for the access to that indicated physical property that are specified by at least one third user that controls that indicated physical property, and wherein the automated operations further include determining that the access by the first user and the second user to that indicated physical property at the determined one availability time for that indicated physical property satisfies the specified one or more conditions.

A52. The computer-implemented method of any one of clauses A01-A51 wherein the at least one indicated physical property is a single indicated physical property, wherein the automated operations include receiving, by the executing application program and via one or more third electronic communications received before the retrieving of the property information, multiple availability times selected by the first user, wherein the presenting of the at least some retrieved property information includes presenting at least two availability times from the multiple availability times that are some or all of the one or more availability times at which the single indicated physical property is currently available for access, and wherein the determining of the one availability time for the single indicated physical property includes receiving an indication of a selection by the second user of the one availability time via one or more first interactions with the displayed GUI.

A53. The computer-implemented method of any one of clauses A01-A52 wherein the first and second application programs are client applications of an Automated Property Access Control Manager (APACM) system implemented using at least one or more additional server computing systems, and wherein the method further comprises:

receiving, by the one or more additional server computing systems and before the connecting of the telephone call, one or more fifth electronic communications from the executing first application program that provide the one or more indicated availability times at which the first user requests access to the indicated physical property to the APACM system;

selecting, by the one or more additional server computing systems and from a plurality of candidate second users, the second user to accompany the first user in the access to the indicated physical property;

initiating, by the one or more additional server computing systems, the telephone call between the first and second client computing devices;

sending, by the one or more additional server computing systems and in response to the receiving of the one or more fifth electronic communications, the one or more second electronic communications to the executing second application program;

sending, by the one or more additional server computing systems, the one or more fourth electronic communications to the executing first application program; and updating, by the one or more additional server computing systems, and for at least one of the first and second users in a respective at least one account of the APACM system for the at least one of the first and second users, calendar data to reflect the scheduled access at the determined one availability time.

A54. The computer-implemented method of clause A53 further comprising at least one of:

opening one or more Web sockets between the one or more additional server computing systems and the second client computing device, wherein the sending of the one or more second electronic communications are performed using the opened one or more Web sockets; or sending, by the one or more additional server computing systems, one or more push notifications to the second client computing device that initiate at least one of one or more first automated operations by the second client computing device to retrieve additional information about the indicated physical property that is included in the presenting of the at least one or more availability times for the indicated physical property, or one or more second automated operations by the second client computing device to prompt accessing of the second client application program by the second user.

A55. The computer-implemented method of any one of clauses A01-A54 further comprising:

determining, by the one or more additional server computing systems and based at least in part on information gathered about the first user, a plurality of suggested candidate properties for the first user; and sending, by the one or more additional server computing systems and before the obtaining of the information by the executing first application program about the one or more physical properties, one or more sixth electronic communications to the executing first application program that include information about the plurality of suggested candidate properties, to prompt presenting by the executing first application program of the one or more additional server computing systems to the first user in the first GUI, wherein the obtaining of the information by the executing first application program about the one or more physical properties includes receiving one or more selections by the first user of the one or more physical properties from the plurality of suggested candidate properties.

A56. The computer-implemented method of any one of clauses A01-A55 further comprising, after the confirming of the scheduled access to the indicated physical property at the one availability time and before the one availability time:

tracking, by the one or more computing devices, at least one of updated second locations of the second computing device, or of first locations of a first computing device of the first user; and transmitting, by the one or more computing devices, one or more first electronic communications to at least one of the second computing device of the second user or the first computing device of the first user including information that is based on the tracked at least one of the updated second locations or of the first locations.

A57. The computer-implemented method of clause A56 further comprising:

determining, by the one or more computing devices, at least one of a first predicted travel time for the first computing device to arrive at the indicated physical property for the scheduled access based at least in part on the tracked first locations, or of a second predicted travel time for the second computing device to arrive at the indicated physical property for the scheduled access based at least in part on the tracked updated second locations; and determining, by the one or more computing devices, one or more updates regarding one or more predicted arrival times at the indicated physical property for the scheduled access based at least in part on the determined at least one of the first predicted travel time or the second predicted travel time, wherein the information included in the transmitted one or more first electronic communications includes the determined one or more updates.

A58. The computer-implemented method of any one of clauses A56-A57 further comprising:

determining, by the one or more computing devices, one or more predicted arrival times at the indicated physical property for the scheduled access for at least one of the first computing device based at least in part on the tracked first locations, or of the second computing device based at least in part on the tracked updated second locations;

determining, by the one or more computing devices, that at least one of the one or more predicted arrival times differs from the one availability time by at least a threshold amount of time; and initiating, by the one or more computing devices and based at least in part on the determining that the at least one predicted arrival time differs from the one availability time by the at least threshold amount of time, at least one of a cancellation or a rescheduling of the scheduled access, including transmitting one or more updates about the at least one of the cancellation or the rescheduling to at least one of the first computing device or the second computing device.

A59. The computer-implemented method of clause A58 wherein the confirming of the scheduled access to the indicated physical property at the one availability time includes storing, by the one or more computing devices, calendar information for at least one of the first user or the second user to reflect the one availability time, and wherein the method further comprises updating, by the one or more computing devices, the stored calendar information for the at least one of the first user or the second user to reflect the at least one of the cancellation or the rescheduling.

A60. The computer-implemented method of any one of clauses A01-A59 wherein the selecting of the second user is performed on a first day at a first time, wherein the one availability time includes an indicated starting time-of-day on the first day that is within a threshold amount of time of the first time, wherein the method further comprises determining, by the one or more computing devices, a first location of a first computing device of the first user at the first time, and wherein the identifying of the second user is further based in part on the determined first location of the first computing device.

A61. The computer-implemented method of any one of clauses A01-A60 further comprising, before the retrieving of the current availability times for the indicated physical property:

gathering, by the one or more computing devices and via first interactions of the first user with a first graphical user interface (GUI) displayed on a first client computing device of the first user, first information about one or more physical properties and about first attributes of the first user;

determining, by the one or more computing devices and based at least in part on the gathered first information, multiple candidate physical properties for the first user from a plurality of physical properties; and performing, by the one or more computing devices, second interactions with the first user via the first GUI, including to present information about the multiple physical properties, and to receive a selection by the first user of the indicated physical property from the multiple physical properties.

A62. The computer-implemented method of clause A61 wherein the one or more computing devices are part of an automated property access control manager system, and wherein the gathering of the first information about the one or more physical properties and about the first attributes of the first user includes at least one of tracking interactions by the first user with the automated property access control manager system to determine one or more criteria to which the one or more physical properties correspond, or of receiving answers from the first user to one or more questions provided by the automated property access control manager system, or of receiving information from the first user that identifies the one of more physical properties.

A63. The computer-implemented method of any one of clauses A01-A62 further comprising determining, by the one or more computing devices, one of multiple interactions types for interacting with the second user based on at least one of the gathered information about the first user, or of the one or more attributes of the second user, or of an amount of time between the selecting of the second user and at least one of the one or more first availability times, and wherein the verifying that the second user is available to access the indicated physical property in accordance with one or more specified conditions at the one availability time includes exchanging, by the one or more computing devices, one or more electronic communications with the second computing device of the second user using the determined one interaction type.

A64. The computer-implemented method of any one of clauses A01-A63 wherein the first user is an acquirer user, and wherein the selecting of the second user includes:

classifying, by the one or more computing devices, the first user into one of multiple types of acquirer users based at least in part on the gathered information about the first user;

generating, by the one or more computing devices and for each of the multiple alternative candidate users, a matching score between the first user and that alternative candidate user based at least in part on an assessment of interactions of that alternative candidate user with acquirer users of that one type; and performing, by the one or more computing devices, the identifying of the second user based at least in part on the matching score for the second user.

A65. The computer-implemented method of clause A64 wherein the multiple types are multiple clusters generated using a clustering technique that analyzes prior activities of a plurality of acquirer users in accessing properties, and wherein the classifying of the first user is based on multiple of an assessed likelihood of the first user to complete a property acquisition, or online browsing behavior of the first user related to properties, or past property transactions involving the first user, or whether the first user is currently working with one or more other first users in current property acquisition activities, or whether the first user has already participated in at least one access of a property, or whether the first user is prequalified for funding for property acquisition, or a self-assessment by the first user of a level of knowledge involving property acquisitions, or a period of time in which the first user plans to complete a property acquisition.

A66. The computer-implemented method of any one of clauses A64-A65 wherein the one or more computing devices are part of an automated property access control manager system, wherein each of the multiple alternative candidate users is an acquirer showing agent user that is a client of the automated property access control manager system, and wherein the method further comprises generating the evaluation of each of the multiple alternative candidate users based on multiple of an amount of experience of that alternative candidate user as an acquirer showing agent user, or a quantity of property acquisitions completed in a prior defined time period involving that alternative candidate user, or an amount of activities by that alternative candidate user involving the automated property access control manager system during a prior defined time period, or a satisfaction score for that alternative candidate user from other acquirer users who have interacted with that alternative candidate user, or a work-with-rate score for that alternative candidate user that corresponds to other acquirer users who opt to continue interactions with that alternative candidate user.

A67. The computer-implemented method of any one of clauses A01-A66 wherein the indicated physical property is a first of multiple physical properties to which the first user requests sequential access on a same day, wherein the one availability time is a first in a succession of multiple availability times in an order from earliest to latest and each associated with a respective one of the multiple properties, and wherein the method further comprises:

determining, by the one or more computing devices, the multiple availability times, including starting with the one availability time, and, for each availability time in the succession other than a last availability time in the succession, predicting an amount of time for traveling from a first property location of the property associated with that availability time to a second property location of the property associated with a next availability time in the succession, and determining the next availability time in the succession based at least in part on the predicted amount of time for that availability time;

determining, by the or more computing devices and for each of the multiple physical properties other than the indicated physical property, one of the multiple alternative candidate users that is available to access that physical property together with the first user at the associated availability time for that physical property; and confirming, by the one or more computing devices and for each of the multiple physical properties other than the indicated physical property, scheduled access to that physical property at the availability time associated with that physical property by the first user and by the determined one user alternative candidate user for that physical property.

A68. The computer-implemented method of any one of clauses A01-A67 further comprising selecting, by the one or more computing devices and before the selecting of the second user, the first user to participate in the scheduled access to the indicated physical property from a plurality of users who have requested access to the indicated physical property, the selecting being based at least in part on an activity performed by the first user to indicate a degree of interest of the first user in the indicated physical property.

A69. The computer-implemented method of any one of clauses A01-A68 wherein the automated operations further include:

retrieving, by the one or more computing devices and via one or more second electronic communications with one or more remote computing systems that maintain availability information about access to the indicated physical property, property information for the indicated physical property that includes current availability times for the indicated physical property, wherein the one or more first availability times are some or all of the current availability times; and performing, by the one or more computing devices, the confirming of the scheduled access to the indicated physical property by exchanging one or more third electronic communications with the one or more remote computing systems that include supplying information about the indicated physical property and the one availability time to cause updates by the one or more remote computing systems to remove the one availability time from the current availability times for the indicated property, and that further include receiving a confirmation from the one or more remote computing systems of the scheduled access.

A70. The computer-implemented method of clause A69 wherein the retrieving of the property information includes retrieving information about one or more conditions for the access to the indicated physical property that are specified by at least one third user who controls the indicated physical property, and wherein the automated operations further include determining that the access to the indicated physical property at the one availability time by the first user and the second user satisfies the specified one or more conditions.

A71. The computer-implemented method of any one of clauses A01-A70 wherein the gathering of the information about the first user includes receiving, by the one or more computing devices and via one or more second electronic communications with a first client computing device of the first user, multiple availability times selected by the first user, and wherein the selecting of the second user includes presenting at least two availability times from the multiple availability times to the second user on the second computing device, and receiving an indication of a selection by the second user of the one availability time from the presented at least two availability times.

A72. The computer-implemented method of clause A71 wherein the gathering of the information about the first user further includes:

determining, by the one or more computing devices and based at least in part on information about the first user, a plurality of suggested candidate properties for the first user;

presenting, by the one or more computing devices, information about the plurality of suggested candidate properties to the first user on the first client computing device of the first user; and receiving, by the one or more computing devices, a selection of the indicated physical property.

A73. The computer-implemented method of any one of clauses A01-A72 wherein the indicated physical property is one of the suggested candidate properties, and wherein the stored instructions include software instructions that, when executed, cause the one or more computing devices to perform further automated operations including:

retrieving, before the transmitting of the information to the first computing device and via one or more first electronic communications with one or more remote computing systems that maintain availability information about access to the indicated physical property, availability times for the indicated physical property that are at least some of the current availability times;

performing the transmitting of the information to the first computing device and the receiving of the information from the first user via one or more second electronic communications exchanged with the first computing device; and performing the confirming of the scheduled access to the indicated physical property by exchanging one or more third electronic communications with the one or more remote computing systems that include supplying information about the indicated physical property and the one availability time to cause updates by the one or more remote computing systems to remove the one availability time from the availability times for the indicated property, and that include receiving a confirmation from the one or more remote computing systems of the scheduled access.

A74. The computer-implemented method of clause A73 wherein the retrieving of the availability times for the indicated physical property further includes retrieving information about one or more conditions for the access to the indicated physical property that are specified by at least one third user who controls the indicated physical property, and wherein the automated operations further include determining that the access to the indicated physical property at the one availability time by the first user and the second user satisfies the specified one or more conditions.

A75. The computer-implemented method of any one of clauses A01-A74 wherein the receiving of the information from the first user includes receiving, via one or more electronic communications with the first computing device of the first user, multiple availability times selected by the first user, and wherein the selecting of the second user includes presenting at least two availability times from the multiple availability times to the second user on the second computing device of the second user, and receiving an indication of a selection by the second user of the one availability time from the presented at least two availability times.

A76. The computer-implemented method of any one of clauses A01-A75 wherein the at least one indicated property includes a single indicated property controlled by an indicated third user who resides at the single indicated property, wherein the at least one availability time is a single availability time that includes an indicated day and an indicated starting time-of-day on the indicated day and at least one of an indicated duration or an indicated ending time-of-day on the indicated day, wherein the first user is an acquirer user, wherein the second user is an acquirer's agent user, wherein the scheduled access to the at least one indicated physical property for the at least one availability time by the first user and by the second user further includes a fourth user who is a listing agent representing the indicated third user participating in the scheduled access and includes the indicated third user departing the single indicated property for the scheduled access, and wherein the method further comprises:

determining, by the one or more computing devices and before the confirming of the scheduled access, that the fourth user is available to participate in access to the single indicated property at the single availability time and that the indicated third user is available to depart the single indicated property at or before the single availability time; and providing, by the one or more computing devices, one or more reminders to at least one of the first user or the second user or the indicated third user or the fourth user at a specified time before the single availability time.

A77. The computer-implemented method of any one of clauses A01-A76 wherein the information about the one or more physical properties include one or more criteria determined to be of interest to the first user based at least in part on the first interactions of the first user with the first GUI, wherein the plurality of physical properties are located in one or more geographical areas determined to be of interest to the first user based at least in part on the first interactions of the first user with the first GUI, wherein the at least one indicated property includes multiple indicated properties, wherein the at least one availability time includes a succession of multiple availability times in an order from earliest to latest and each associated with a respective one of the multiple indicated properties, and wherein the method further comprises:

performing, by the one or more computing devices, the determining of the multiple physical properties for the first user by identifying properties in the one or more geographical areas that satisfy the determined one or more criteria; and determining, by the one or more computing devices, the multiple availability times, including starting with a first availability time in the succession, and, for each availability time in the succession other than a last availability time in the succession, predicting a first amount of time for accessing the indicated property associated with that availability time and a second amount of time for traveling from a first property location of the indicated property associated with that availability time to a second property location of the indicated property associated with a next availability time in the succession, and determining the next availability time in the succession based at least in part on the predicted first and second amounts of time for that availability time.

A78. A computer-implemented method comprising multiple steps to perform automated operations that implement described techniques substantially as disclosed herein.

B01. A non-transitory computer-readable medium having stored executable software instructions and/or other stored contents that cause one or more computing systems to perform automated operations that implement the method of any of clauses A01-A78.

B02. A non-transitory computer-readable medium having stored executable software instructions and/or other stored contents that cause one or more computing systems to perform automated operations that implement described techniques substantially as disclosed herein.

C01. One or more computing systems comprising one or more hardware processors and one or more memories with stored instructions that, when executed by at least one of the one or more hardware processors, cause the one or more computing systems to perform automated operations that implement the method of any of clauses A01-A78.

C02. One or more computing systems comprising one or more hardware processors and one or more memories with stored instructions that, when executed by at least one of the one or more hardware processors, cause the one or more computing systems to perform automated operations that implement described techniques substantially as disclosed herein.

D01. A computer program adapted to perform the method of any of clauses A01-A78 when the computer program is run on a computer.

E01. Any novel feature or combination of features disclosed herein.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:

receiving, by one or more server computing devices, a first request from a first user to obtain access for a tour of an indicated physical property at one of multiple availability times together with a second user that is not yet identified and is authorized to access the indicated physical property for the tour under specified conditions, wherein the indicated physical property is under control of at least one third user who is unaffiliated with the first user and the second user; and confirming, in response to the receiving of the first request, the access for the tour of the indicated physical property by the first user together with the second user via multiple electronic communications of multiple types, including:

(a) determining, by the one or more server computing devices, a plurality of alternative candidate users to be the second user, wherein the one or more server computing devices are operated by a first organization, and wherein the plurality of alternative candidate users are part of multiple second organizations separate from the first organization;

(b) selecting, by the one or more server computing devices, a current candidate user from the plurality of alternative candidate users to receive a second request to act as the second user for the tour of the indicated physical property;

(c) sending, by the one or more server computing devices, multiple electronic communications of multiple types to a client computing device of the current candidate user corresponding to the second request, including initiating a telephone Voice Over Internet Protocol (VOIP) call to the client computing device, and including sending a push notification message to the client computing device to initiate access to a copy of an application program, and;

(d) activating, by the client computing device of the current candidate user and in response to receiving the sent push notification message, the copy of the application program executing on the client computing device of the current candidate user to show first user-selectable controls for answering or rejecting the telephone VoIP call;

(e) sending, by the one or more server computing devices and in response to the current candidate user selecting one of the first user-selectable controls for answering the telephone VoIP call, additional electronic communications of the multiple types to the client computing device for the second request, including one or more audio transmissions to the current candidate user over the telephone VOIP call related to the access for the tour, and further including one or more data communications separate from the telephone VoIP call to the copy of the application program for the current candidate user with information about at least the multiple availability times and the indicated physical property;

(f) presenting, by the client computing device, the one or more audio transmissions to the current candidate user via the telephone VoIP call, and updates in a displayed graphical user interface of the copy of the application program that include the information from the one or more data communications and that further include second user-selectable controls for the current candidate user to either decline participation as the second user in the tour of the indicated physical property, or agree to the participation as the second user in the tour of the indicated physical property at one of the multiple availability times that is selected by the current candidate user via the second user-selectable controls;

(g) receiving, by the client computing device and via one or more interactions by the current candidate user with at least one of the second user-selectable controls, a selection by the current candidate user to decline the participation as the second user in the tour of the indicated physical property, and sending a notification to the one or more server computing devices of the selection;

(h) performing, in response to the selection by the current candidate user to decline the participation as the second user in the tour of the indicated physical property, additional interactions with one or more additional candidate users that are each consecutively selected from the plurality of alternative candidate users to be a next current candidate user, including, for each of the one or more additional candidate users, performing elements (c)-(f) and further receiving a further selection by that additional candidate user to either decline or agree to the participation as the second user in the tour of the indicated physical property;

(i) identifying, by the one or more server computing devices, the second user to participate in the tour of the indicated physical property with the first user at a selected one of the multiple availability times, including determining that the specified conditions are satisfied for the second user participating in the tour of the indicated physical property with the first user at the selected one availability time;

(j) initiating, by the one or more server computing devices, updating of calendar data for the second user to include the selected one availability time for the tour; and (k) reserving, by the one or more server computing devices, the selected one availability time for the tour of the indicated physical property by the first user and the second user.

2. The computer-implemented method of claim 1 wherein the one availability time includes an indicated day and an indicated starting time-of-day on the indicated day and at least one of an indicated duration or an indicated ending time-of-day on the indicated day, and wherein the identifying of the second user includes receiving, by the one or more server computing devices, and via one or more interactions by one of the additional candidate users with at least one second user-selectable control displayed in a copy of the application program executing on a client computing device of the one additional candidate user, an indication of a selection by the one additional candidate user to agree to participation as the second user in the tour of the indicated physical property at the selected one availability time, and halting the (h) performing of the elements (c)-(f) for the one or more additional candidate users in response to the selection by the one additional candidate user.

3. The computer-implemented method of claim 1 wherein the (h) performing of the elements (c)-(f) for the one or more additional candidate users is performed a first time for all of the plurality of alternative candidate users without identifying any of the plurality of alternative candidate users who agree to participation as the second user in the tour of the indicated physical property with the first user, and wherein the elements (c)-(f) are further performed for at least a second time for one or more of the plurality of alternative candidate users until receiving, by the one or more server computing devices and via one or more interactions by one of the or more candidate users with at least one second user-selectable control displayed in a copy of the application program executing on a client computing device of the one candidate user, an indication of a selection by the one candidate user to agree to participation as the second user in the tour of the indicated physical property at the selected one availability time.

4. The computer-implemented method of claim 1 further comprising performing, by the one or more server computing devices and before the identifying of the second user, further interactions with one or more further candidate users that are each selected from the plurality of alternative candidate users to be a next current candidate user, including, for each of the one or more further candidate users, performing elements (c)-(d) and further receiving an indication of a failure of that further candidate user to answer the telephone VoIP call to that further candidate user and not performing elements (e)-(f) for that candidate user.

5. The computer-implemented method of claim 1 wherein the identifying of the second user is performed after the performing of the elements (c)-(f) for all of the plurality of alternative candidate users without identifying any of the plurality of alternative candidate users who agree to participation as the second user in the tour of the indicated physical property with the first user, and further includes assigning, by the one or more server computing devices, an additional user separate from the plurality of alternative candidate users to be the second user without performing of the elements (c)-(f) for the additional user.

6. A computer-implemented method comprising:

receiving, by one or more computing devices, information about a first request for an indicated first user to obtain access to an indicated physical property at one of multiple availability times together with a second user that is not yet identified and is authorized to access the indicated physical property under one or more specified conditions, wherein the indicated physical property is under control of at least one third user who is unaffiliated with the first user and the second user; and confirming, by the one or more computing devices and in response to the first request, the access to the indicated physical property by the first user together with the second user via multiple electronic communications of multiple types, including:

determining, by the one or more computing devices, a plurality of alternative candidate users to be the second user, and selecting a current candidate user from the plurality of alternative candidate users to receive a second request to act as the second user for the access to the indicated physical property;

initiating, by the one or more computing devices, a telephone Voice Over Internet Protocol (VOIP) call to a client computing device of the current candidate user on behalf of the first request for the first user;

sending, by the one or more computing devices, the multiple electronic communications of the multiple types to the client computing device to cause a response from the client computing device, including sending a push notification message to the client computing device to initiate access to a copy of an application program on the client computing device, and further including sending one or more audio transmissions over the telephone VoIP call for presentation on a speaker associated with the client computing device, and further including sending data communications with included information to the copy of the application program to cause display of the included information in a graphical user interface of the copy of the application program that indicates the multiple availability times and that includes user-selectable controls for the current candidate user to either decline participation in the access to the indicated physical property, or to agree to the participation as the second user in the access to the indicated physical property at a user-selected one of the multiple availability times; and updating, by the one or more computing devices and in response to the current candidate user agreeing to the participation in the access to the indicated physical property at the selected one availability time and in accordance with the specified one or more conditions, calendar data for the current candidate user to include the selected one availability time for the access to the indicated physical property by the first user and by the current candidate user acting as the second user.

7. The computer-implemented method of claim 6 wherein the initiating of the telephone VoIP call and the sending of the electronic communications are performed as part of interacting with the current candidate user regarding the first request for the first user, and wherein the method further comprises, before the initiating of the telephone VoIP call:

selecting one or more other users of the plurality of alternative candidate users to receive the second request to act as the second user for the access to the indicated physical property; and consecutively interacting with the selected one or more other users regarding the first request for the first user, including, for each of the selected one or more other users:

initiating, by the one or more computing devices, an additional telephone VoIP call to an additional client computing device of the selected other user on behalf of the first request for the first user; and determining, by the one or more computing devices, that the selected other user does not agree to the participation as the second user in the access to the indicated physical property, wherein the determining is based on one of the selected other user not answering the additional telephone VoIP call to the additional client computing device of the selected other user, or of the selected other user not agreeing to the participation as the second user in the access to the indicated physical property after the answering of the additional telephone VoIP call to the additional client computing device of the selected other user.

8. The computer-implemented method of claim 7 wherein the plurality of alternative candidate users include at least a first group of multiple first alternative users, wherein the one or more other users and the current candidate user are some or all of the multiple first alternative users of the first group, and wherein the method further comprises determining an ordering of the multiple first alternative users to receive the second request that includes the one or more other users being ordered before the current candidate user.

9. The computer-implemented method of claim 8 wherein the multiple first alternative users of the first group are part of a first organization, wherein the one or more computing devices are operated by another organization separate from the first organization, wherein the plurality of alternative candidate users further includes a second group of one or more second alternative users that are part of a second organization separate from the first organization and from the another organization, and wherein the method further comprises, before interacting with any of the multiple first alternative users of the first group on behalf of the first request for the first user, consecutively interacting with the one or more second alternative users of the second group regarding the first request for the first user and including, for each of the one or more second alternative users:

initiating, by the one or more computing devices, a further telephone VoIP call to a further client computing device of the second alternative user on behalf of the first request for the first user; and determining, by the one or more computing devices, that the second alternative user does not agree to the participation as the second user in the access to the indicated physical property, wherein the determining is based on one of the second alternative user not answering the further telephone VoIP call to the further client computing device of the second alternative user, or of the second alternative user not agreeing to the participation as the second user in the access to the indicated physical property after the answering of the further telephone VoIP call to the further client computing device of the second alternative user.

10. The computer-implemented method of claim 9 wherein the multiple first alternative users of the first group include the one or more other users and the current candidate user and one or more other first alternative users, wherein the second group has multiple second alternative users that include the one or more second alternative users and one or more other second alternative users, wherein the consecutive interacting with the one or more second alternative users of the second group regarding the first request for the first user and the consecutive interacting with the selected one or more other users regarding the first request for the first user and the interacting with the current candidate user regarding the first request for the first user are performed during a second time period after a first time period, and wherein the method further comprises, during the first time period:

consecutively interacting a first time with each of the multiple second alternative users of the second group regarding the first request for the first user, and retaining the one or more second alternative users of the second group as possible second users for the second time period after the one or more second alternative users do not answer telephone VoIP calls sent for the first time, and discarding the one or more other second alternative users as possible second users for the second time period after the one or more other second alternative users decline the participation in the access to the indicated physical property; and consecutively interacting a first time with each of the multiple first alternative users of the first group regarding the first request for the first user, and retaining the one or more other users and the current candidate user as possible second users for the second time period after the one or more other users and the current candidate user do not answer telephone VoIP calls sent for the first time, and discarding the one or more other first alternative users as possible second users for the second time period after the one or more other first alternative users decline the participation in the access to the indicated physical property.

11. The computer-implemented method of claim 6 further comprising:

receiving, by one or more computing devices, information about an additional first request for an additional first user to obtain additional access to an additional indicated physical property at one of multiple additional availability times together with an additional second user that is not yet identified and is authorized to access the additional indicated physical property; and confirming, by the one or more computing devices and in response to the additional first request, the additional access to the additional indicated physical property by the additional first user together with the additional second user, including:

consecutively interacting a first time, by the one or more computing devices and regarding the additional first request for the additional first user, with each of multiple first alternative users of a first group via first additional telephone VoIP calls to first client computing devices of the multiple first alternative users, and determining that each of the multiple first alternative users of the first group does not agree to participation as the additional second user in the additional access to the additional physical property;

consecutively interacting a first time, by the one or more computing devices and regarding the additional first request for the additional first user, with each of multiple second alternative users of a second group via second additional telephone VoIP calls to second client computing devices of the multiple second alternative users, and determining that each of the multiple second alternative users of the second group does not agree to participation as the additional second user in the additional access to the additional physical property;

consecutively interacting, by the one or more computing devices and regarding the additional first request for the additional first user and for each of one or more second times after the first time, with each of at least some of the multiple first alternative users of the first group via further first telephone VoIP calls to the first client computing devices and with each of at least some of the multiple second alternative users of the second group via further second telephone VoIP calls to the second client computing devices, and determining that each of the at least some first alternative users and each of the at least some second alternative users does not agree to participation as the additional second user in the additional access to the additional physical property; and identifying, without additional telephone VoIP calls to another user who is separate from the multiple first alternative users and the multiple second alternative users, the another user to act as the additional second user for the additional access to the additional indicated physical property with the additional first user.

12. The computer-implemented method of claim 6 further comprising sending, by the one or more computing devices and via the telephone VoIP call, at least one of one or more voice transmissions for presentation to the current candidate user, or of one or more data elements for the copy of the application program.

13. The computer-implemented method of claim 6 further comprising, in response to the current candidate user agreeing to the participation in the access to the indicated physical property at the selected one availability time, connecting the first user with the current candidate user via the telephone VoIP call.

14. The computer-implemented method of claim 6 wherein the first request is further for the first user to obtain access beginning at one of the multiple availability times to multiple physical properties in succession that include the indicated physical property, and wherein the confirming of the access to the indicated physical property by the first user further includes confirming of the access to the multiple physical properties in succession by the first user and by, for each of the multiple physical properties, at least one of the plurality of candidate users.

15. The computer-implemented method of claim 14 wherein the confirming of the access to the multiple physical properties in succession by the first user further includes, for each of the multiple physical properties other than the indicated physical property, interacting with one of the plurality of candidate users via an additional telephone VoIP call and via one or more additional electronic communications to obtain agreement of that one candidate user to participate in access to that physical property with the first user as the at least one candidate user for that physical property, and wherein the access to the multiple physical properties includes multiple users of the plurality of candidate users acting as the respective at least one candidate user for respective ones of the multiple physical properties.

16. The computer-implemented method of claim 6 further comprising determining, by the one or more computing devices, that the one or more specified conditions are satisfied for the access to the indicated physical property at the selected one availability time, wherein the one or more specified conditions include at least one of the current candidate user having a defined qualification, or the selected one availability time being a time authorized by or on behalf of the at least one third user.

17. A non-transitory computer-readable medium having stored contents that cause one or more computing devices to perform automated operations including at least:

receiving, by one of the one or more computing devices, and based at least in part on a first request from an indicated first user to obtain access to an indicated physical property at one of multiple availability times together with a second user that is not yet identified and is authorized to access the indicated physical property under specified conditions, multiple electronic communications of multiple types including an incoming telephone Voice Over Internet Protocol (VOIP) call corresponding to a second request to a user of the one computing device to act as the second user for the access to the indicated physical property and further including a push notification message sent to the one computing device to initiate access to a copy of an application program on the one computing device, wherein the user of the one computing device is selected from a plurality of alternative candidate users to be the second user, and wherein the indicated physical property is under control of at least one third user who is unaffiliated with the first user and the second user;

activating, by the one computing device and in response to receiving the push notification message, the copy of the application program executing on the one computing device to show first user-selectable controls for answering or rejecting the telephone VOIP call, and receiving a selection by the user of the one computing device of one of the first user-selectable controls for answering the telephone VoIP call;

receiving, by the one computing device, additional electronic communications of the multiple types for the second request, including one or more audio transmissions over the telephone VoIP call related to the access to the indicated physical property and for presentation on a speaker associated with the one computing device, and further including one or more data communications separate from the telephone VOIP call with supplied information about at least the multiple availability times and the indicated physical property to cause presentation of the supplied information in a displayed graphical user interface (GUI) of the copy of the application program;

presenting, by the one computing device and to the user of the one computing device, the one or more audio transmissions over the telephone VoIP call on the speaker, and updates in the displayed GUI of the copy of the application program that include the supplied information from the one or more data communications and that further include second user-selectable controls for the user of the one computing device to either decline participating in the access to the indicated physical property, or to agree to participation as the second user in the access to the indicated physical property at one of the multiple availability times that is selected by the user of the one computing device via the second user-selectable controls;

receiving, by the one computing device and in response to the user of the one computing device agreeing to participate in the access to the indicated physical property at the selected one availability time, one or more further electronic communications to provide confirmation of the access to the indicated physical property by the first user and by the user of the one computing device acting as the second user at the selected one availability time in accordance with the specified conditions, and initiating updating of calendar data for the user of the one computing device to include the selected one availability time; and presenting, by the one computing device, information about the received confirmation in the displayed GUL of the copy of the application program.

18. The non-transitory computer-readable medium of claim 17 wherein the one computing device is a client computing device interacting over one or more computer networks with at least one server computing device of the one or more computing devices, and wherein the stored contents include software instructions that, when executed, further cause the at least one server computing device to perform additional automated operations including at least:

receiving, by the at least one server computing device and before initiating of the telephone VoIP call, the first request from the indicated first user; and confirming, by the at least one server computing device and in response to the first request, the access to the indicated physical property by the first user together with the second user via multiple electronic communications of multiple types, including:

determining, by the at least one server computing device, the plurality of alternative candidate users, and selecting the user of the one computing device from the plurality of alternative candidate users as a current candidate user to receive the second request;

initiating, by the at least one server computing device, the telephone VOIP call and the push notification message to the one computing device;

sending, by the at least one server computing device and in response to the user of the one computing device answering the telephone VOIP call, the additional electronic communications to the one computing device, including the one or more audio transmissions via the telephone VoIP call and the one or more data communications separate from the telephone VOIP call; and confirming, by the at least one server computing device and in response to the user of the one computing device agreeing to participate in the access to the indicated physical property at the selected one availability time, the access to the indicated physical property by the first user and by the current candidate user acting as the second user at the selected one availability time in accordance with the specified conditions, including sending to the one computing device the confirmation of the access to the indicated physical property.

19. A system comprising:

one or more hardware processors of one or more computing devices; and one or more memories with stored instructions that, when executed by at least one of the one or more hardware processors, cause the one or more computing devices to perform automated operations including at least:

receiving information about a first request for a first user to obtain access to an indicated physical property at one or more availability times together with a second user that is not yet identified and is authorized to access the indicated physical property; and confirming the access to the indicated physical property by the first user together with the second user, including:

determining one or more candidate users to be the second user, and selecting a current candidate user from the one or more candidate users to receive a second request to act as the second user for the access to the indicated physical property;

sending multiple electronic communications of multiple types to a client computing device of the current candidate user to cause a response, including sending a push notification message to the client computing device to initiate access to a copy of an application program on the client computing device, and further including sending one or more audio transmissions over a telephone call for presentation on the client computing device, and further including sending one or more data communications with included information to the copy of the application program to cause display of the included information in a graphical user interface of the copy of the application program that indicates the one or more availability times and that includes user-selectable controls for the current candidate user to either decline participating in the access to the indicated physical property, or to agree to participation as the second user in the access to the indicated physical property at one of the one or more availability times; and initiating, in response to the current candidate user agreeing to participate in the access to the indicated physical property at the one availability time, updating of calendar data for the current candidate user to include the one availability time for the access to the indicated physical property by the first user and by the current candidate user acting as the second user.

20. The system of claim 19 wherein the indicated physical property is under control of at least one third user who is unaffiliated with the first user and the second user and who specifies one or more conditions for the access to the indicated physical property, and wherein the stored contents include software instructions that, when executed, cause the one or more computing devices to perform further automated operations including determining that the access to the indicated physical property at the one availability time by the first user and the second user satisfies the specified one or more conditions.

21. The system of claim 19 wherein the first request for the first user includes multiple availability times selected by the first user, and wherein the automated operations further include receiving, after the sending of the multiple electronic communications, an indication of a selection by the current candidate user of the one availability time via one or more interactions with the displayed user-selectable controls.

22. The system of claim 19 wherein the sending of the multiple electronic communications includes initiating to the client computing device a telephone Voice Over Internet Protocol (VOIP) call over which the one or more audio transmissions are received, wherein the one or more computing devices include the client computing device, and wherein the automated operations further include displaying, by the client computing device, one or more initial user-selectable controls for use by the current candidate user in answering or rejecting the telephone VOIP call, and further displaying, after the current candidate user performs one or more interactions with the one or more initial user-selectable controls to answer the telephone VoIP call, the user-selectable controls.

23. The system of claim 19 wherein the sending of the multiple electronic communications includes initiating to the client computing device a telephone Voice Over Internet Protocol (VOIP) call, and wherein the one or more audio transmissions are to the current candidate user over the telephone VoIP call and relate to scheduling of the access to the indicated physical property.

24. The system of claim 19 wherein the sending of the multiple electronic communications further includes sending, after answering of the telephone call by the current candidate user, the one or more data communications.

25. The system of claim 19 wherein the sending of the multiple electronic communications includes, after the sending of the push notification message, sending the one or more data communications to the copy of the application program.

26. The system of claim 19 wherein the sending of the multiple electronic communications includes initiating to the client computing device a telephone Voice Over Internet Protocol (VOIP) call and using the telephone VoIP call to provide the one or more data communications for the copy of the application program.

* * * * *